(12) United States Patent
Szymaniak

(10) Patent No.: US 6,982,723 B1
(45) Date of Patent: Jan. 3, 2006

(54) METHOD AND APPARATUS FOR ELIMINATING UNWANTED STEPS AT EDGES IN GRAPHIC REPRESENTATIONS IN THE LINE RASTER

(75) Inventor: Markus Szymaniak, Berlin (DE)

(73) Assignee: GMD-Forschungszentrum Informationstechnik GmbH, Sankt Augustin (DE)

( * ) Notice: Subject to any disclaimer, the term of this patent is extended or adjusted under 35 U.S.C. 154(b) by 0 days.

(21) Appl. No.: 09/385,822

(22) Filed: Aug. 30, 1999

(30) Foreign Application Priority Data

Aug. 30, 1998 (DE) ................................ 198 40 529

(51) Int. Cl.
G09G 5/00 (2006.01)
G06K 9/40 (2006.01)

(52) U.S. Cl. ...................................... 345/611; 382/269
(58) Field of Classification Search ................ 345/611, 345/614, 615; 382/269
See application file for complete search history.

(56) References Cited

U.S. PATENT DOCUMENTS

| | | | | |
|---|---|---|---|---|
| 4,704,605 A | * | 11/1987 | Edelson | 345/589 |
| 4,835,532 A | * | 5/1989 | Fant | 340/980 |
| 5,029,108 A | * | 7/1991 | Lung | 358/1.9 |
| 5,140,315 A | * | 8/1992 | Edelson et al. | 345/611 |
| 5,264,838 A | | 11/1993 | Johnson et al. | 345/611 |
| 5,388,166 A | * | 2/1995 | Onozawa | 345/17 |
| 5,555,360 A | * | 9/1996 | Kumazaki et al. | 345/428 |
| 5,559,530 A | * | 9/1996 | Yamashita et al. | 345/23 |
| 5,625,768 A | * | 4/1997 | Dye | 345/426 |
| 5,668,940 A | * | 9/1997 | Steiner et al. | 345/592 |
| 5,742,277 A | * | 4/1998 | Gossett et al. | 345/611 |
| 5,748,178 A | | 5/1998 | Drewry | 345/643 |
| 5,903,276 A | * | 5/1999 | Shiraishi | 345/600 |
| 5,940,080 A | * | 8/1999 | Ruehle et al. | 345/611 |
| 6,034,700 A | * | 3/2000 | Rumph et al. | 340/815.65 |
| 6,226,400 B1 | * | 5/2001 | Doll | 382/163 |
| 6,229,521 B1 | * | 5/2001 | Yip | 345/467 |
| 6,339,479 B1 | * | 1/2002 | Kishimoto | 358/1.2 |
| 6,396,947 B1 | * | 5/2002 | Doll | 382/162 |

OTHER PUBLICATIONS

E. Catmull, "A Hidden-Surface Algorithm with Antialiasing", Aug. 78 (on order).
L. Carpenter, "The A-Buffer, An Antialiased Hidden Surface Method", Computer Graphics 12, 84 (on order).

(Continued)

Primary Examiner—Ryan Yang
(74) Attorney, Agent, or Firm—Christie, Parker and Hale, LLP

(57) ABSTRACT

A method of eliminating unwanted steps at edges in image or graphic representations in the line raster, in particular in on-line operation having the steps:
a) Application of an edge operator to an image portion for coarsely ascertaining at least one rastered edge configuration,
b) Determining the position of at least a first pixel from the amount of those pixels which form the rastered edge configuration or adjoin said rastered edge configuration,
c) Approximation of a straight line for ascertaining a probable configuration of the unrastered image edge in the proximity of the first pixel,
d) Ascertaining a criterion from the approximation straight line and the position of the first pixel for mixing a color X to the color C in the first pixel considered, and
e) Mixing the ascertained color X to the color C in the first pixel considered.

15 Claims, 44 Drawing Sheets

OTHER PUBLICATIONS

A. Schilling, "A processor pipeline for use in graphic data processing," Faculty for Information Technology at the Eberhard-Karls-University at Tubingen, Jun. 15, 1994, 28 pages.

P. Baudisch, "Development and implementation of an efficient, hardware-close antialiasing algorithm," Faculty of Information Technology of the Darmstadt College of Technology—Institute for Information Management and Interactive Systems Graphic-Interactive Systems, Sep. 1994, Darmstadt, Germany, 49 pages.

E. Catmull, "A Hidden-Surface Algorithm with Antialiasing", Computer Graphics, Aug. 78. pp. 6-10.

L. Carpenter, "The A-buffer, An Antialiased Hidden Surface Method", Computer Graphics, vol. 18, No. 3, Jul. 1984, pp. 103-108.

A. Schilling et al., "EXACT: Algorithm and Hardware Architecture for an Improved A-Buffer", Computer Graphics Proceedings, Annual Conference Series, 1993, pp. 85-91.

* cited by examiner x : Prerequisite that a jump is perceived is that no edge pixel occurs here X: assumed end points for the current pixel (bordered)

○ : extrapolated center point
✗ : assumed center point

Corner point not considered at the transition of two edges

Mirroring of the left half => same treatment as right half

Found corner point at the transition of two edges

✗ : assumed end points for the current pixel (bordered)

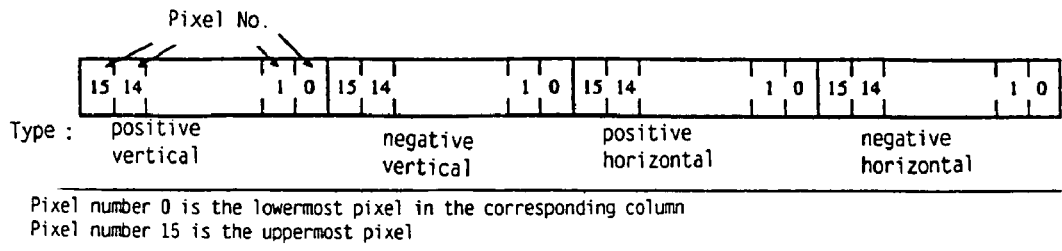
Pixel number 0 is the lowermost pixel in the corresponding column
Pixel number 15 is the uppermost pixel
Fig. 32
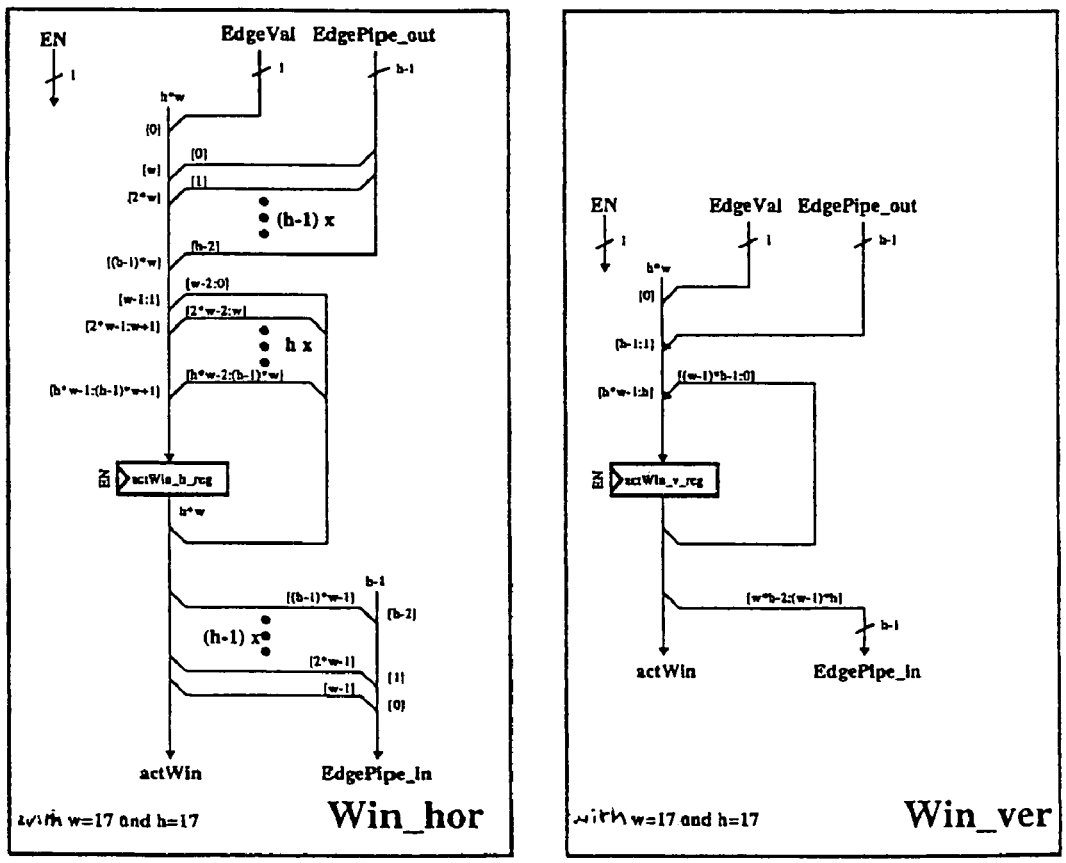
Fig. 33
Fig. 34

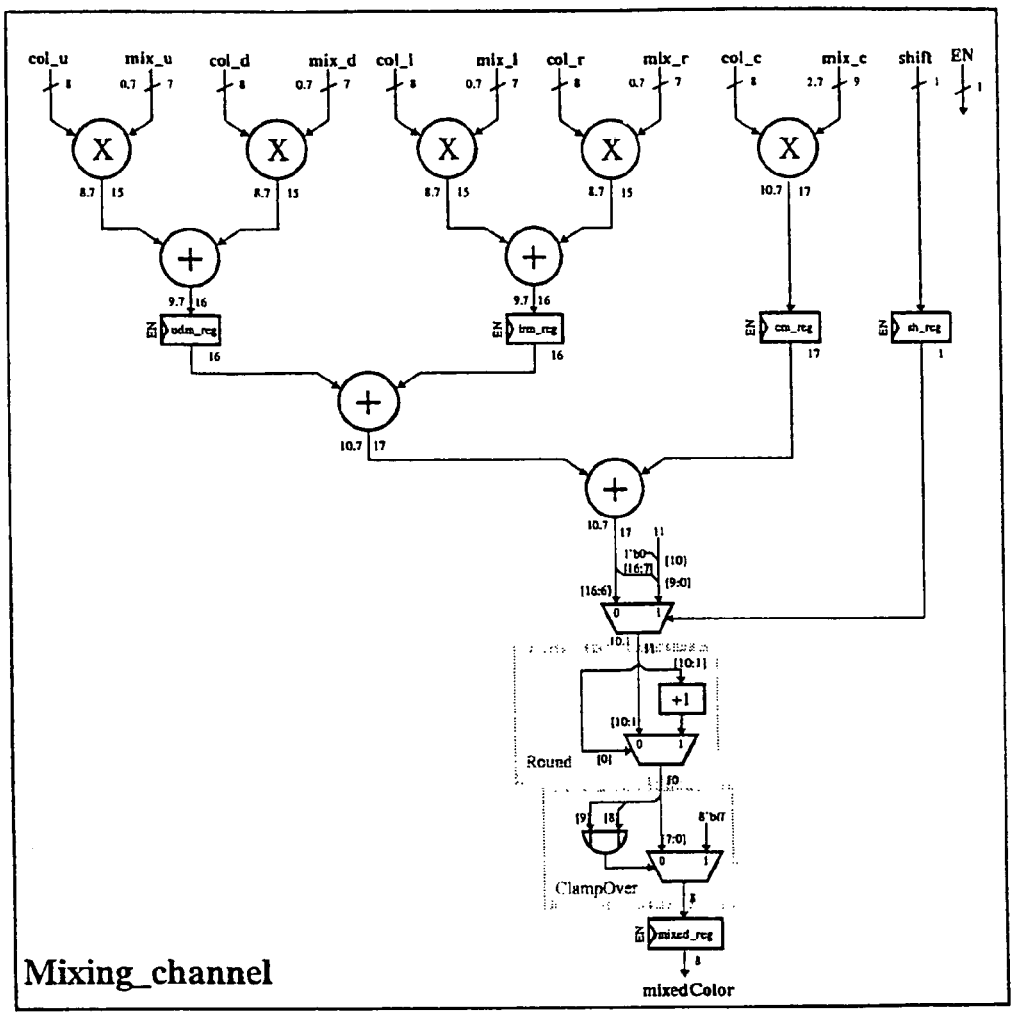
Fig. 58
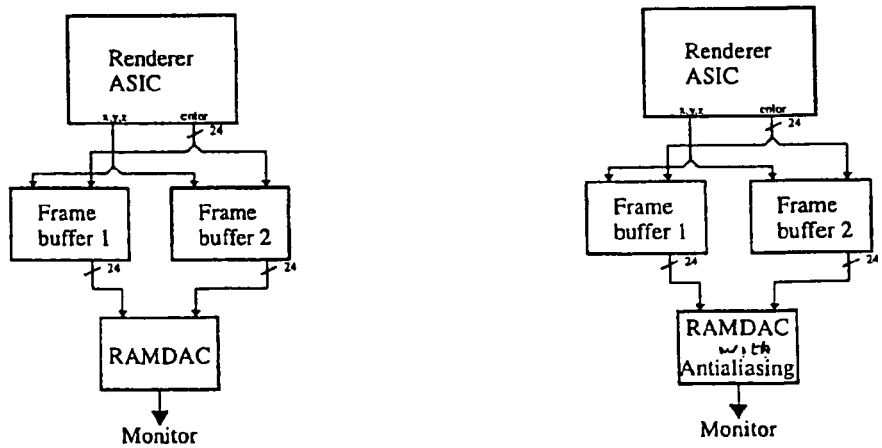
Fig. 59
Fig. 60

Interchange of the buffer functionality

| Start status | End status | Straight line through the points | Example |
|---|---|---|---|
| UP | UP | $(x_A-0.5, 0.5) - (0.5*(x_A+x_E), 0)$<br>for $x \leq 0.5*(x_A+x_E)$<br>$(0.5*(x_A+x_E), 0) - (x_E+0.5, 0.5)$<br>for $x > 0.5*(x_A+x_E)$ | |
| UP | DOWN | $(x_A-0.5, 0.5) - (x_E+0.5, -0.5)$ | |
| UP | NO | $(x_A-0.5, 0.5) - (x_E+0.5, 0)$ | |
| UP | HOR | $(x_A-0.5, 0.5) - (x_A+0.5*(n-2), 0)$ | |
| DOWN | UP | $(x_A-0.5, -0.5) - (x_E+0.5, 0.5)$ | |
| DOWN | DOWN | $(x_A-0.5, -0.5) - (0.5*(x_A+x_E), 0)$<br>for $x \leq 0.5*(x_A+x_E)$<br>$(0.5*(x_A+x_E), 0) - (x_E+0.5, -0.5)$<br>for $x > 0.5*(x_A+x_E)$ | |

Tab. 1

| Start status | End status | Straight line through the points | Example |
|---|---|---|---|
| DOWN | NO | $(x_A-0.5,-0.5) - (x_E+0.5,0)$ | |
| DOWN | HOR | $(x_A-0.5,-0.5) - (x_A+0.5*(n-2),0)$ | |
| NO | UP | $(x_A-0.5,0) - (x_E+0.5,0.5)$ | |
| NO | DOWN | $(x_A-0.5,0) - (x_E+0.5,-0.5)$ | |
| NO | NO | $y \equiv 0$ | |
| NO | HOR | $y \equiv 0$ | |
| HOR | UP | $(x_E-0.5*(n-2),0) - (x_E+0.5,0.5)$ | |
| HOR | DOWN | $(x_E-0.5*(n-2),0) - (x_E+0.5,-0.5)$ | |

Tab. 2

| Start status | End status | Straight line through the points | Example |
|---|---|---|---|
| HOR | NO | $y \equiv 0$ | |
| HOR | HOR | $y \equiv 0$ | |

Tab. 3

| Signal | Bits | Type | Description |
|---|---|---|---|
| Init | 1 | In | Initialization signal (transfer of a new height and width) |
| width | 11 | In | New display screen width (only relevant at Init=1) |
| height | 11 | In | New display screen height (only relevant at Init=1) |
| Color | 24 | In | Chromaticity value of a pixel |
| Valid_in | 1 | In | Validity display of the color signal |
| mixedColor | 24 | Out | Anti-aliased chromaticity value of a pixel |
| Valid | 1 | Out | Validity display of the mixed color signal |

Tab. 4

| Signal | Bits | Type | Description |
|---|---|---|---|
| EN | 1 | In | Enable signal of the counters |
| Init | 1 | In | Initialization signal (transfer of the new width and height) |
| width | 11 | In | New display screen width (only relevant at Init=1) |
| height | 11 | In | New display screen height (only relevant at Init=1) |
| rightValid | 1 | Out | Validity display of the pixel right of the current one |
| downValid | 1 | Out | Validity display of the pixel below the current one |
| Ready | 1 | Out | Display that all pixels of the current image were read in |

Tab. 5

| Signal | Bits | Type | Description |
|---|---|---|---|
| EN | 1 | In | Enable signal of the registers |
| col_right | 24 | In | Chromaticity value for the pixel right of the current one |
| col_down | 24 | In | Chromaticity value for the pixel below the current one |
| rightValid | 1 | In | Validity display of the col_right signal |
| downValid | 1 | In | Validity display of the col_down signal |
| EdgeVal | 4 | Out | Edge information for the current pixel |
| col_right_new | 24 | Out | Chromaticity value which is used again for edge generation in the next line |
| color | 24 | Out | Chromaticity value which is to be stored for later mixing |

Tab. 6

| Signal | Bits | Type | Description |
|---|---|---|---|
| EN | 1 | In | Enable signal of the module |
| color0 | 24 | In | Color of the one pixel |
| color1 | 24 | In | Color of the other pixel between which an edge is to be recognised |
| cmp | 1 | Out | Indication whether an edge exists between the pixels involved |

Tab. 7

| Signal | Bits | Type | Description |
|---|---|---|---|
| EN | 1 | In | Enable signal of the module |
| r_color | 24 | In | Color of the right pixel |
| c_color | 24 | In | Color of the central pixel |
| d_color | 24 | In | Color of the lower pixel |
| r_pos | 1 | Out | There is a positive color jump from the central to the right pixel |
| r_neg | 1 | Out | There is a negative color jump from the central to the right pixel |
| d_pos | 1 | Out | There is a positive color jump from the central to the lower pixel |
| d_neg | 1 | Out | There is a negative color jump from the central to the lower pixel |

Tab. 8

| Signal | Bits | Type | Description |
|---|---|---|---|
| EN | 1 | In | Enable signal of the registers |
| x | 8 | In | Chromaticity value of a channel |
| y | 8 | In | Chromaticity value of a channel |
| z | 8 | In | Chromaticity value of a channel |
| approx | 11 | Out | Result value |

Tab. 9

| Signal | Bits | Type | Description |
|---|---|---|---|
| EN | 1 | In | Enable signal of the module |
| EdgeVal | 4 | In | New edge value for the right lower pixel in the edge window |
| EdgePipe_out | 64 | In | Edge values of the most right column |
| Win_vp | 289 | Out | Edge window with the vertically positively marked pixels |
| Win_vn | 289 | Out | Edge window with the vertically negatively marked pixels |
| Win_hp | 289 | Out | Edge window with the horizontally positively marked pixels |
| Win_hn | 289 | Out | Edge window with the horizontally negatively marked pixels |
| EdgePipe_in | 64 | Out | Edge values of the column most to the left, which are no longer required for the current window relevant again only when processing the next line) |

Tab. 10

| Signal | Bits | Type | Description |
|---|---|---|---|
| EN | 1 | In | Enable signal of the registers |
| EdgeVal | 1 | In | New edge value for the right lowermost pixel |
| EdgePipe_out | 16 | In | Edge value for the most right column |
| actWin | 289 | Out | Vertical/horizontal edge window |
| EdgePipe_in | 16 | Out | Edge values of the column most to the left, which are no longer required for the current window (relevant again only when processing the next line) |

Tab. 11

| Signal | Bits | Type | Description |
|---|---|---|---|
| Reset | 1 | In | Reset signal, after application of this signal an RAM initialization phase occurs |
| Init | 1 | In | Initialization signal at which the length of the pipe is established again |
| L | ? | In | New length of the pipe used (bit width can be established by way of parameters) |
| Shift | 1 | In | Signal for advancing the data (new datum is taken over, a datum is outputted) |
| DIn | ? | In | Data input of the pipe (bit width can be established by way of parameters) |
| DOut | ? | Out | Data output of the pipe (bit width can be established by way of parameters) |

Tab. 12

| Signal | Bits | Type | Description |
|---|---|---|---|
| EN | 1 | In | Enable signal of the registers |
| Init | 1 | In | Initialization signals for the masks |
| x_in | 1 | In | New value for the x-mask |
| y_in | 1 | In | New value for the y-mask |
| EndOfLine | 1 | In | Signal which displays that the end of an image line is reached |
| xmask | 17 | Out | Mask which horizontally specifies which pixels belong to the current environment |
| ymask | 17 | Out | Mask which vertically specifies which pixels belong to the current environment |

Tab. 13

| Signal | Bits | Type | Description |
|---|---|---|---|
| EN | 1 | In | Enable signal of the counters |
| Init | 1 | In | Initialization signal (transfer of the new width and height) |
| width | 11 | In | New width (only relevant at Init=1) |
| height | 11 | In | New height (only relevant at Init=1) |
| EndOfLine | 1 | Out | Signal which indicates that the end of an image line is reached |
| x_in | 1 | Out | New value for the x-mask |
| y_in | 1 | Out | New value for the y-mask |
| Valid | 1 | Out | Is the current pixel valid at all (within the image limits)? |

Tab. 14

| Signal | Bits | Type | Description |
|---|---|---|---|
| EN | 1 | In | Enable signal of the module |
| Win_p | 289 | In | Positively marked pixel in the edge window |
| Win_n | 289 | In | Negatively marked pixel in the edge window |
| xmask | 17 | In | x-mask (validity of the pixels in the edge window) |
| ymask | 17 | In | y-mask (validity of the pixels in the edge window) |
| yReal | 16 | Out | Position of the straight line with respect to the color jump |
| mix | 7 | Out | Mix factor which specifies how much of the color from the corresponding direction is to be mixed (if only that straight line exists) |
| len | 5 | Out | Horizontal length of the traced straight line |
| nogood | 1 | Out | Flag which specifies whether the straight line is deemed "good" |

Tab. 15

| Signal | Bits | Type | Description |
|---|---|---|---|
| actWin_p | 289 | In | Positively marked pixels in the edge window |
| actWin_n | 289 | In | Negatively marked pixels in the edge window |
| xmask | 17 | In | Validity of the pixels in the window |
| ymask | 17 | In | Validity of the lines in the window |
| maskedWindow | 191 | Out | Masked edge window |

Tab. 16

| Signal | Bits | Type | Description |
|---|---|---|---|
| EN | 1 | In | Enable signal of the registers |
| ep | 191 | In | Edge window (edge pic/no longer rectangular) |
| stat_left | 2 | Out | Status at the left end of the traced step |
| stat_right | 2 | Out | Status at the right end of the traced step |
| xA | 4 | Out | x-value of the start point (actually -xA but sign is not required/value range:0..7.5) |
| yA | 5 | Out | y-value of the start point (value range:-7.5..+7.5) |
| xE | 4 | Out | x-value of the end point (value range:0..7.5) |
| yE | 5 | Out | y-value of the end point (value range: -7.5..+7.5) |

Tab. 17

| Signal | Bits | Type | Description |
|---|---|---|---|
| up | 9 | In | Line in the edge image above the middle one |
| center | 9 | In | Middle line in the edge image in one direction |
| down | 9 | In | Line in the edge image below the middle one |
| len | 3 | Out | Length of the central step in the traced direction |
| stat | 3 | Out | Status at the end of the central step |

Tab. 18

| Signal | Bits | Type | Description |
|---|---|---|---|
| tstat_l | 3 | In | Temporary status towards the left |
| tstat_r | 3 | In | Temporary status towards the right |
| stat_l | 2 | Out | Status at the left end of the traced step |
| stat_r | 2 | Out | Status at the right end of the traced step |

Tab. 19

| tstat | Bits[2:0] |
|---|---|
| UP | 010 |
| DOWN | 001 |
| NO | 000 |
| HOR | 011 |
| BOTH | 100 |

Tab. 20

| stat | Bits[1:0] |
|---|---|
| UP | 10 |
| DOWN | 01 |
| NO | 00 |
| HOR | 11 |
| | |

Tab. 21

| Signal | Bits | Type | Description |
|---|---|---|---|
| pos | 3 | In | Position at which the central step ends |
| ep | 44 | In | Sector from the edge image in which further steps are to be found |
| jumps | 17 | Out | Jumps found in the sector |

Tab. 22

| Signal | Bits | Type | Description |
|---|---|---|---|
| EN | 1 | In | Enable signal of the registers |
| stat_l | 2 | In | Status at the left edge of the central step |
| stat_r | 2 | In | Status at the right edge of the central step |
| pos_l | 3 | In | Length of the central step towards the left |
| pos_r | 3 | In | Length of the central step towards the right |
| jumps_l | 17 | In | Further steps recognised towards the left |
| jumps_r | 17 | In | Further steps recognised towards the right |
| xA | 4 | Out | x-value of the start point |
| yA | 4 | Out | y-value of the start point (without sign) |
| xE | 4 | Out | x-value of the end point |
| yE | 4 | Out | y-value of the end point (without sign) |

Tab. 23

| Signal | Bits | Type | Description |
|---|---|---|---|
| len | 4 | In | Length of the central step |
| jumps | 17 | In | Possible jumps |
| pos | 7 | Out | Mask which specifies which steps include a length greater by one than the central step |
| zero | 7 | Out | Mask which specifies which steps contain the same length as the central step |
| neg | 7 | Out | Mask which specifies which steps contain a length shorter by one than the central step |

Tab. 24

| Signal | Bits | Type | Description |
|---|---|---|---|
| EN | 1 | In | Enable signal of the registers |
| pos_l | 7 | In | Mask which contains the steps longer by one towards the left |
| zero_l | 7 | In | Mask which contains the steps of the same length towards the left |
| neg_l | 7 | In | Mask which contains the steps shorter by one towards the left |
| pos_r | 7 | In | Mask which contains the steps longer by one towards the right |
| zero_r | 7 | In | Mask which contains steps of the same length towards the right |
| neg_r | 7 | In | Mask which contains the steps shorter by one towards the right |
| mask_l | 7 | Out | Mask which specifies which steps towards the left contribute to a straight line |
| mask_r | 7 | Out | Mask which specifies which steps towards the right contribute to a straight line |

Tab. 25

| Signal | Bits | Type | Description |
|---|---|---|---|
| EN | 1 | In | Enable signal of the registers |
| pos | 3 | In | x-value of the end of the central step |
| y0 | 1 | In | y-value of the end of the central step |
| jumps | 17 | In | Further steps in the corresponding direction |
| mask | 7 | In | Mask which specifies which of the steps in jumps contribute to the straight line |
| x | 4 | Out | x-value of the one end point of the straight line |
| y | 4 | Out | Magnitude of the y-value of the one end point of the straight line |

Tab. 26

| Signal | Bits | Type | Description |
|---|---|---|---|
| EN | 1 | In | Enable signal of the registers |
| xA | 4 | In | x-value of the start point |
| yA | 5 | In | y-value of the start point |
| xE | 4 | In | x-value of the end point |
| yE | 5 | In | y-value of the end point |
| stat_left | 2 | In | Status at the start point |
| stat_right | 2 | In | Status at the end point |
| yReal | 16 | Out | y-value of the real straight line in the current pixel |
| mix | 7 | Out | Mixed factor for a mixing direction rel. to the straight line |
| len | 5 | Out | Length of the traced straight line |
| no_good | 1 | Out | Statuses at the ends of the straight line indicate not a "benign" straight line |

Tab. 27

| Signal | Bits | Type | Description |
|---|---|---|---|
| x | 5 | In | Input value |
| y | 10 | Out | Input value - $\frac{1}{x}$ |

Tab. 28

| Signal | Bits | Type | Description |
|---|---|---|---|
| EN | 1 | In | Enable signal of the registers |
| xmask | 1 | In | Mask bit which specifies whether the current pixel belongs to an edge |
| yReal | 16 | In | y-value of the real edge relative to the color jump |
| len_r | 5 | In | Length of the traced straight line for the right mix factor |
| nogood_r | 1 | In | Flag indicating that the straight line was probably not "benign" for ascertaining the right mix factor |
| mix | 7 | Out | Left mix factor for the current pixel |
| len | 5 | Out | Length of the traced straight line |
| nogood | 1 | Out | Statuses at the end of the straight line indicate not a "benign" straight line |

Tab. 29

| Signal | Bits | Type | Description |
|---|---|---|---|
| EN | 1 | In | Enable signal of the registers |
| pre_mix_up, pre_mix_down, pre_mix_left, pre_mix_right | je 7 | In | Mix factors which were established on the basis of only one respective straight line |
| len_up, len_down, len_left, len_right | je 5 | In | Lengths of the respective straight line |
| nogood_up, nogood_down, nogood_left, nogood_right | je 1 | In | Flags of the respective straight lines which cannot be deemed "good" |
| mix_up, mix_down, mix_left, mix_right | je 7 | Out | Definitive mixing factors for the corresponding directions |

Tab. 30

| Signal | Bits | Type | Description |
|---|---|---|---|
| EN | 1 | In | Enable signal of the registers |
| mix_up, mix_down, mix_left, mix_right | je 7 | In | Mix factors for the corresponding directions. |
| col_up | 24 | In | Color of the pixel above the current one |
| col_right | 24 | In | Color of the pixel to the right of the current one |
| col_down | 24 | In | Color of the pixel below the current one |
| mixedColor | 24 | Out | New color of the current pixel by virtue of mixing |
| mixing | 1 | Out | Flag whether mixing occurred (in triple buffer mode the decision whether the pixel has to be written back) |
| col_up_new | 24 | Out | Color which is used in the next line as uppermost pixel |
| col_right_new | 24 | Out | Color which is used in the next line as right pixel |

Tab. 31

| Signal | Bits | Type | Description |
|---|---|---|---|
| EN | 1 | In | Enable signal of the registers |
| mix_up, mix_down, mix_left, mix_right | je 7 | In | Mix factors for the corresponding directions |
| mix_u, mix_d, mix_l, mix_r | je 7 | Out | Mix factors delayed by one cycle |
| mix_c | 7 | Out | Central mix factor |
| shift | 1 | Out | Flag whether the mixed factors must still all be divided by two |
| mixing | 1 | Out | Flag whether mixing occurs or whether the central factor is 1.0 |

Tab. 32

| Signal | Bits | Type | Description |
|---|---|---|---|
| EN | 1 | In | Enable signal of the registers |
| mix_u, mix_d, mix_l, mix_r, mix_c | je 7 | In | Mix factors for the corresponding pixels |
| col_u, col_d, col_l, col_r, col_c | je 8 | In | Colors of the individual pixels in the respective color channel |
| shift | 1 | In | Flag that division must still occur by 2 |
| mixedColor | 8 | Out | Mixed color for the color channel |

Tab. 33

METHOD AND APPARATUS FOR ELIMINATING UNWANTED STEPS AT EDGES IN GRAPHIC REPRESENTATIONS IN THE LINE RASTER

FIELD OF THE INVENTION

The invention relates to computer graphic applications and, more specifically, to anti-aliasing techniques.

BACKGROUND OF THE INVENTION 3D graphic applications such as virtual reality, 3D games or in the more professional sphere modelling and animation nowadays already form part of the standard applications on PCs. A prerequisite for real time capability in that sector is the extreme increase in power of the processors in recent years and more recently the use of 3D graphic accelerators which take over special recurrent tasks in graphics generation. The processor is only still required to perform the task of generating the geometry description of the scene to be represented, everything else such as rasterization (generation of the pixels to be displayed) and shading (coloration of the pixels) being effected by the accelerator.

In consideration of the fact that such systems are however still restricted in capacity, compromises have to be accepted between image quality and the real time requirement (at least 25 images per second for a continuous motion). In general terms, more value is put on a jerk-free representation whereby on the one hand objects can be only very roughly modelled in order to keep down the number of polygons, and on the other hand display screen resolution is kept low in order to limit the number of pixels to be generated. With the nowadays conventional VESA-resolution (640×480 pixels) and with animated image sequences, aliasing effects which occur due to rasterization however are still particularly troublesomely evident. Nonetheless they are tolerated as conventional anti-aliasing attempts such as for example supersampling involve an excessively high level of memory and computing power demand.

Until a scene which is modelled in the computer can be represented on the display screen, a number of steps are required:

1. The data sets stored in the memory in respect of the objects to be represented must be transformed (scaled, rotated) and placed at the correct locations in the virtual scene (modelling transformation).

2. Starting from the position of the objects with respect to the angle of view of the viewer, objects which cannot be guaranteed visible are rejected and thus no longer taken into consideration. In that respect both entire objects which are outside the visible volume are eliminated (clipping) and also individual polygons of objects which face away from the viewer (backface removal).

3. The polygons modelled in world coordinates (mostly triangles) must now be converted into the image coordinate system, in which respect perspective distortion is effected in order to permit imaging which is as realistic as possible (viewing transformation).

4. The polygons which are now present in the image coordinates must be prepared in such a way that they can be processed by the renderer (for example calculation of gradients at edges etc./setup processing).

5. Then, in the rasterizer calculation of the visible pixels on the display screen is then implemented. For each pixel, not only is the position on the display screen (x, y) calculated, but the procedure also involves determining further parameters which are necessary for illumination and masking analysis (z-value, homogenous parameter, texture coordinates, normals, etc./rasterization).

6. On the basis of the calculated parameters, the color values or chromaticity values of the pixels to be represented are now ascertained (lighting). That step is here implemented only when what is involved is a Phong renderer. If there is only a Gouraud renderer, that step is already implemented prior to transformation into the image coordinate system.

7. The calculated chromaticity values are then stored in the frame buffer when the z-value of the pixel specifies that the pixel is before the pixel at that position in the frame buffer (z-buffering). Prior to the storage operation the chromaticity values can be modified by means of blending with the value previously in the frame buffer, whereby for example modelling of semi-transparent objects becomes possible.

8. When all visible triangles have been rasterized the image to be represented on the screen is in the frame buffer. By way of the RAMDAC the image is linearly read out of the memory and converted into analog signals which are passed directly to the monitor (display process).

The problem of aliasing arises out of the nowadays usual use of raster displays as it is not possible with discrete dots or points for example precisely to display an inclined edge. In "normal" scan conversion a pixel (picture element) is set whenever the pixel center point is covered whereby visible jumps occur at certain spacings from a continuous edge in the discrete case, and such jumps are particularly apparent in the case of moving images as they move along the edge. Thus for example upon movement of an almost horizontal edge, the irritating effect occurs that, if the edge is slowly vertically displaced, the jumps move rapidly horizontally along the edge. It seems therefore that neither the direction of motion nor the speed of motion are right.

It is known from signal processing that a signal (in this case the image) can be correctly reproduced only when the sample rate is greater than double the maximum frequency that occurs (Shannon's sample theorem). As however the sample rate is fixedly predetermined by the screen resolution, as a corollary only frequencies beneath half the sample rate are correctly reproduced; all frequencies thereabove contribute to aliasing.

The problem of conventional sampling therefore involves the fact that a pixel is always considered as a point, whereby the name point sampling is also used. What is common to all anti-aliasing endeavours is that the pixel is now seen as something that is two-dimensional or areal; the color should therefore arise out of averaging of the coloration of the covered pixel area. Anti-aliasing now seeks to eliminate as far as possible or at least attenuate the problems arising out of representation.

In the case of aliasing at polygon edges, not all polygon edges are involved, but only those which are to be found at the edges of objects. Within objects, the polygons generally merge seamlessly together and if adjacent polygons are of similar coloring, it is of no importance at the edges between the polygons whether the pixels of the one polygon or the other are set.

Very small objects can disappear if the extent thereof is smaller than a pixel. This effect is particularly striking when due to a small displacement the object becomes visible as suddenly a pixel center point is affected. There is a kind of blinking effect which guides the attention of the viewer to it.

In the case of modern Phong renderers, additional aliasing effects occur at the spot limits. In the case of Gouraud renderers that problem does not occur as with such renderers no light effects like those shown herein are possible, whereby image quality is not comparable.

The most wide-spread approach to anti-aliasing is supersampling. Each pixel is subdivided into (n×n) subpixels which then again are normally "point-sampled". The result is an intermediate image which in both dimensions has n-times the resolution of the image to be represented. Summing of the chromaticity values of the (n×n) subpixels and subsequent division by the number of subpixels ($n^2$) then gives the final color of the pixel. From the point of view of signal processing the sample rate is increased by the factor n (also referred to as the oversampling factor), whereby smaller details can be reconstructed. Meaningful values for n are in the range of between 2 and 8 whereby between 4 and 64 chromaticity values per pixel are available.

In spite of the simplicity of this procedure there are various disadvantages, in consideration of which it was not possible to attain implementation in hardware:

1. Memory requirement: As the image is rendered in an n-times resolution, not only the frame buffer but also the z-buffer (24–32 bit/pixel) must be of an n-times configuration.

For example, for a screen resolution of 1024×768 pixels and an oversampling factor of n=4, there is a memory requirement of 48 MB for the frame buffer and 36 MB once more for the z-buffer. In total therefore 84 MByte memories are required in comparison with 5.25 MB for normal sampling.

2. Computing time: Because of the larger number of pixels to be produced the computing time also increases by the factor $n^2$. If therefore the system were previously capable of displaying 16 image per second, with n=4 it now only involves one image per second; it has therefore lost its real time capacity.

In addition the procedure cannot guarantee that the image produced is free from artefacts for at each sampling rate an image can be easily constructed, which is guaranteed wrongly represented. If the image to be represented has a horizontal resolution of w, a perpendicular stripe pattern comprising (n×w) black and (n×w) white bars is represented either completely black or completely white.

In the case of stochastic supersampling the sample points are randomly distributed over the pixel whereby the artefacts which remain are superimposed with a noise which is more agreeable to the human eye.

An image which was rendered four times with a stochastic approach is of approximately the same image quality as a 16-times supersampling on a regular raster.

The process however is limited to a use in software terms as hardware renderers operate exclusively with incremental processes. With sample points which are positioned randomly there is no longer a fixed sequence of the points so that processing can no longer be implemented incrementally but the parameters per point would have to be completely newly calculated, which involves an extreme amount of time.

Not all subpixels have to be treated in the same way in the post-processing pass; when summing the chromaticity values, it is also possible to introduce a factor which specifies how important the subpixel is for the pixel. The factors are ascertained in accordance with Gaussian, Poisson or another distribution in which generally subpixels which are closer to the pixel center point acquire higher weight.

Supersampling is always effected in its basic form with the same sampling rate over the entire image. In areal regions however a great deal of computing time is required as there each subpixel also controls the same chromaticity value. The idea in that respect is of implementing supersampling only where it is truly necessary. In a first pass the image is normally rendered and in a second pass each chromaticity value is then compared to those from its surroundings, and supersampling in respect of that pixel is now effected only if the difference exceeds a predetermined threshold value. It will be appreciated that the disadvantage with that process is the double rendering of each polygon.

The accumulation buffer is a modification of the above-mentioned supersampling procedure, in which the extreme memory requirement is avoided. The procedure only requires in addition to the frame and z-buffers which are present in any case an additional buffer of the size of the frame buffer, which however needs to be of a somewhat higher level of accuracy. Rendering of an image now requires $n^2$ rendering passes with the normal frame buffer resolution, with n again representing the oversampling factor. Between the calculations of the partial images, the procedure provides for respectively displacing the coordinate system of the geometry to be described in the subpixel range in such a way that the pixel center points each come to lie on another sample of the corresponding supersampling process. The frame buffer contents which are produced in each rendering pass are accumulated in the additional buffer (hence the name accumulation buffer), whereupon erasure of the frame and the z-buffers occurs for the next partial image. As $n^2$ chromaticity values per pixel are summed in the accumulation buffer $2*\log_2 n$ accuracy bits are once again additionally required for frame buffer accuracy so that no overflow of the chromaticity values is possible. As soon as all partial images have been rendered, the chromaticity values from the accumulation buffer are divided by the number of samples ($n^2$) and taken over into the frame buffer which can then be displayed.

The use of the accumulation buffer instead of the frame buffer which is enormous in the supersampling procedure eliminates the disadvantage of the large memory requirement, but not the requirement in terms of computing time. In contrast the rendering time will be even further increased as now the geometry descriptions (mostly triangles) have to be transmitted a plurality of times to the renderer.

Area sampling, developed by Edwin Catmull [Edwin Catmull: "A hidden-surface algorithm with anti-aliasing", Aug. 78], is based on calculating for each pixel the area which is allotted to the individual polygons. That is effected by an analytical procedure so that each polygon, no matter how small, is considered, and furnishes a correspondingly high level of image quality.

The procedure of the algorithm can be described approximately in the following terms:

All polygons are arranged in accordance with their greatest y-coordinate.

A list of active polygons is managed, in which polygons are entered as soon as the scanline with the greatest y-value is reached, and from which they are erased again as soon as the value falls below the minimum y-value.

Per scanline, in which respect a scanline is considered in this case as something two-dimensional, for each pixel a bucket must be applied, in which all respective polygon portions which contribute to that pixel are entered. In that respect the polygon proportions are again represented by polygons which have been clipped in relation to the pixel edges. When constructing the buckets, care is taken to ensure that the respective polygons are sorted therein, in accordance with their z-values.

Per pixel, by means of the so-called "hidden-surface-algorithm" from Sutherland the visible area of the individual polygons is determined, the colors of which in weighted form then give the definitive pixel color.

Aspects which tell against a hardware implementation of that kind are the extreme computing expenditure for determining the visible area proportions or components in the case of lists of increasing length, and the scanline-based procedure in regard to rasterization.

The A-Buffer-Algorithm [Loren Carpenter: "The a-buffer, an anti-aliased hidden surface method", Computer Graphics 12, 84] represents discrete implementation of area sampling, in which it is not the exact area of the polygons that is stored but also subpixel masks which represent an approximation of the areas. In addition traversing is effected in a polygon-wise manner so that once again a frame buffer is required, which however must accommodate a dynamic list per pixel, in which the subpixel masks are stored together with their chromaticity values. In that case, for each subpixel mask, the procedure involves storing either only one z-value (that of the center point of the pixel) or two z-values (minimum and maximum z-values occurring in the pixel), in order to limit the memory expenditure. As soon as all polygons have been processed, in a further pass through the image the subpixel masks are calculated on the basis of the z-values so that the definitive chromaticity value is produced.

The constantly high memory requirement of supersampling was thus replaced by a memory requirement which dynamically adapts to the complexity of the scene. On the basis of that dynamic behavior and the resulting transversing of lists, this method is scarcely suitable for hardware implementation. Furthermore concealment analysis is found to cause problems because of the limited number of the z-values. In [Andreas Schilling and Wolfgang Strasser: "EXACT: Algorithm and Hardware Architecture for an Improved A-Buffer", Computer Graphics Proceedings, 93] a possible solution is set forth, by means of the additional storage of dz/dx and dz/dy on a subpixel level.

The Approximationbuffer from Lau [Wing Hung Lau: "The anti-aliased approximation buffer", Aug. 94] also involves using the A-Buffer approach, but in this case the number of fragments stored per pixel is limited to two. This therefore involves a constant memory expenditure which however is bought at the expense of losses in terms of image quality. Thus, only pixels which are covered by a maximum of two polygons are still correctly handled as more proportions cannot be represented. The method is accordingly limited to a few large polygons as then the case of more than two fragments practically only very rarely occurs (less than 0.8% accordingly to Lau) and thus the quality of the resulting images is sufficiently good.

The Exact Area Subpixel Algorithm (EASA by Andreas Schilling [Andreas Schilling: "Eine Prozessor-Pipeline zur Anwendung in der graphischen Datenverarbeitung", Dissertation to the Eberhard-Karls University in Tubingen, June 94]) represents a modification of the a-buffer, in which a higher level of accuracy is achieved at edges of a polygon. Generation of the subpixel masks is effected in the A-buffer on the basis of concealment of the subpixel center points. Schilling in contrast calculates the exact area component, from which a number of subpixels to be set is derived, which then results in the generation of the actual mask on the basis of the gradient of the edge. This method can achieve a higher level of resolution in relation to almost horizontal (vertical) edges as a plurality of subpixels are always set all at once in the A-buffer so that it was not possible to utilise the maximum resolution of the subpixel mask.

The method of Patrick Baudisch [Patrick Baudisch: "Entwicklung und Implementierung eines effizienten, hardwarenahen Anti-aliasing-Algorithmus", dissertation submitted for a diploma, the Institute of Science and Technology of Darmstadt, Sept. 94] is also based on subpixel masks which are generated at polygon edges. In this case however they do not serve to calculate the area of the individual polygons and thereby correspondingly to weight the color thereof as with the previous processes, but to add the adjacent colors from a normally point-sampled image. The basis adopted is spatial coherence of the pixels, that is to say the color which a polygon partially contributes to a pixel is guaranteed to be found in an adjacent pixel. The position of the subpixels in the mask specifies from which adjacent pixel admixing is to be effected if it is set. The subpixels on the diagonals refer in that case to two adjacent pixels.

In the four-vector method in each case 4 subpixels are combined together to form a meta-subpixel which in turn specifies admixing of the adjacent pixel color. Because of the combination step, the spatial information is lost but the accuracy of the area proportions is increased. The previous anti-aliasing methods all have disadvantages in terms of their possible capacity for hardware implementation, which however can only be overcome with difficulty. On the one hand an enormous memory expenditure must be involved (supersampling, area sampling, A-buffer) and on the other hand computer expenditure of some methods is so high (supersampling, accumulation buffer, area sampling) that hardware implementation is scarcely still possible in real time. In addition, in methods which operate exclusively on polygon edges (area sampling, A-buffer, approximation buffer, EASA, subpixel methods, four-vector methods), billboard and spot artefacts are not taken into account.

The problems arising in the state of the art are to be once again briefly summarised as follows:

The problem of aliasing arises out of the use of raster displays as it is not possible with discrete points for example to exactly represent an inclined edge. Normal rasterization methods give rise to jumps at given spacings from a continuous edge in the discrete case, and such jumps severely adversely affect the visual impression.

A conventional approach for dealing with that effect is supersampling in which by means of many sampling points within a pixel the attempt is made to arrive at a better color. The method however can scarcely be used in the real time level as a very high level of memory and computing time expenditure is necessary.

The other methods seek to determine a better chromaticity value by precisely calculating the contribution in terms of area of the polygons to each pixel. In this case also however a very high level of computing time is required (if not also memory space).

It is also known from U.S. Pat. No. 5,748,178 for the surroundings of a pixel to be stored in the passage in a kind of shift register, in which case mutually adjacent pixels also occupy adjacent memory places. A filtering action is achieved in that case by virtue of the fact that a respective pixel surrounding can then be subjected to a common filter weighting procedure. As the effectiveness of the method is dependent on which pixels are in randomly mutually adjacent relationship, effective anti-aliasing is not possible in this case.

It is also known from U.S. Pat. No. 5,264,838, for the purposes of anti-aliasing, to provide a respective environment of a pixel in the region of a pulse with a blurred or non-sharp environment (halo). That method however only produces an additional lack of sharpness as it acts in an undirected fashion.

SUMMARY OF THE INVENTION

In comparison, the object of the present invention is to provide an anti-aliasing method which does not adversely affect real time capability, whereby a marked improvement in image quality could be achieved in spite of the need for hardware implementation.

That object is attained by a method which serves to eliminate unwanted steps at edges in image or graphic representations in the line raster, in particular in on-line operation. That method is characterised by the following steps:

a) Application of an edge operator to an image portion for coarsely ascertaining at least one rastered edge configuration, b) Determining the position of at least a first pixel from the amount of those pixels which form the rastered edge configuration or adjoin said rastered edge configuration, c) Approximation of a straight line for ascertaining a probable configuration of the unrastered image edge in the proximity of the first pixel, d) Ascertaining a criterion from the approximation straight line and the position of the first pixel for mixing a color X to the color C in the first pixel considered, and e) Mixing the ascertained color X to the color C in the first pixel considered.

In accordance with a particularly preferred embodiment the method according to the invention is characterised in that the criterion of method step d), in dependence on the position of the pixel being considered relative to the approximation straight line, establishes which color X is mixed to the color C of the pixel being considered.

In accordance with a particularly preferred embodiment the method according to the invention is characterised in that the criterion in accordance with method step d), in dependence on the position of the pixel being considered relative to the approximation straight line, establishes that the color of at least one adjacent pixel is mixed in weighted mode to the color of the pixel being considered.

In accordance with a particularly preferred embodiment the method according to the invention is characterised in that in the case of a pixel being considered which is not intersected by the approximation straight line, the color remains unchanged.

In accordance with a particularly preferred embodiment the method according to the invention is characterised in that in the case of a pixel being considered which is intersected by the approximation straight line the resultant color R is determined in accordance with the following criterion:

the approximation straight line divides the pixel being considered into two surface portions $F_1$, $F_2$, wherein $F_1+F_2=1$, with 1 being the total area of the pixel, wherein $F_1$ is that surface portion in which the pixel center point lies;

mixed to color C of the pixel being considered is the color X of that adjacent pixel which adjoins the longest edge, formed by the raster, of the surface portion $F_2$.

In accordance with a particularly preferred embodiment the method according to the invention is characterised in that the resultant color R arises out of the original color C of the pixel being considered and the mixed color X of an adjacent pixel in accordance with the following equation:

$$R=F_1 \times C + F_2 \times X$$

In accordance with a particularly preferred embodiment the method according to the invention is characterised in that the surface portions $F_1$, $F_2$ are approximated by a suitable approximation process.

In accordance with a particularly preferred embodiment the method according to the invention is characterised in that said method steps are applied to an image portion treated by means of rendering and/or a shading process.

In accordance with a particularly preferred embodiment the method according to the invention is characterised in that the shading/rendering is triangle- or scanline-based, or that it involves Gouraud or Phong shading.

In accordance with a particularly preferred embodiment the method according to the invention is characterised in that the above-specified method steps a) through e) are carried out individually or in groups in time-displaced relationship.

In accordance with a particularly preferred embodiment the method according to the invention is characterised in that the time displacement is at least one image line.

In accordance with a particularly preferred embodiment the method according to the invention is characterised in that processing is effected in time-displaced relationship in a frame buffer without further intermediate storage.

In accordance with a particularly preferred embodiment the method according to the invention is characterised in that the approximation straight line passes over a plurality of steps of the rastered edge configuration and that the approximation straight line ends when the criteria 1) There can occur a maximum of two different step lengths, the step lengths of which may also differ by a maximum of 1.

2) Only one of the two step lengths may occur a plurality of times in succession.

3) The sequential arrangement of the numbers of the steps which are of the same length gives a number sequence in which there is alternately always a one and then any number (>0). The ones (only those at each second position) are deleted from that sequence. In the sequence obtained only two different numbers which differ by one may again occur.

4) In the sequence obtained in 3. only one of the two possible numbers may occur a plurality of times in succession.

5) By repeatedly applying rules 3. and 4. to the number sequence, it is possible to obtain an ever more global view onto the edge are checked in rising succession and at least one criterion is not fulfilled.

In accordance with a particularly preferred embodiment the method according to the invention is characterised in that the approximation straight line passes over a plurality of steps of the rastered edge configuration and that the approximation straight line ends when one of the criteria 1) There can occur a maximum of two different step lengths, the step lengths of which may also differ by a maximum of 1.

2) Only one of the two step lengths may occur a plurality of times in succession.

3) The sequential arrangement of the number of the steps which are of the same length gives a number sequence in which there is alternately always a one and then any number (>0). The ones (only those at each second position) are deleted from that sequence. In the sequence obtained only two different numbers which differ by one may again occur.

4) In the sequence obtained in 3. only one of the two possible numbers may occur a plurality of times in succession. or one of the criteria 1), 2), 3) or one of the criteria 1), 2) is not fulfilled.

In accordance with a particularly preferred embodiment the method according to the invention is characterised by the provision of a triple buffer, wherein the three resulting buffers share in cyclic interchange in parallel relationship the method steps of rendering, post-anti-aliasing and image reproduction.

In some embodiments the method according to the invention thus involves processing an original image to generate an anti-aliased rasterized image. An original image may be defined using triangles or other techniques. The original image may thus consist of various lines that define a least a portion of the original image. This original image may then be rendered to provide a rendered image (e.g., a rastered image defined by pixel data). As discussed in detail below, an edge operator may be applied to the rastered image to coarsely ascertain edges in the rastered image. From these coarsely ascertained edges, an approximation of the lines in the original image (i.e., the unrastered image) may be made. The lines in the original image (i.e., the real lines) may then be used as a basis for determining how color is to be applied to pixels in portions of the rastered image that correspond to those portions of the real image that include the real lines.

The method according to the invention accordingly follows a fundamentally different path in comparison with the state of the art. In that respect it involves the realisation that, in an image rendered in normal resolution, the troublesome edges (that also includes the described billboard and spot artefact) are recognised and eliminated.

In the rasterization of a triangle using normal scan conversion, a pixel is always colored in the color of the triangle when the pixel center point is within the triangle area, otherwise the pixel involves the background color. In that situation, the edges of the triangle involve visible jumps which severely impair the visual impression of a straight edge. In accordance with the method of the invention a mixed color is now given to the pixels at the edge of the triangle, that color being between the color of the triangle and the background color. In this respect the surface covering of the pixel is used as a criterion. By virtue of this procedure it is possible to avoid all unwanted step effects whereby the quality of the image is markedly enhanced.

Therefore the covered surface of the individual color components which in conventional anti-aliasing methods is determined during the rasterization operation is required for mixing of the colors. The information as to which area proportions are allotted to the individual sides of the edge can also be determined subsequently from a normally rendered image. As the decision about the setting of a pixel is always made on the basis of its pixel center point, the real edge can be really accurately reconstructed from the step sequence produced at the edge. It is then possible from the real straight line again to determine the area proportions which are allotted to the individual sides of the edge.

Now, initially only one color is available for the pixel being considered, more specifically that which occurred in the rasterization operation. In that respect, by virtue of incorporation of the adjacent pixels, the color on the other side of the edge is also additionally available insofar as a condition of spatial coherence is assumed to occur.

The resulting images of a point sampling method (rendering of the images with normal resolution) are therefore firstly subjected to edge recognition, on the basis of which edges which are perceived in the image as "stepped" are recognised in the image and then also processed.

Processing can be effected in a linear pass through the image so that the method is highly suitable for hardware implementation. The memory expenditure can generally be implemented on the chip; the triple buffer mode of operation only requires one further buffer in which the anti-aliased image is stored.

Edge recognition on the rendered image can be effected with standard edge recognition methods. The real edges can then be approximated from the edge information in a surrounding area, and those real edges serve as a basis for mixing of the adjacent pixel colors.

In order not to have to store the complete edge image, the process of tracing the steps is preferably effected in displaced relationship by some display screen lines with respect to the edge recognition. As soon as an edge has been recognised, an anti-aliased color can immediately be calculated for the current pixel.

The incorporation of some display screen lines in tracing of the edges is therefore completely sufficient to achieve a marked improvement in quality of the images. How many lines should be included can be determined in accordance with the image quality wanted and available space on the chip.

The algorithm can therefore be divided into three parts which can be individually optimized. The optimization results are passed to the respective next step.

1. Edge detection in the original image: in this respect it is essential that the jumps between two adjacent horizontal (vertical) steps can be clearly determined as only they are available as an information source in respect of the original rasterized edge.

2. Determination of the assumed position of the real edge on the basis of the edge image.

3. Determination of the area proportions or components and resulting therefrom mixing of the appropriate adjacent pixel colors in respect of the edge pixels.

Method step 1 is effected in its own pass through the image as the edge image in the surrounding area must already be known, for the following method step. Approximation of the real straight line and subsequent mixing of the colors on the other hand can be effected in one pass as it is only on the basis of the position of the straight line in that point that mixing is effected.

In contrast, the situation in regard to hardware implementation is that the complete image must already be read once out of the memory at the first pass, whereupon then the edge image (at least 1 bit per pixel) is stored in the memory. In the second pass the edges are then traced over the full length in the edge image, which results in (almost) random access to the memory, in any direction of the edge. Problems therefore arise in regard to the processing time, by virtue of the necessity for two separate passes, and the difficulty involved in access to the memory in the second pass. It will be appreciated that it is also unpleasant that an extra memory region must be available, in which the edge image can be stored, as with a size of a minimum of 400 kByte (1 bit with a display screen resolution of 2048×1536) it can be poorly held on the chip.

The method according to the invention affords the option of resolving those problems insofar as the edges are only locally traced. It is advantageous for the edges to be traced only within a local window of n×n pixels in the image. It is only in that window that the edge information has to be known, storage of the complete edge image in memory is therefore omitted.

Previous methods always operated during generation of the scenes and therefore required a high level of memory expenditure and/or amount of computing time. By virtue of the change in emphasis, it was possible for that disadvantage to be eliminated for the major part, in which respect it is possible to envisage two possible forms of use (display process, triple buffer) which can even be subsequently integrated depending on the respective rendering system present.

In comparison with other methods which permit a similar speed, the method set forth herein has the advantage that both billboards and also spot edges can be anti-aliased. Supersampling which also deals with those cases involves a much higher level of expenditure and it is not capable of real time operation at present.

The method is also scaleable; if space is still available on the frame buffer chip, the decision will be for the triple buffer mode of operation and the window size will be so adapted that the logic together with the necessary memory still just fits onto the chip.

In the triple buffer mode of operation however it is also possible to apply a method of "slicing". In that case the image to be processed is divided into s vertical stripes which are processed in succession with the normal method. Due to that procedure, an image of the width w is broken down into s stripes of a width w/s, whereby the memory requirement is reduced by a factor of s.

In order to cover the transitional regions between the individual stripes, overlap regions between the stripes of half the window width are required so that an additional memory expenditure is once again involved for each stripe but it turns out to be comparatively small. The additional processing of the transitional regions means that the image quality of the original method is maintained, but naturally the total processing time increases with each further stripe so that the number of stripes should not turn out to be too great.

Some possible detail optimizations for increasing image quality as well as precise calculation of the area proportions or optimized determination of the mix factors at the corners of an object will be described in greater detail hereinafter.

As it is not possible with the anti-aliasing method described herein to deal with those cases for which there is not sufficient information present in the point-sampled image, it is further desirable for that method to be combined with another. The ideal would be a method which deals exclusively with polygons (for example by supersampling or area sampling), whose width or height is below two pixels so that the additional expenditure is kept within limits and the capability of real time operation is not lost. The combination should in principle not give rise to any problems as, in post-anti-aliasing, only those edges which still contain marked jumps in the image are treated. The edges which are treated by another method would appear in the image precisely like filtered texture edges and accordingly would not be treated.

In order also to be able to locally approach the edge as accurately as possible, a centered window is used per pixel, that is to say, in the processing of each individual pixel of a line, there is repeatedly provided another window with edge information.

Upon displacement of the window by a pixel, the edge information would have to be freshly generated at the right edge for each pixel. In the case of a window of a size measuring 17×17, that would mean for example that 17 color or chromaticity values have to be read out of the memory and investigated in respect of association with an edge. This extreme expenditure in terms of memory bandwidth is not acceptable but it is to be noted that when processing the pixel from the next line 16 of the 17 edge values are still required. Because of that it is desirable to store the edge information until it is not required again. For each pixel therefore only one new chromaticity value ever has to be read and the edge information extracted therefrom. All other items of information are already available from the preceding lines. Accordingly with a 17×17 window the memory will only hold 16 display screen lines in respect of edge information. The memory requirement can also be implemented on-chip so that an external memory is not required.

An essential point is recognition of the edges which must be really processed as edge recognition supplies all edges in the image.

In this respect it is important to ascertain the edges which are relevant in terms of processing. An edge can therefore be so defined that it must involve an abrupt change in the signal. The decision as to whether a pixel is potentially viewed as an edge can therefore be relatively locally made.

BRIEF DESCRIPTION OF THE DRAWINGS

Other advantageous developments of the invention are characterised in the appendant claims or are set forth in greater detail hereinafter together with the description of the preferred embodiment of the invention with reference to the Figures in which:

FIGS. 24 through 66 show block representations of various structural groups of a hardware solution for implementation of the method according to the invention.

Tables 1 through 33, labeled Tab. 1–33 for convenience, show input and output conditions of the circuits, as respectively described in the description.

DETAILED DESCRIPTION OF THE INVENTION

To describe the details of the method the operating procedure of the "post-anti-aliasing" method in accordance with the invention will firstly be described in greater detail with reference to pixel representations of the edge regions to be viewed.

From the signal engineering point of view, an edge image can be obtained by convolution of the image with a mask, the sum of which is zero. The sum of the elements in the mask must give zero as it is only in that way that the steady component in the image can be removed (that is to say single-colored areas will have a value of zero in the edge image). In order to be able to secure that condition, both positive and negative elements must be contained in the mask so that the (for example) gray value image produced by convolution will include positive and negative values. In that respect the magnitude of the gray value is a measurement in respect of the strength of an edge in the pixel being considered (a value of zero therefore means that no potential edge is to be found in the pixel).

The basic starting point for determining the position of the real straight line in the method according to the invention is a binary edge image, wherein the edge can only ever be correctly found in dependence on the edge recognition operator used. Each edge operator has its properties (one/two pixel wide edges, appearance of the region between two jumps) which must be correctly interpreted in the edge image in order to obtain meaningful results.

The method described hereinafter firstly produces an edge image with 4 bits of information per pixel, the method ultimately to be put forward however operates on a binary image, that is to say only with the information edge pixel yes or no.

Figure 1:
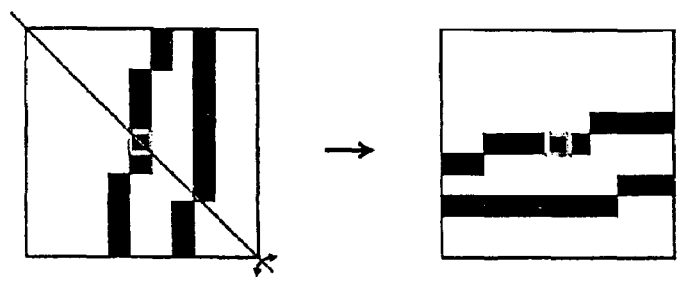
FIGS. 1 through 23 show diagrammatic views in detail of edge regions for describing the principle of the method according to the invention.

To start with a gradient discrimination operation is effected: in the case of x-dominant edges admixing of the color of the pixel disposed thereabove or therebeneath is effected, as it is only by means of them that it is guaranteed that at least one is on the other side of the edge just being considered (and is thus of a different color). The left-hand and right-hand neighbors can still be on the same side of the edge on the basis of point sampling. A corresponding consideration applies in regard to the y-dominant edges so that the conclusion that y-dominant edges should be treated just like x-dominant edges imposes itself. A possible way of jointly dealing with the cases involves the one case being returned to the other. Return is effected for each edge pixel to be handled, by a procedure whereby the portion from the edge image, which is currently being viewed, is mirrored at the main diagonal. That procedure is shown in FIG. 1. For each pixel, there are now two edge image portions available, which can still be handled in a completely identical fashion. In that respect the one results in the vertical mix factors and the other results in the horizontal mix factors. Each edge image portion consists of two bits of information as only the information "positive or negative horizontal" edge is required for tracing the x-dominant edges (in a corresponding fashion, only the information "positive or negative vertical" edge is required for tracing the y-dominant edge).

The edge is referred to as "positive" or "negative" respectively when the difference in the amounts of the color vectors present in the color space of the two colors adjoining each other in the image, in the respectively selected viewing direction, is positive or negative respectively.

Figure 2:
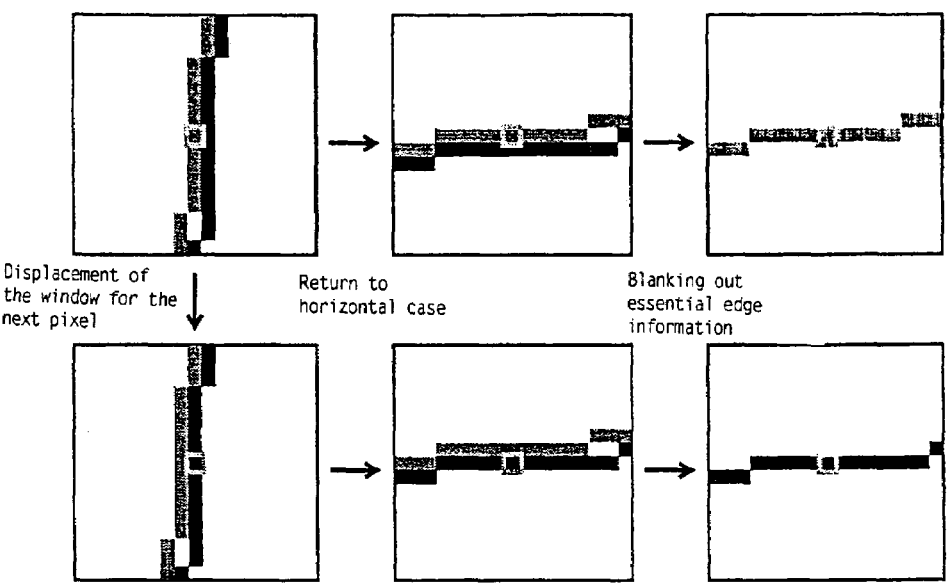

Starting from the pixel which is currently to be considered, the correct information is now blanked out of the two bits which are still present. If the central pixel is marked as positive, then only positive edge pixels are also taken into consideration in the surroundings in order actually only to trace the positive edge; in a corresponding fashion, if the central pixel is marked as negative, only negative edge pixels are considered. Thus, in the example of a vertically disposed flagpole the troublesome negative and positive edge respectively is omitted and both cases can be correctly handled, as shown in FIG. 2. Shown herein is the treatment of two mutually juxtaposed edges which, after being returned to the horizontal case by rotation, are subjected to further processing as x-dominant binary images. If however the central pixel is marked as positive and negative, that means that the situation involves the special case in which adjacent colors have the same color vector length and OR-linking of the two items of information per pixel occurs.

From now on therefore further operation is implemented with a binary edge image portion in which only x-dominant edges are still marked, that is to say the angle of the straight line to be recognised is between −45 and +45°.

In order to be able to extract real straight lines from the present edge image, it is firstly necessary to ascertain how the illustrated pixels were generated.

The geometry description of a scene illustrated in an image is effected almost exclusively on a polygon basis as polygons can be most easily handled. Further possible forms of representation such as B-splines (specifying only support locations of the surface), voxel models (description of the complete volume of the object) and CSG-trees (structure of the object from geometrical primitive) are scarcely used as representational methods derived therefrom for rasterization are too complex for them to be implemented in hardware terms.

The hardware-implemented polygon renderers mostly involve triangle renderers as it is only in regard to triangles that it is guaranteed that the polygon remains flat after transformation (rotation, scaling, translation), which is not always the case with general polygons by virtue of the limited computing accuracy of the computers.

The triangles, described by the three corner points and parameters (z-value, texture coordinates, normals etc.) at those points, are rasterized in a so-called "scanliner" and then there is allocated to each pixel on the basis of the interpolated parameters a chromaticity value which is then stored in the frame buffer if the pixel is not covered by a pixel of another triangle. Our interest now lies precisely in that scanliner which decides which pixels are set and which are not.

In this respect the mode of operation of a scanliner can be described in the following terms:

Starting from the lower corner point of the triangle, the real start and end points are determined for each line, all pixels which are between those two points accordingly belong to the triangle and are represented. The decision as to which pixel is the first and the last respectively to be represented is made on the basis of the position of the pixel center point relative to the real edge. If the pixel center point is within the start and end point of that line, the pixel is set. This procedure affords at the edges characteristic step patterns which as the sole information source nonetheless express a great deal about the position of the real edge.

Figure 3:
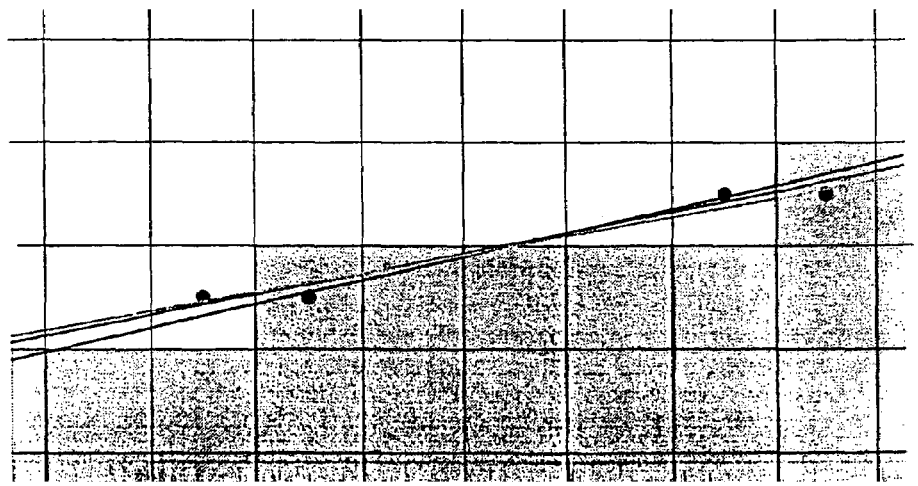

If there is one step in the image, it is then known that the real edge must extend between the two pixel center points of the differently colored pixels. This is shown in FIG. 3. If a plurality of steps are taken into consideration in that procedure, then the real edge is approached with increasing accuracy. Tracing steps is found to be more difficult in real images than initially assumed here as the image portion generally contains not only one edge but also mutually crossing edges, edges which change their gradient, as well as texture edges and noise.

Firstly only the ideal case of an existing edge in the current edge image portion is to be dealt with, in which respect there is also the further limitation that only one step of the edge is traced, expansion to a plurality of steps being effected in a later section.

Figure 4:
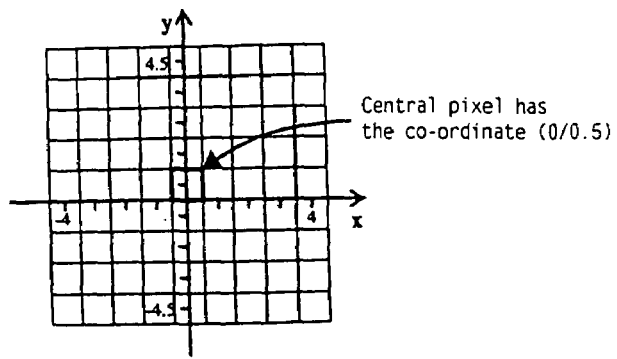

For the sake of simplicity, laid over the current window of the edge image is a local coordinate system by which all pixels can be described from now on. The central pixel has the coordinates (0/0.5); 0.5 in the y-coordinate as the difference operator assumed to apply here always marks the pixel above the color jump, while the color jump accordingly occurs precisely at y=0.0. A window of that kind is shown in FIG. 4.

If the central pixel is therefore marked as an edge, then in the current window the step is traced further towards the right or the left in order to find the next occurring jumps. There are thus two values xA and $X_E$ which identify the end points of the steps. At the end of the step there can now be in principle four different configurations.

1. Disposed inclinedly above is a further edge pixel, that is to say there is a jump upwardly (this case is referred to hereinafter as UP).

2. Disposed inclinedly beneath is a further edge pixel, that is to say there is a jump downwardly (case: DOWN).

3. There is no further edge pixel in the next column; the edge therefore stops completely here (we are probably at a corner of the object) (case: NO).

4. We are at the edge of the edge window, the step accordingly did not completely fit into the current window. This probably involves a very flat edge (case: HOR).

A prerequisite in that respect is the use of an operator which when tracing the edge supplies an edge strip of the width of only one pixel.

Figure 5:
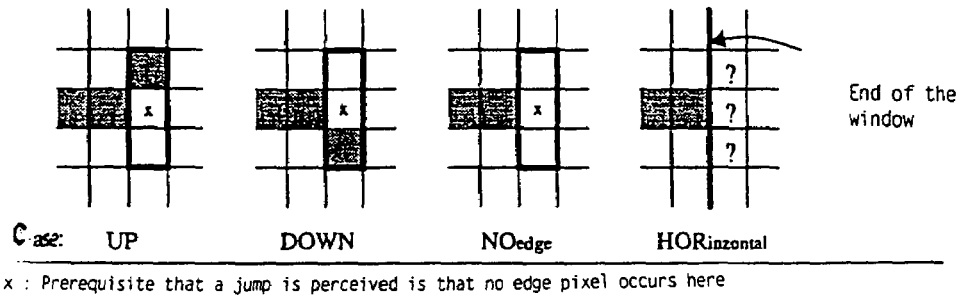

The first two cases form the normal case, the last case is unacceptable as no information about the further configuration of the edge is possible. The correspondingly marked cases are shown side-by-side in FIG. 5 (from left to right (UP, Down, NOedge, HORizontal)).

If opposite cases occur at the two ends of the step (left UP/right DOWN or left DOWN/right UP), a straight line can now already be established. The end points are at $x_{Anf}$:=xA−0.5 and xEnd:=$X_{E+0.5}$ and the y-coordinate occurs at a jump upwardly to 0.5, at a jump downwardly to −0.5.

Reference will be made to the example of an inclinedly upwardly extending edge to make it clear why the straight line was laid through the two points:

$(x_{Anf,yAnf}):=(x_A−0.5, −0.5)$ and
$(xEnd, yEnd):=(xE+0.5, 0.5)$

In that respect note is to be taken of the distinction of xA (last pixel of the stage) or xE and xAnf (point on the assumed straight line) or xEnd. On the basis of the pattern in the edge image, it is precisely known where the jump occurs between the two colors involved. This relationship is apparent from FIG. 6 which shows the association of the possible configurations of the real straight line with an edge (top left: pattern in the edge image, top right: color association of the pixels with assumed straight line), bottom left: minimum and maximum gradient, bottom right: parallel straight line. The real edge must therefore extend anywhere between the pixels which are horizontally of different colors.

Figure 6:
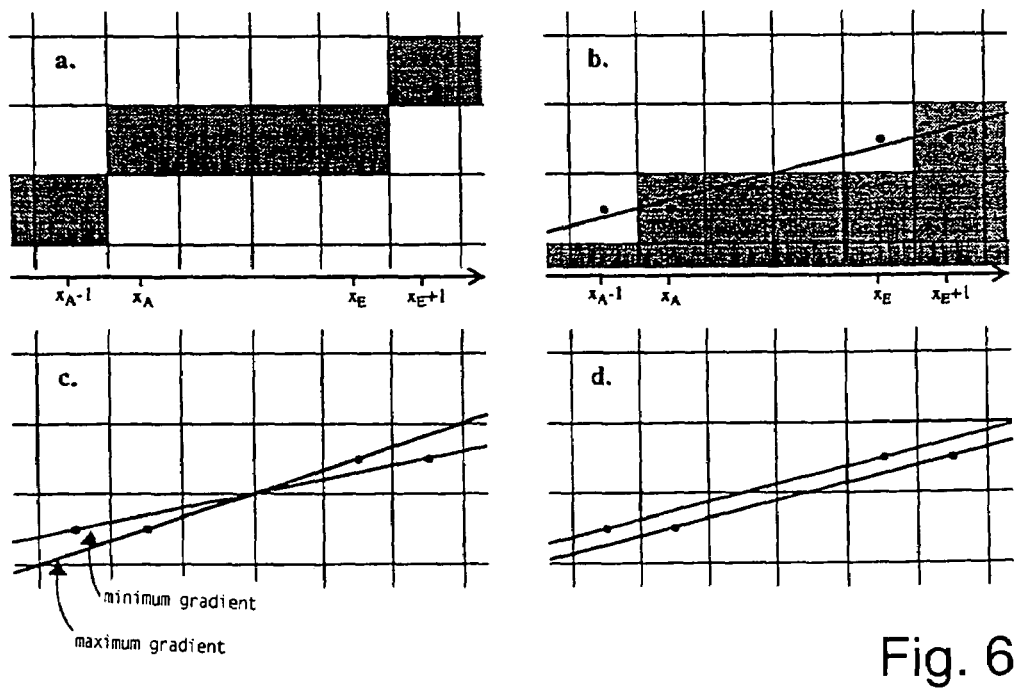

While FIG. 6 shows the possible extreme cases of the possible straight lines, the selected straight line now precisely forms a middle way between all extremes so that the error in relation to the real straight line is minimised, irrespective of which one is involved.

When dealing with the case NO in which no further edge pixel is present in the next column, allocated with the end point is the y-coordinate 0.0 as it is not apparent from the edge image why no further pixel exists. The reason can either be that a corner of the object is involved (in this case the corner appears somewhat rounded off) or however the threshold value in respect of edge image generation was not set small enough (so that the edge continues to extend anyhow, but was no longer recognised as such).

In the fourth case (HOR), special treatment must be implemented as this occurs only by virtue of the algorithm being limited to a window.

Figure 7:
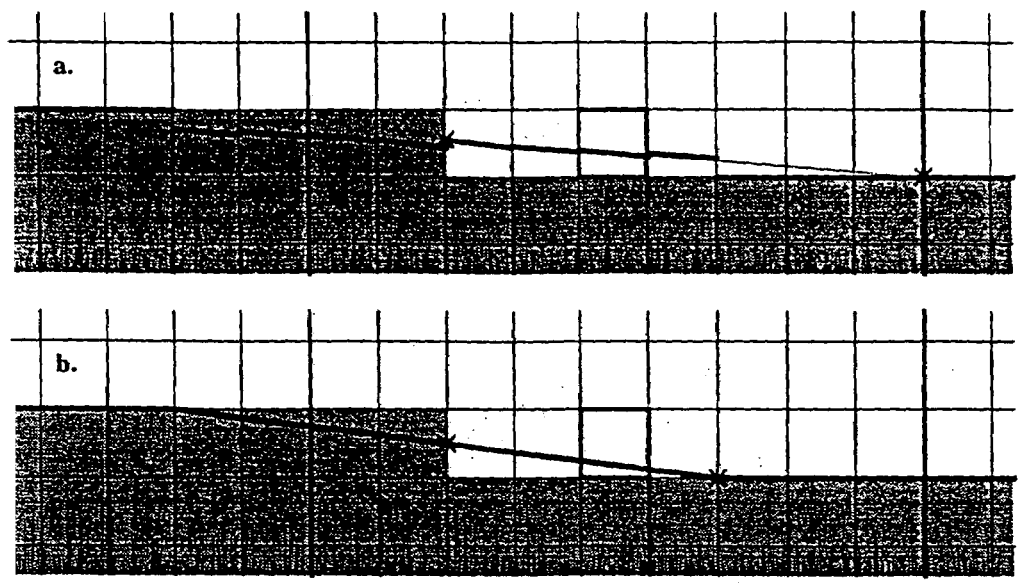

The simplest approach is for that case to be dealt with precisely like the previous ones, that is to say allocate the y-value 0.0 to the corresponding end point. This however would result in incorrect results, as is apparent from the example of FIG. 7. The straight line which arises due to that procedure is illustrated for each pixel. Upon displacement of the window the straight line produced becomes increasingly flat until it suddenly becomes horizontal as soon as the jump passes out of the window.

In principle this is also desirable but the same y-value almost always occurs for the pixel to be considered, whereby a meaningful configuration is not interpolated.

Figure 8:
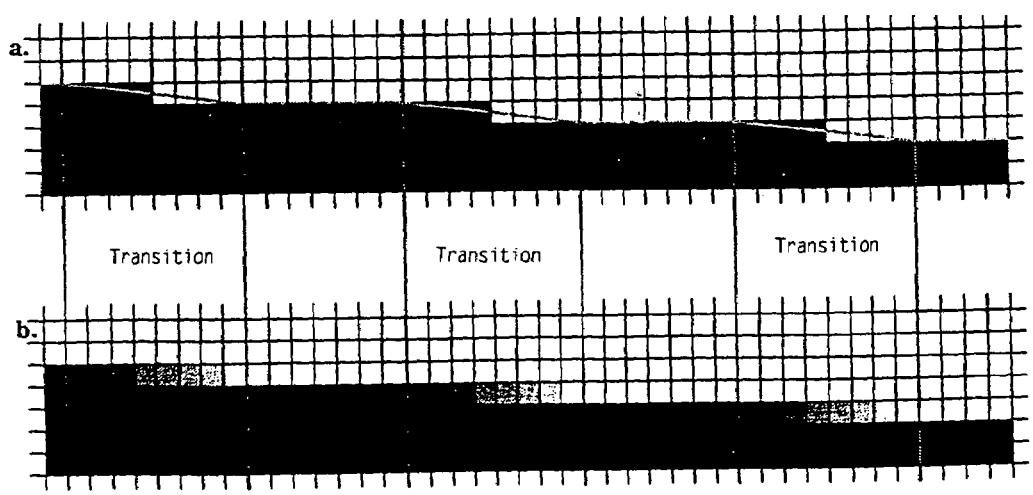

Instead, reference is made to a straight line which is identical for all pixels which still see a jump at least at one end. If there were an end point at $x_{Anf}$, then the second is fixed at $x_{end}=x_{anf}+(n−1)/2$, with n the window size (FIG. 7b). By virtue of that procedure, with very long steps (steps which no longer completely fit into the window), there are transitional regions at the initial jumps in which a color change occurs and regions in which the colors are retained. This connection is shown in FIG. 8. The larger the window is selected to be, the correspondingly wider becomes the transitional region, with the consequence that the real edge is better approximated.

Figure 9:
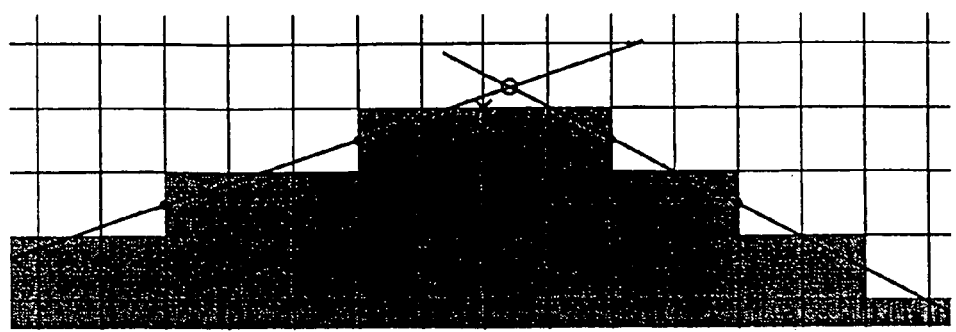

Furthermore it is possible that a jump occurs at both ends in the same direction (DOWN/DOWN or UP/UP). In that case an inclinedly upwardly extending edge becomes an inclinedly downwardly extending edge (or vice versa), and therefore in addition to the two end points there is a need for a third point which is established at $x_{mid}=(x_{end}+x_{anf})/2.0$. The middle point could be more accurately determined by tracing the respective next steps in both directions and extrapolating the middle point from the two end points thereof. That increases the quality of the image and is therefore meaningful if there is readiness to accept the increased expenditure involved in that respect. This case is shown in FIG. 9 and really rare and the results with the point assumed here look really acceptable so that the additional computing expenditure in regard to hardware implementation, is avoided.

All known special cases are brought back to the basic cases insofar as the states ascertained at the end points are converted. That can be seen in greater detail from Tables 1–3 respectively showing the straight line configurations to be traced in respect of different steps.

Figure 10:
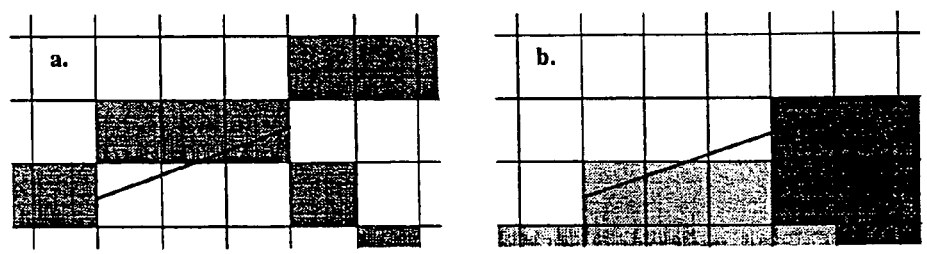

At the end of a step it can happen that both a jump upwardly and also a jump downwardly is displayed, which occurs due to two edges coming together. That case in shown in FIG. 10. In that respect, the left-hand part of the Figure shows the edge image while the right-hand part shows the initial situation which resulted in the image shown on the left. The best solution for this case is found to be consideration of the opposite status. If the opposite status is UP then the current one is set to DOWN, whereby the main edge is further interpolated. In a corresponding fashion with DOWN there is an UP for the current status. It is only if the other status does not predetermine a preferential direction (NO, HOR or also UP/DOWN), that the status is set to NO and thus interpolation at that end is not effected.

Figure 11:
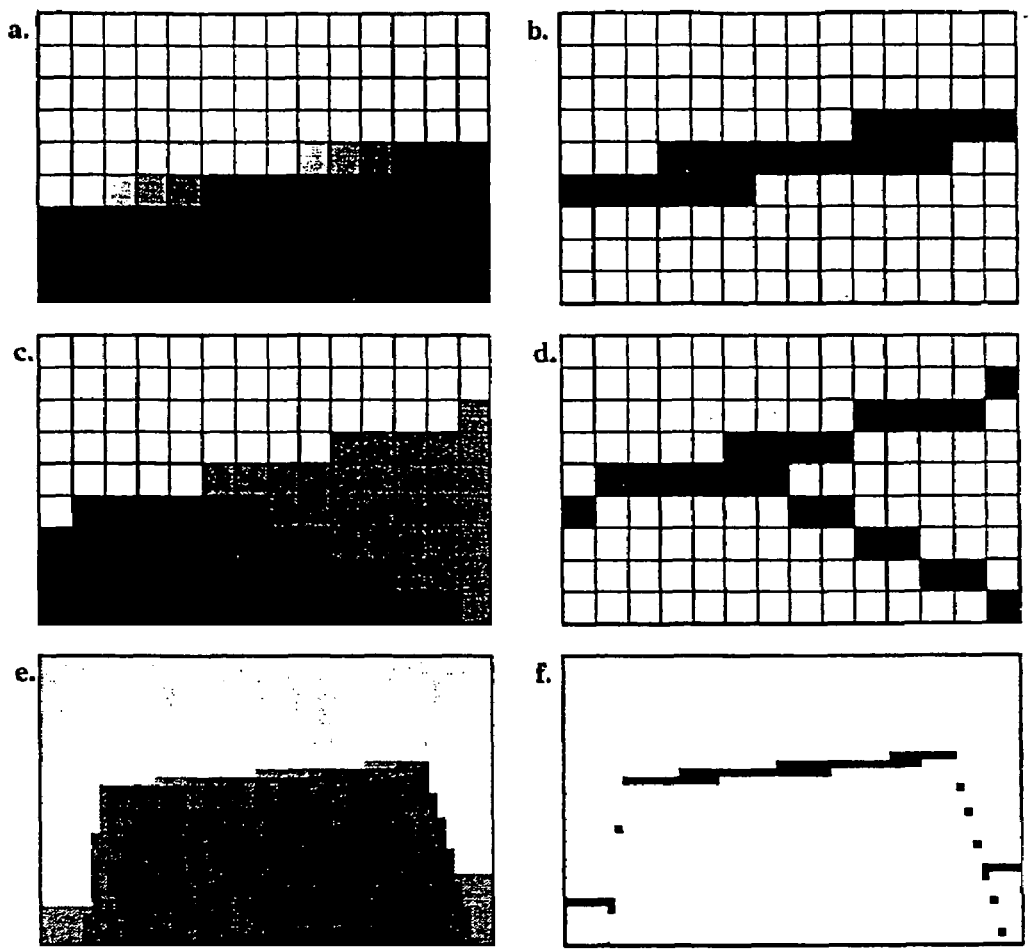

Texture edges become recognisable by virtue of the fact that between the steps there is a region in which two pixels in the edge image are set one above the other (FIG. 11 b). Texture edges are not subject to further treatment as the binary image does not have any information whatsoever about the actual color configuration at the edge; the result of more recent interpolation would therefore always result in the appearance being worsened. It is however also possible to give other reasons why pixels are set one above the other between two steps, for example also in the case, which has already been considered, of two edges which converge to a point. This case is shown in FIG. 11c. FIG. 11 generally shows the cases which result in "two mutually superposed pixels" in the edge image. Processing must nonetheless be effected in this case. Both cases can be meaningfully dealt with by virtue of conversion of the status to NO at the end where the transitional region exists. In the case of a texture edge, both statuses are in that way corrected to NO, while in the case of two edges, only the one status is converted, and then interpolation is further effected by the other.

It is found that problems are involved in the case in which no color variation at all was interpolated between the two basic colors (as occurs in a Ziff Davis' Winbench test image). The edge image can in no way be distinguished from that of a texture edge and for that reason is also not processed. That case is shown in FIG. 10*e*.

Noise is expressed in the edge image by the occasional occurrence of edge pixels which are not related to an actual edge. This case is taken into consideration in Tables 1 through 3 insofar as, if both statuses are NO, the y-value is set to zero and is thus not subjected to further treatment. Reference will be made to the example of an inclinedly upwardly extending edge to illustrate once again what differences can occur at a maximum between the assumed straight line and the real straight line.

Figure 12:
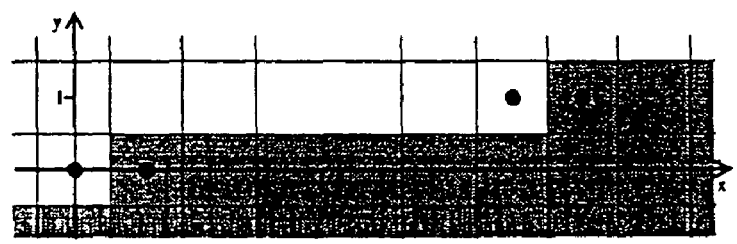

For the sake of simplicity, for considering the situation, a different coordinate system in which the zero point in the pixel is to the left of the step will be taken as the basis. This can be seen in FIG. 12.

The real straight line is therefore certain to extend between the coordinates (0,0) and (1,0) or $(x_{E,1})$ and $(x_{E+1,1})$, as otherwise there would have been different rasterization. The assumed straight line g extends through the points (0.5,0) and (xE+0.5,1), giving the straight line equation as:

$$g : y = \frac{1}{x_E} * \left( x - \frac{1}{2} \right)$$

The maximum difference between those straight lines in relation to all other possible ones is essential. The difference is only needed at the integral x-coordinates as it is only there that there are sample points. It is therefore necessary to consider the differences in relation to all possible extreme cases of the real straight line.

There are three cases (see FIG. 6):

1. Difference in relation to all parallel straight lines

If the real straight line extends parallel to the assumed one, the difference for each pixel of the step is the same. The straight line equation for the furthest downwardly possible straight line (points (1,0) and $(x_{E+1,1})$)

$$g_u : y = \frac{1}{x_E} * (x - 1)$$

affords:

$$\Delta y_1 = |g - g_u| = \frac{1}{2 * x_E}$$

as the difference at each x-value.

The straight line equation for the furthest upwardly disposed straight line (points (0,0) and $(x_{E,1})$):

$$g_0 : y = \frac{1}{x_E} * x$$

affords:

$$\Delta y_2 = |g_0 - g| = \frac{1}{2 * x_E}$$

as the difference at each x-value.

2. Difference in relation to the straight line of maximum gradient

The straight line of the maximum gradient extends through the points (1,0) and $(x_{E,1})$ and is described by:

$$g_M : y = \frac{1}{x_E - 1} * (x - 1)$$

$$\Delta y_3(x) = |g_M - g| = \left| \frac{1}{(x_E - 1) * x_E} * \left( x - \frac{1}{2} * x_E - \frac{1}{2} \right) \right|$$

The maximum difference will occur furthest outwardly as it is there that the straight lines increasingly diverge, and therefore the x-values $1(\Delta y_3(1)=\frac{1}{2}x_E)$ and $x_E(\Delta y_3(x_E)=\frac{1}{2}x_E)$ are inserted into equation 10, thereby giving the maximum difference:

$$\Delta y_3 = \frac{1}{2 * x_E}$$

3. Difference in relation to the straight line of minimum gradient

The straight line of minimum gradient extends through the points (0,0) and $(x_{E+1,1})$ and accordingly the straight line equation reads as follows:

$$g_m : y = \frac{1}{x_E + 1} * x$$

$$\Delta y_4(x) = |g_m - g| = \left| \frac{1}{(x_E + 1) * x_E} * \left( -x * \frac{1}{2} * x_E + \frac{1}{2} \right) \right|$$

In accordance with the same considerations as in point 2, that gives the maximum differences at 1( ) and $x_E$( ), thereby giving the maximum difference:

$$1 \left( \Delta y_4(1) = \frac{(x_E - 1)}{2 * (x_E + 1) * x_E} \right) \text{ and } x_E \left( \Delta y_4(x_E) = \frac{(x_E - 1)}{2 * (x_E + 1) * x_E} \right)$$

Figure 13:
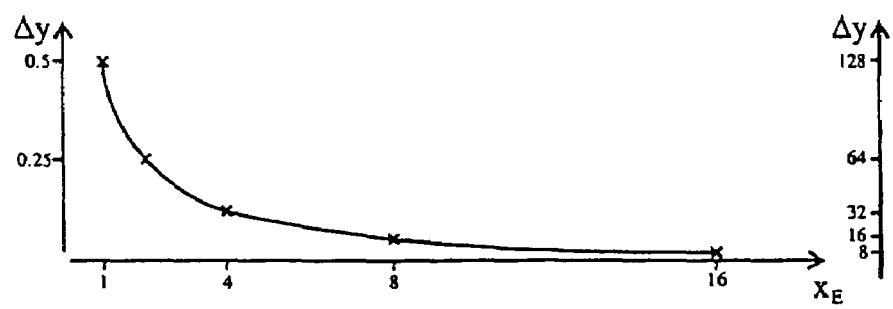

As is apparent from the foregoing equations, the maximum difference in relation to the straight lines $\Delta y = x \frac{1}{2} x_E$. FIG. 13 gives the maximum deviation in dependence on the step length $x_E$. For long steps the assumed straight line practically corresponds to the real one, whereas for short steps ($x_E$<4) there are scarcely acceptable differences if the limit ca se of an edge between white and black is taken as the basic starting point.

An improvement is achieved if, instead of only over one step, the edge is traced over a plurality of steps as in that way it is possible better to approximate the real straight line. With a fixedly predetermined window size, in the case of short steps, it is possible to effect interpolation over many steps, while when dealing with long steps it is generally only possible to interpolate one step, which goes towards the form of the difference function. In the case of very long steps which no longer completely fit into the current window, the attempt is no longer made to follow the real straight line as the information is locally missing for that purpose so that, as from a step length which goes beyond the window width, each step experiences the same interpolation (FIG. 8). The window should therefore be selected to be as large as possible in order to avoid that effect; with a window of the size of the actual image, that error no longer occurs at all. However, excessively large window sizes are in conflict with the actual idea of the algorithm so that a compromise has to be found between the two extremes.

Figure 14:
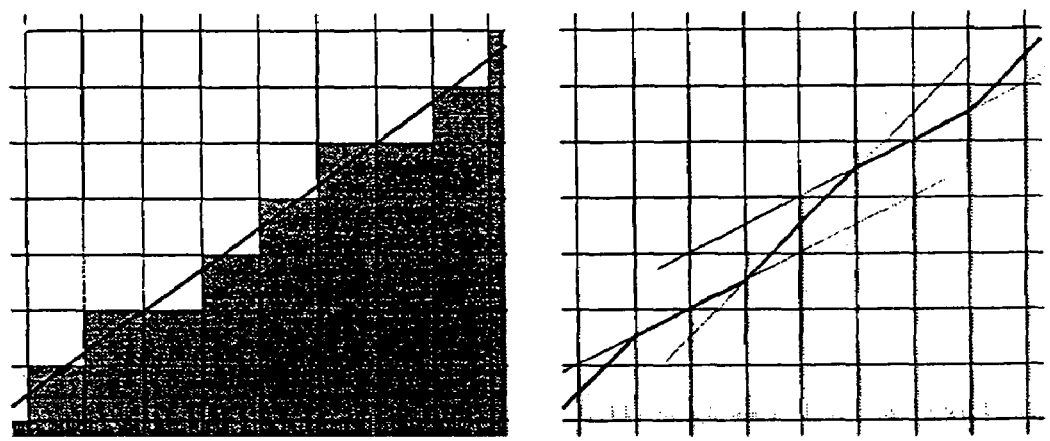

When tracing only one step, as indicated the problem occurs that short steps result in a very inaccurately approximated straight line. That becomes particularly striking when rasterization of an edge near 450 is considered, in which "one-pixel long" and "two-pixel long" steps occur alternately (FIG. 14). In the case of the "one-pixel long" steps, a straight line of the gradient 450 is applied, whereas the "two-pixel long" jumps involve a straight line of the gradient:

$$\arctan\frac{1 \text{ (steps in } y\text{-direction)}}{2 \text{ (steps in } x\text{-direction)}} \approx 26.6 \text{ degrees}$$

By virtue of tracing a plurality of steps it is possible for the plurality of possible straight lines (gradient between 26.6 and 45°) to be limited to a small range, as the end points of the straight line to be applied move increasingly further apart and thus the straight line is increasingly accurately described.

A plurality of steps however are not always traced, but only when the statuses at the ends of the central step (step to which the pixel currently being considered belongs) indicate opposite directions of the jumps (that is to say UP/DOWN or DOWN/UP) as it is only in those cases that a "benign" edge is involved, which is worth more accurate approximation.

If one of the statuses is NO, then that end point is already established as no further steps exist in that direction. That end point however does not in any way have to lie on the real straight line so that when tracing the edge in the other direction, the gradient can admittedly be more accurately determined, but the start point of the straight line and thus the area component or proportion to be calculated do not coincide.

At any event the end status HOR involves a very shallow edge. As not even the central step fitted into the current window, no other step is also guaranteed to be completely visible.

Figure 15:
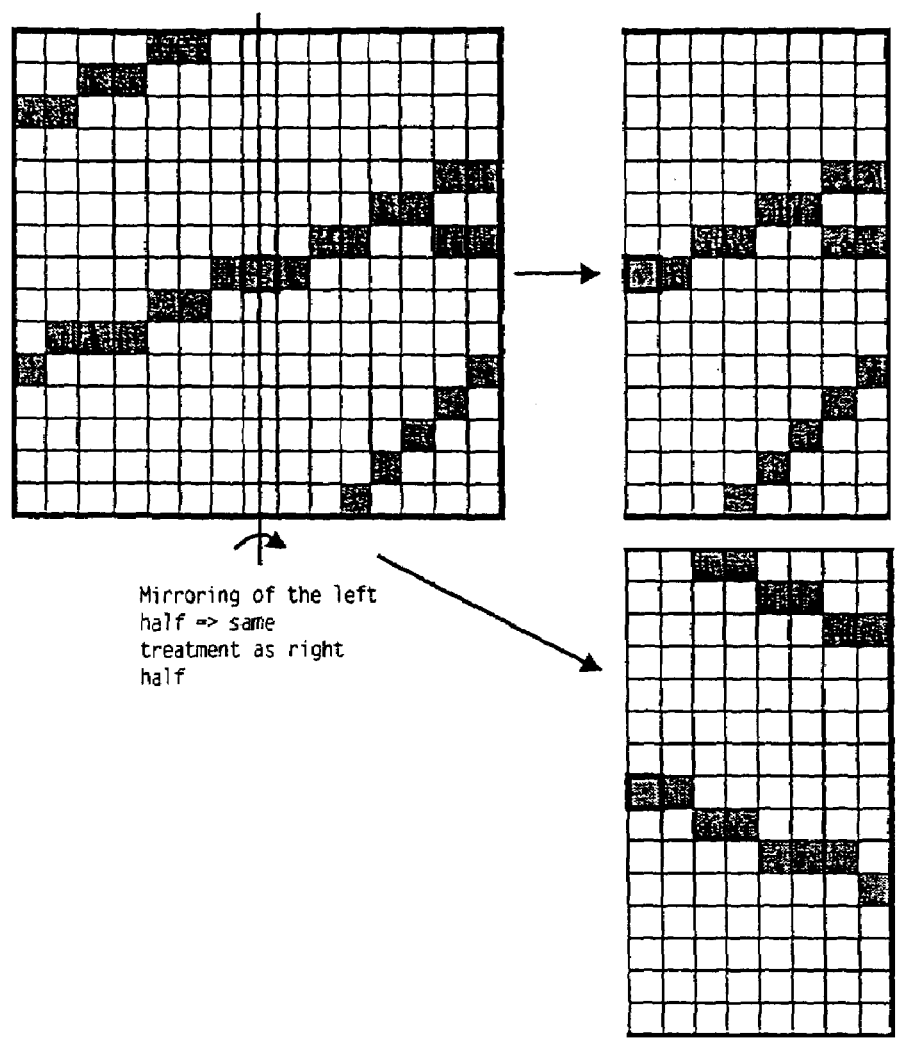
Figure 17:
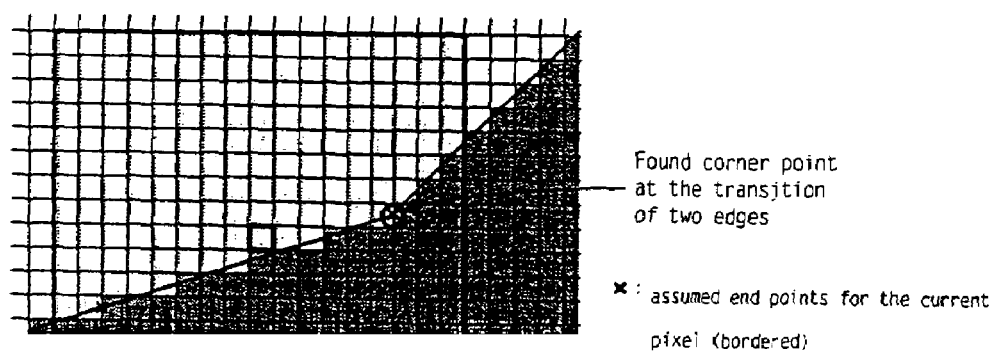

A prerequisite for further treatment is that processing is effected symmetrically so that the case "trace steps towards the left" is returned to the case "trace steps towards the right". The endeavour is also made to extract the steps from half the window (only the right-hand side is required) by means of the position of the end point of the central step and the status at that location (see FIG. 15).

If a jump occurs upwardly, the attempt is made one line higher to find again a step that is as long as possible; in a corresponding fashion, in the case of a jump downwardly, operation is implemented one line lower. At the end of the step the status is then once again established and if the status is the same as at the end of the central step, the attempt is now made to trace the next step. Only those steps which still fit completely into the window are of further interest. As a result, that gives a number of steps together with their respective lengths. At first sight the method appears really expensive, but each column of the edge window only has to be considered a single time.

Figure 16:
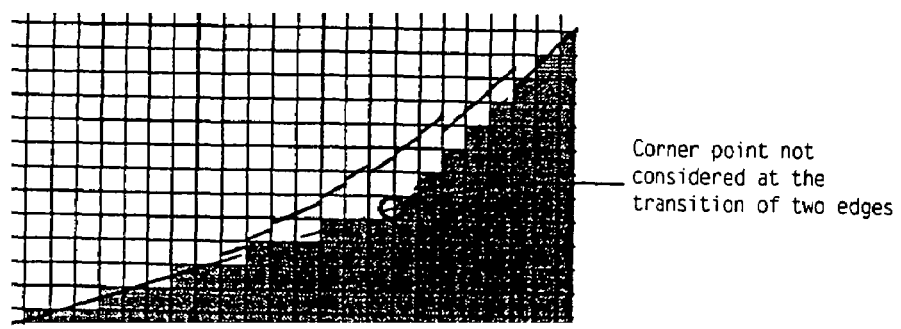

The simplest approach would now be to establish the respective end points of the last steps as points on the approximated straight line, but this gives completely false results in some cases. For example the case of two edges of different gradients is not correctly handled. By virtue of the method outlined herein, the corner between the two edges would not be perceived and thus interpolated away, while there is not even a continuous change but repeatedly jumps (FIG. 16). The situation appears to be even less appropriate in regard to the rasterization of a circle which in principle can be composed of a plurality of edges, the gradients of which gradually alter. In this case interpolation would even be effected over a plurality of corners.

In the case of rasterization by scan conversion, characteristic jump patterns occur at an edge, and such patterns must be maintained. If one of the rules is no longer valid for a jump, it can be assumed that this jump belongs to another edge and thus the corresponding step can be eliminated.

Rules in the rasterization of an edge:

1. There can occur a maximum of two different step lengths, the step lengths of which may also differ by a maximum of 1.

2. Only one of the two step lengths may occur a plurality of times in succession.

3. The sequential arrangement of the numbers of the steps which are of the same length gives a number sequence in which there is alternately always a one and then any number (>0). The ones (only those at each second position) are deleted from that sequence. In the sequence obtained only two different numbers which differ by one may again occur.

4. In the sequence obtained in 3. only one of the two possible numbers may occur a plurality of times in succession.

5. By repeatedly applying rules 3. and 4. to the number sequence, it is possible to obtain an ever more global view onto the edge.

The smaller the window being considered is selected to be, the less is it necessary to observe the above-specified rules as only very few steps fit into a small window and thus there is not sufficient information available for all rules. In the hardware implementation described herein by way of example, a window size of 17×17 was selected, in regard to which only the first two rules were implemented as the third rule would be applied only in very few cases and the differences are so marginal that the increased complication and expenditure is not justified. In the software implementation described hereinafter, which is designed for any window sizes, rules up to and including No 4 would be taken into consideration.

Starting from the central step, in each case a step is always successively added towards the right or towards the left, in relation to the steps being considered. If a rule is no longer satisfied for one of the added steps, the step is removed again and further searching is effected only in the other direction. If no further steps can be added on both sides (without violating the rules), that procedure is terminated and the end points of the straight lines to be applied can be determined from the steps.

If the last steps at both ends are completely used, that gives the problem that, upon displacement of the window by a pixel, it can happen that a step no longer fits into the window at the left-hand edge and at the same time a new step is added at the right-hand edge, which results in a relatively severe change in the assumed straight line.

Figure 18:
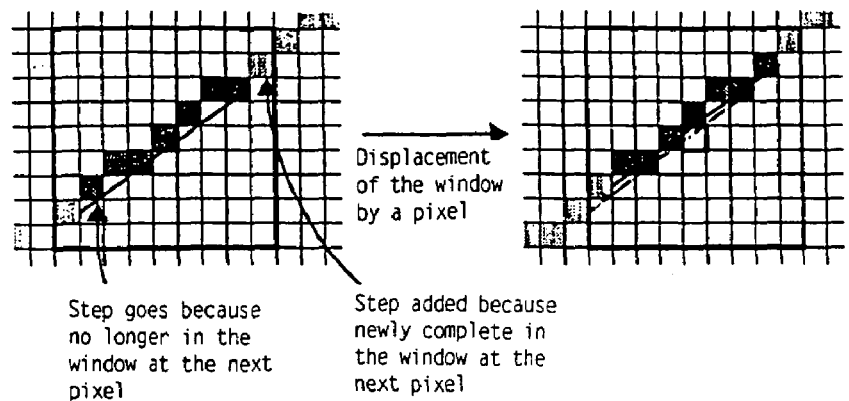

FIG. 18 shows how the displacement of the window by a pixel towards the right results in a new step and a step which is eliminated.

Figure 19:
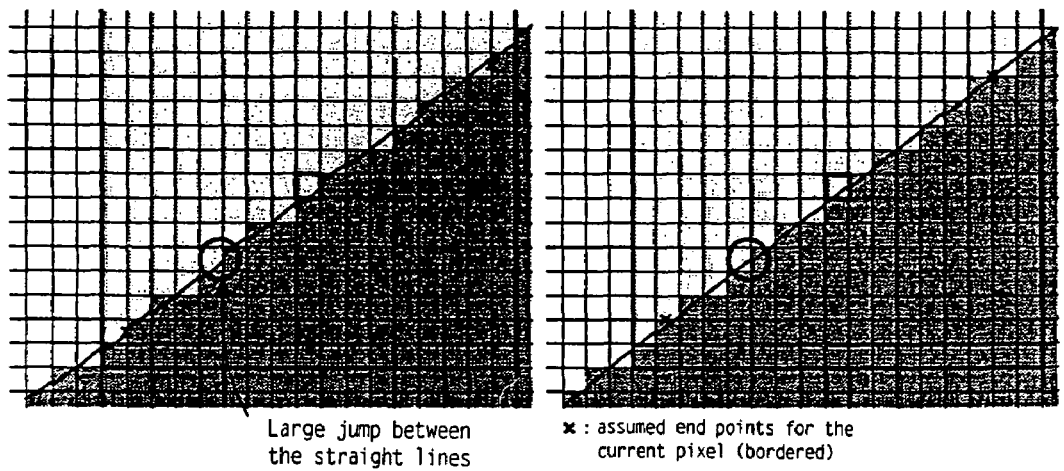

That effect can be avoided if the last steps are only half-used, that is to say half the length is added to the x-coordinate and 0.5 to the y-coordinate. By virtue of that procedure, the abrupt addition or the abrupt omission of a step is concealed and the straight lines of adjacent pixels better adapt to each other (FIG. 19).

The method operates as set forth above on a point-sampled image and the definitive coloring of a pixel therefore arises out of its point-sampled color with admixing of the colors of adjacent pixels. Admixing of the colors is however not effected in every case. If the pixel being considered is not an edge pixel, that is to say no extreme color jumps in relation to the adjacent colors were perceived, then the original chromaticity value is adopted, which occurs in regard to about 90° of the pixels of an image. In most other cases admixing of only one adjacent pixel color is effected, more specifically that at which the color jump existed, and it is only in exceptional cases that admixing of more than two colors occurs.

The individual mix factors are determined on the basis of the straight line or lines applied per pixel, which are determined by the perceptible color jumps in the image. The admixing direction arises out of the position of the pixel with respect to the color jump. If for example a color jump to the pixel thereabove were recognised, then a mix factor in respect of that pixel is determined therefrom.

Accordingly four straight lines are necessary for determining the four mix factors from the individual directions:

1. If the pixel thereabove in the edge image is marked as horizontal that involved a color jump in relation to the current pixel and a straight line is determined by that pixel, the straight line establishing the UP-mix factor.

2. If the current pixel in the edge image is marked as horizontal, that involved a color jump to the subjacent pixel and a straight line is determined, which establishes the DOWN-mix factor.

3. If the left pixel is marked as vertical in the edge image, that involved a color jump in relation to the current pixel and a straight line is determined, with return to the horizontal case, which establishes the LEFT-mix factor.

4. If the current pixel is marked as vertical, that involved a color jump to the adjoining one on the right and a straight line is determined, with return to the horizontal case, which establishes the RIGHT-mix factor.

It is noticeable in regard to points 1 and 3 that the current pixel had not been marked at all as an edge pixel. That is because the difference operator only ever marks pixels which are either to the left (for the vertical operator) or above (for the horizontal operator) the color jump. In both those cases the current window must therefore be displaced by a pixel upwardly (in case 1) or by a pixel towards the left (in case 3) so that the method set forth hereinafter can be applied as it is there assumed that the central pixel includes an edge pixel from which the straight line is to be traced.

The coordinate system in which the start and end points of the straight lines are established was so defined that the x-coordinate of the point being considered is zero and the color jump occurs precisely at the y-coordinate zero.

The straight line was defined by the two points $(x_{Anf}, y_{Anf})$ and $(x_{End}, y_{End})$ and thus the general straight line equation reads as follows:

$$y = \frac{y_{End} - y_{Anf}}{x_{End} - x_{Anf}} * (x - x_{Anf}) + y_{Anf}$$

In order to extract the mix factor from that straight line, there are in principle two different methods.

By inserting the x-value 0, that gives the point of intersection of the straight line with the y-axis:

$$y_{Real} = -\frac{y_{End} - y_{Anf}}{x_{End} - x_{Anf}} * x_{Anf} + y_{Anf}$$

If the y-value is greater than 0.0 but less than 1.0, the pixel, at the coordinate (0/0.5) must experience admixing from the subjacent pixel. If the y-value is less than 0.0 but greater than −1.0, the pixel at the coordinate (0/−0.5) is mixed away with the chromaticity value thereabove. In that respect the magnitude of the y-value specifies how much is to be admixed. It is to be clear from consideration of two special cases why that was fixed in that way. If the y-value is precisely 0, the straight line passes precisely between the two pixels, and therefore each pixel belongs fully to the respective color side. If however the y-value is almost 0.5, then the upper pixel belongs only 50% to the upper color half, but completely involves the color of the upper color half, as the image was in fact the result of a point sampling method. The y-value now marks where the actual color jump should have taken place if a greater degree of resolution had been selected vertically. Due to the mixing effect the pixel now acquires a color on the basis of the area proportions between the two extreme colors.

If the magnitude of the y-value is between 0.5 and 1.0, then on the basis of the straight line the pixel should already be of the other chromaticity value, but in accordance with the edge image it is not. This can be brought about by the assumed straight line not exactly corresponding to the actual edge. Nonetheless factors up to 1.0 are allowed if adjacent pixels are also interpolated in accordance with the allegedly incorrect straight line and if the mix factor were limited to 0.5, a break in the fully interpolated edge would be perceptible. In the case of a value over 1.0 (in corresponding manner below −1.0) the pixel is completely changed in color at the coordinate (0/0.5) and the pixel thereabove (0/1.5) would also have to be still partially changed in color, which however is not done as then the edge would be too remote from the real one. Those three cases are shown side-by-side in FIG. 20.

Figure 20:
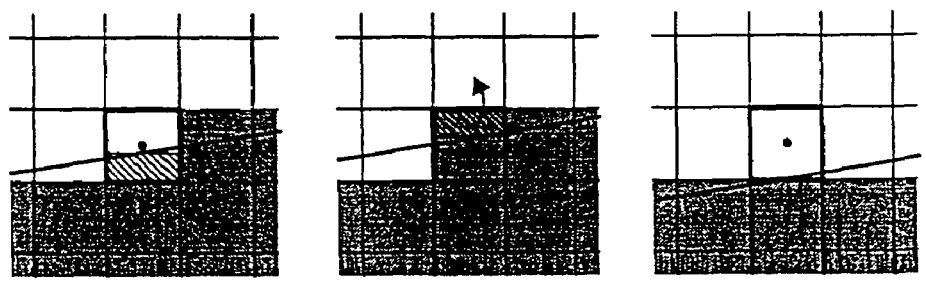

The second method supplies more accurate results. In this case, on the basis of the position of the straight line with respect to the pixel center point, the precise area proportion which is beneath the straight line is determined (FIG. 20).

If the straight line is beneath the pixel center point, then in accordance with the area proportion beneath the straight line the chromaticity value of the pixel therebeneath is admixed, as then the color jump to the pixel therebeneath existed. In the other case in accordance with the area proportion above the straight line the color of the pixel thereabove is admixed.

Figure 21:
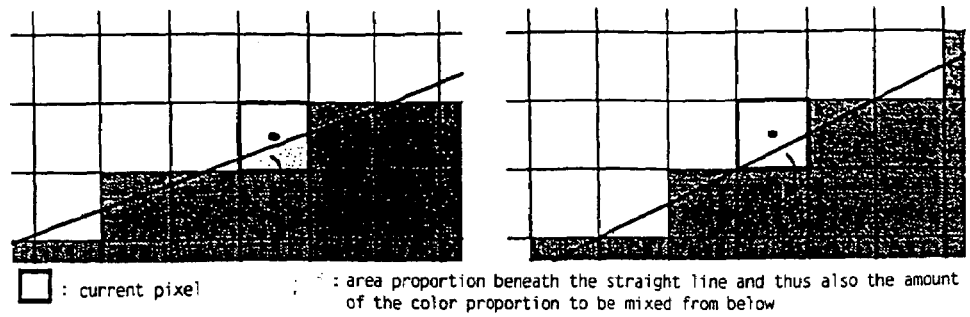

The area proportions may be determined by means of a table look-up in which it is only the gradient of the straight line and the spacing of the straight line relative to the pixel center point that are involved. The method can therefore be really well implemented in hardware terms and thus represents an expansion option in respect of the algorithm set forth here, with which a higher degree of accuracy can be achieved, but involving a higher level of hardware expenditure as additional tables are required (FIG. 21).

Figure 22:
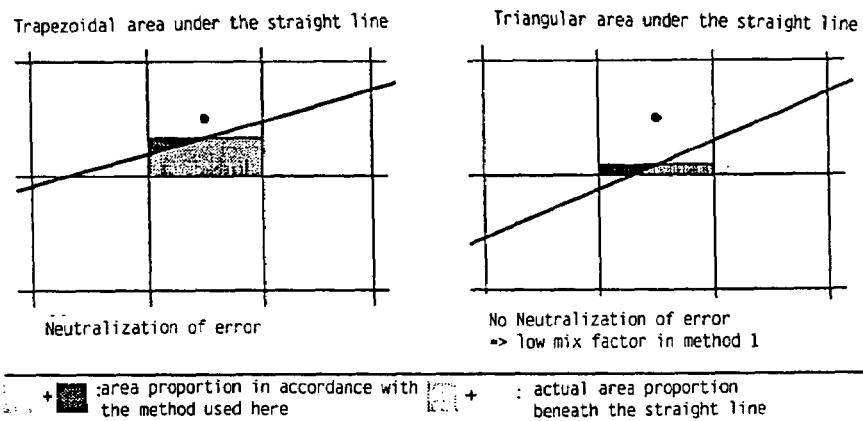

A difference of substance in regard to the two methods occurs only in the case of a triangular area beneath the straight line. In this case method 1 supplies a mix factor which is too small. If the situation involves a trapezoidal area, both methods give precisely the same results as the triangle which was excessively calculated precisely cancels out the triangle which was calculated too little (FIG. 22, left).

Problems are found to be involved in determining the mix factor for the central pixel. If only horizontal mix factors (that is to say UP and DOWN) or only vertical mix factors (LEFT and RIGHT) are not equal to zero, the central mix factor is:

$$\text{mix}_{center}=1-\text{mix}_{up}\text{mix}_{down}-\text{mix}_{left}-\text{mix}_{right}$$

Figure 23:
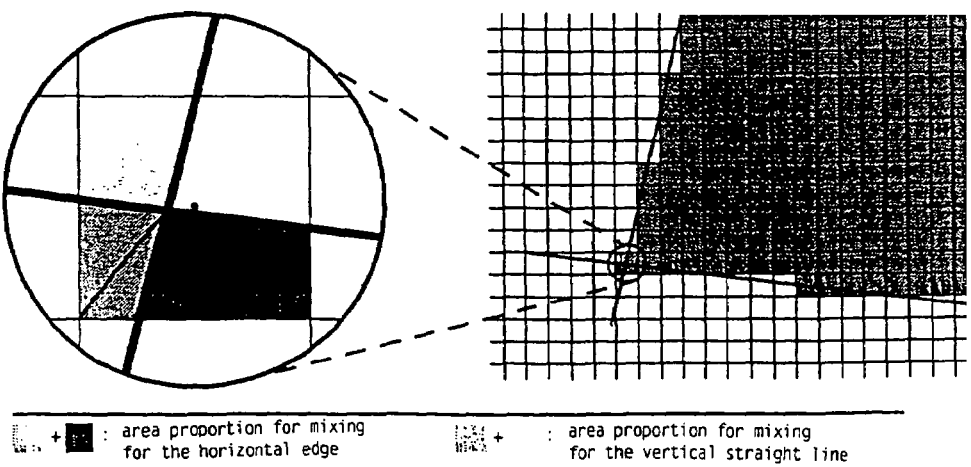

The two opposite mix factors (UP/DOWN and LEFT/RIGHT) give when counted together a maximum of 1.0 so that the central mix factor also lies in the range of between 0.0 and 1.0. If however there are vertical and horizontal mix factors, that is no longer guaranteed. The problem arises due to the fact that in this case the factors no longer behave in a complementary manner. FIG. 23 contains a corner of an object, in respect of which this is to be clearly shown. The vertical edge specifies that a given percentage of left pixels is to be admixed, and the same applies for the horizontal edge in regard to the lower pixel. The two areas which lead to the mix factors however have a common area which would have to be notionally separated and only a part of that area is added to that factor.

This more precise consideration only makes sense if the mix factors also relate to the actual area proportions. As this is not embodied in the implemented method, in this case once again an approximation is introduced, insofar as all factors are halved in the case of vertical and horizontal mix factors.

$$\text{mix}_{center} = 1 - \frac{\text{mix}_{up}}{2} - \frac{\text{mix}_{down}}{2} - \frac{\text{mix}_{left}}{2} - \frac{\text{mix}_{right}}{2}$$

This procedure again ensures that the central mix factor is in the range of between 0.0 and 1.0. The approximation used is very rough but the errors is not perceived in the image as the corner of an object represents a discontinuity and as a result the color error which occurs is not striking.

For the color mixing operation interpolation must be effected between or more colors in order to obtain an intermediate color. That interpolation can be carried out in any color space (as all can be transformed one into the other), in which respect the results differ to a greater or lesser extent. The differences in the colors between the RGB- and the YIQ-model are not perceptible with the naked eye. As the colors are initially present as RGB-colors and are also finally required again as such, conversion into another color model is not effected and interpolation is completed in the RGB-color space.

Color mixing of a pixel is finally effected per color channel in accordance with the mix formula:

$$col_{center}^{new}=mix_{center}*col_{center}^{old}+mix_{up}*col_{up+mixdown}*col_{down}+mix_{left}*col_{left}+mix_{right}*col_{right}$$

wherein on the right-hand side of the equation the colors (col) originate from the original image.

As the method only has recourse to information from images which are in the finished rendered condition and which are in the frame buffer, implementation as a standalone program was preferred, that is to say the program is called up by the command line with an image in any format (TIFF, PPM, BMP etc.) and writes out an anti-aliased image; there is therefore no need for a direct connection to the rendering procedure. In that way the result of the method can be tried out with various renderers which also do not have to be available as software but of which only images are present. It is equally possible to test combinations with other anti-aliasing methods which are already incorporated in the rendering procedure as not all aliasing effects can be eliminated with the algorithm involved here.

A great deal of value was laid on taking as many cases as possible back to a basic case, such as for example taking tracing of the vertical edges back to tracing of the horizontal edges, or searching the steps towards the left to searching towards the right. That procedure means that changes can be rapidly converted as it is only ever the respective basic case that changes, but not the return which had to be implemented once.

The window size is kept variable and not exclusively limited to square window sizes with a centered central pixel, but it is possible to define a specific view length for each direction. It is thus for example possible to horizontally select a relatively large portion as the edge information for the pixels is chip-internally stored. In a downward direction, as few lines as possible should be used when employed in the display process as all lines have to be stored (description in regard to hardware implementation which is set forth hereinafter).

Implementation of the post-anti-aliasing method was effected in programming language C, with particular value being put on variability. It is possible to switch over between various alternative forms of the algorithm by command line parameters; thus not only are all preliminary steps of the definitive version available, but also various additional test implementations such as for example various options in terms of image edge generation over the Manhattan distance or the square distance. The preliminary stages of the definitive algorithm served for comparison in respect of what gain in quality the individual incorporated features such as tracing a plurality of steps instead of one or using only half of the respective last step caused. Thus it was possible always to make improvements at the locations at which the visual impression of the anti-aliased images still left something to be desired.

The pseudoalgorithm for the method is represented as follows (variables in bold are the respective result values):

```
PostAnti-aliasing(Image pic, Image result) {
    generatedEdgePic(pic, edges) ;
    for y in 0 . . . (pic.height−1) {
        for x in 0 . . . (pic.width−1) {
            if isEdgePixel(x,y) {
                cutActualWindows (edges, edgeWindow) ;
                computeMixFactorsHorizontal(x, y ,edgeWindow,
```

```
            mix_up, mix_down) ;
        transformVerticalToHorizontal(edgeWindow) ;
        computeMixFactorsHorizontal(x, y ,edgeWindow ,
            mix_left, mix_right) ;
        mixColors(mix_up, mix_left, mix_right,
            mix_down, pic[x,y-1], pic[x-1,y],
            pic[x,y], pic[x+1,y], pic[x,y+1],
            mixedColor) ;
        storeColor(mixedColor , result[x,y]) ;
    } else {
        storeColor(pic[x,y] , result[x,y]) ;
    }
  }
 }
}
```

In is EdgePixel( ) a test is made to ascertain whether the pixel (x,y) is marked as an edge, the pixel (x,y−1) is marked as a horizontal edge or the pixel (x−1,y) is marked as a vertical edge in the edge image; it is only then that a further treatment has to be effected, otherwise the old chromaticity value is simply transferred into the new image by means of storeColor( ).

In generateEdgePic( ) the edge image is generated by means of the described method. In cutActualWindow( ) the window which serves as an environment for the current pixel is cut out of the edge image. That is necessary as only a limited environment is available in the later hardware as the edge image is generated on-the-fly and not as here previously.

The function computeMixFactorsHorizontal( ) is called up both for the horizontal mix factors (mix_up and mix_down) and also for the vertical factors (mix_left and mix_right). That is possible as the current edge window is so converted by means of transformVerticalToHorizontal( ) that the formerly vertical edges can now be traced horizontally.

```
computeMixFactorsHorizontal(x, y, edgeWindow ,
        mix_up, mix_down) {
    if isEdge(x,y) {
        maskRightEdgeType(edgeWindow, binWindow) ;
        getPositionInEdge(binWindow, xAnf, yAnf,
                statAnf, xEnd, yEnd, statEnd) ;
        mixFactor(xAnf ,yAnf, statAnf, xEnd, yEnd,
                statEnd, mix_down) ;
    } else {
        mix_down = 0;
    }
    if isEdge(x,y-1) {
        translateWindow(edgeWindow) ;
        maskRightEdgeType(edgeWindow, binWindow) ;
        getPositionInEdge(binWindow, xAnf, yAnf ,
                statAnf, xEnd, yEnd, statEnd) ;
        mixFactor(xAnf, yAnf, statAnf, xEnd, yEnd,
                statEnd, mix_up) ;
    } else {
        mix_up = 0 ;
    }
}
```

By means of isedge( ) a test is made to ascertain whether at the corresponding location in the edge window there is an edge pixel, more specifically only then is it possible to trace an edge, otherwise the corresponding mix factor is set equal to zero. In maskRightEdgeType( ) the bit which is predetermined by the central pixel of the window is blanked out of the edge window which hitherto still contained four bits per pixel so that immediately from now on further processing is with a binary image. By means of translateWindow( ) all pixels of the edge window are displaced downwardly by one pixel so that disposed in the center is the edge pixel from which the edge is to be traced in order to obtain the mix factor for the upper pixel.

In getPositionInEdge( ) both cases can now be handled in exactly the same way. In this function actual tracing of the edge in the edge image is effected, which results in the start point ($x_{Anf,yAnf}$) and end point (xEnd,yEnd) and the respective status (UP/DOWN/NO/HOR) at the ends.

On the basis of that information, the mix factor which arises out of the respective edge is then finally determined in the mixFactor( ).

In mixColors( ) firstly the mix factor which is still missing for the central pixel is determined, in which case once again various alternative forms are provided, and then actual mixing of the five colors in question is effected on the basis of the mixing formula.

The hardware implementation set forth hereinafter is an embodiment which serves primarily to illustrate the way in which the method is carried into effect. The attempt has been made to keep the solution as general as possible. Thus for example the address widths for the counters were kept variable, and also the bit widths of the mix factors, just like the table width and length of the dividers used. However, this generality could not be maintained everywhere as otherwise some modules would have become too complex. An example that may be mentioned in this respect is the module findseq( ) in which, starting from a (n×n)-window, about $n^2/8$ pixels are to be taken into consideration in order to guarantee tracing of the steps. In addition the positions of the register steps had to be restricted to a special case as a larger window means that more pipeline steps are necessary because the level of complexity rises. For the sake of clarity specific bit widths have been set forth in the block circuit diagrams of the parametrizable modules.

The following parameters and limit values were adopted for the hardware implementation:

window size: 17×17

If the window size selected is too small (about 9×9) then the image quality leaves something to be desired in relation to shallow edges as the transitional regions become very short (only 8 pixels/see in that respect FIG. 8). If however the window selected is too large, the complexity of some modules and therewith also the number of gates rises very substantially. Therefore an average window size was selected for implementation in order to arrive at a compromise between those two extremes.

maximum display screen width: 2048 pixels/line

The maximum display screen width was assumed to be 2048 pixels per line. That certainly represents an upper limit for display screen resolution for the next few years. The maximum display screen height is also fixed at 2048 lines. As the ratio of width to height is generally fixedly predetermined (1.25 or 1.33), that maximum value will thus certainly never be reached. Establishing the maximum display screen width resulted in establishing the address widths of the counters at 11 bits and the maximum length of the pipes used at 2048 elements.

bit width of the mix factors: 7 bits

That value arose out of error consideration of the maximum deviations of the mix factors from the actual value. (The maximum deviation is a maximum of 1/256 of the original mix factor. By virtue of the form of the mixing formula therefore there is a maximum deviation by 5 chromaticity values).

Establishing the mix factor width also afforded the necessary accuracy of the dividers, which were assumed to be a bit width of 9 bits.

The method according to the invention can be used both as a triple buffer and also as an interposed module in the display process (description of the two configuration options in a later section). The version using a triple buffer requires a really complex RAM controller which fetches the correspondingly necessary chromaticity values from the memory (SDRAM or another kind of memory) and writes the mixed values back again. The design of that controller would exceed the limits of this work, and for that reason this alternative configuration has been set aside. The basic system was therefor designed for the display process. By means of small alterations it is possible to convert the system for a triple buffer mode of operation, as will be described in greater detail hereinafter.

The system is designed on the basis of the pipelining principle, that is to say a fully mixed pixel is supplied in each cycle. In order to carry this into effect, a plurality of pixels are always simultaneously in the stage of being processed, as it is not possible for all necessary processing steps to be carried out in one clock or cycle (in our case 15 ns). The system operates in such a way that, with each cycle, a new chromaticity value of a pixel is taken over a fixed number of cycles later the mixed chromaticity value of that pixel is prepared as a starting value. The individual register stages are so inserted at the locations that the maximum processing time in a cycle is not exceeded. A 66 MHz cycle was selected as the clock cycle rate; the period duration is thus 15 ns. In addition a 0.35 $\mu$m CMOS-technology was adopted as in that case the display times of the individual elements were approximately known from the design of another system (Visa $^+$-system from GMD FIRST). If the system is intended for another cycle rate or technology, it will be appreciated that the register stages are shifted. The content of the pipe in dependence on the current window is shown in greater detail in FIG. 24.

Figure 67:
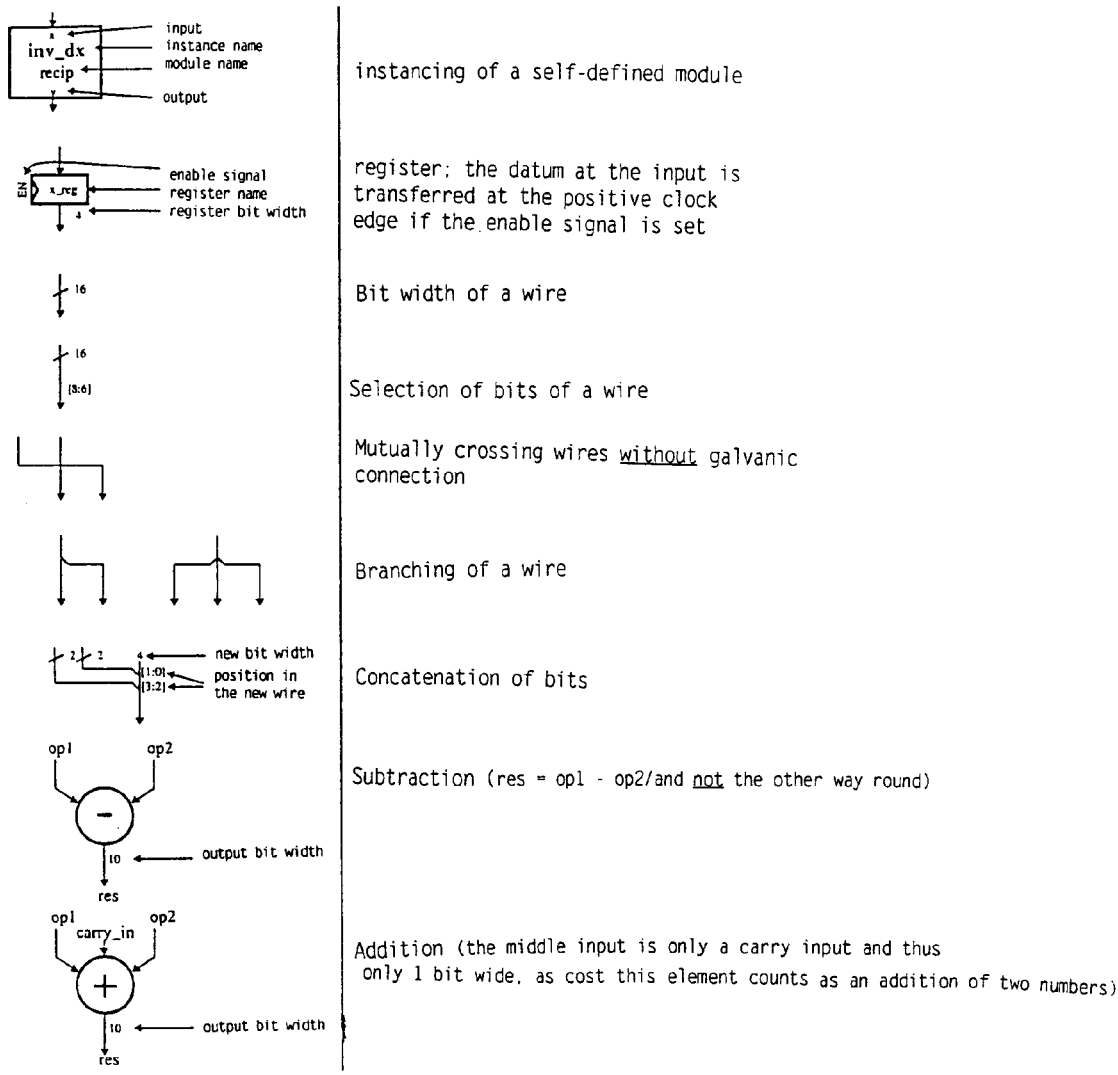
FIG. 67 shows a character legend relating to the symbol representations in FIGS. 24 through 66.

The individual modules are illustrated by block circuit diagrams, the symbols used therein being explained in FIG. 67. The modules are presented here in accordance with the top-down method, that is to say firstly the main module is described, followed then by the modules contained therein. If a module should include further sub-modules, then the corresponding sub-module is described immediately following the module.

Figure 24:
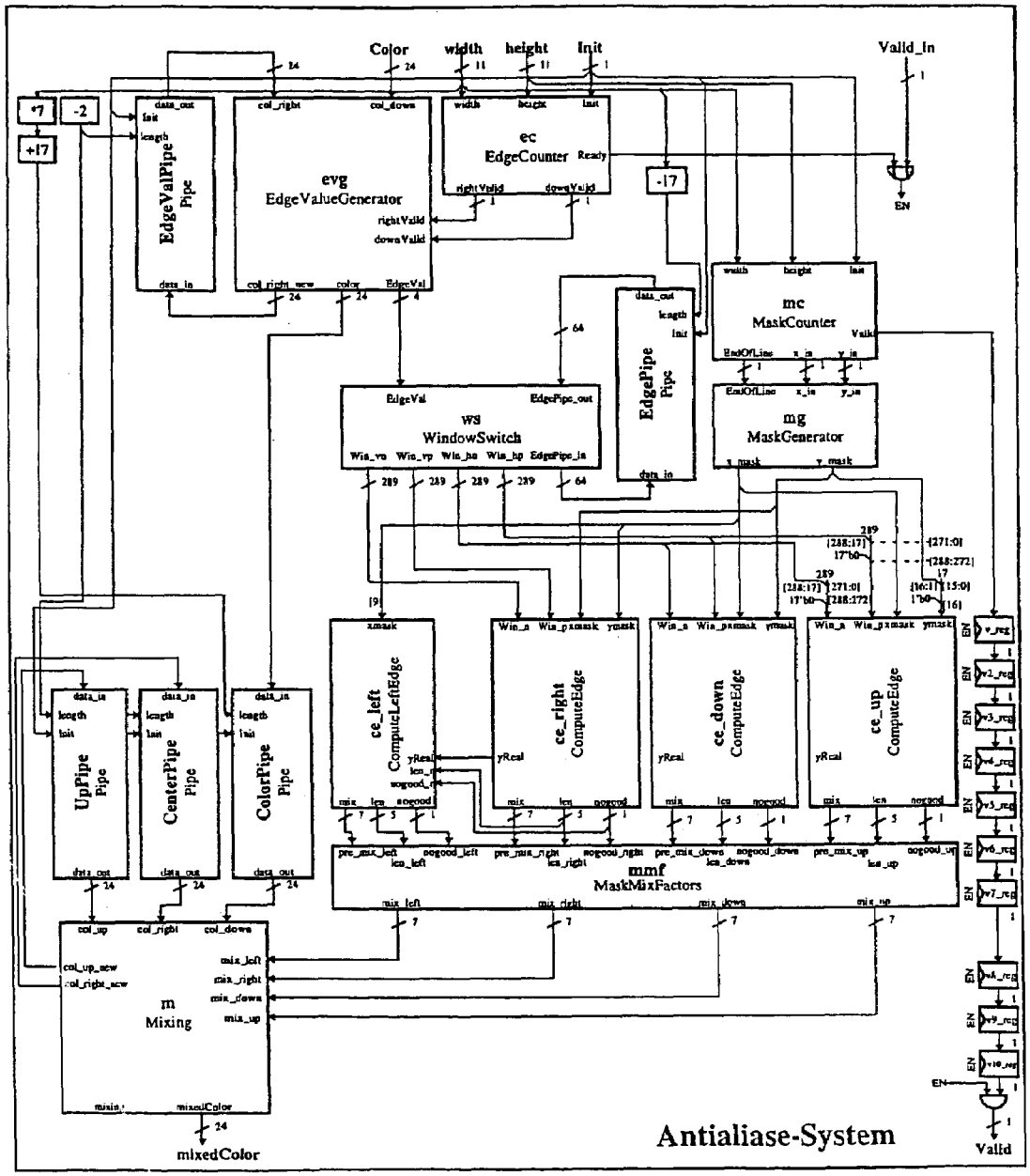

The anti-aliasing system( ) as shown in FIG. 24 and as set forth in Table 4 is the main module from which all further modules are imported and described further hereinafter as sub-components.

The present system in principle comprises two decoupled processes:
1. Generation of the edge information
2. Calculation of the straight lines on the basis of a local section from the edge image and subsequent mixing of the pixel colors.

As mixing operates on the edge window, the edge generation process must always have a projection of 8 lines and 8 points so that in the case of a 17×17 window all items of edge information are already available if they are required.

Figure 27:
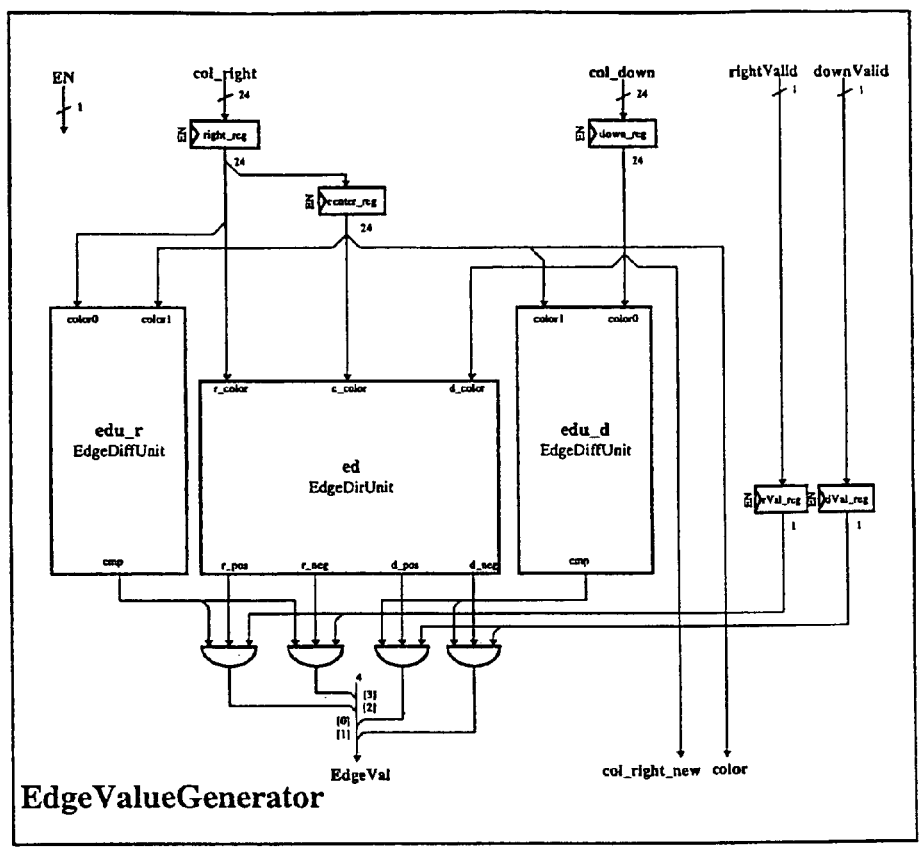
Figure 31:
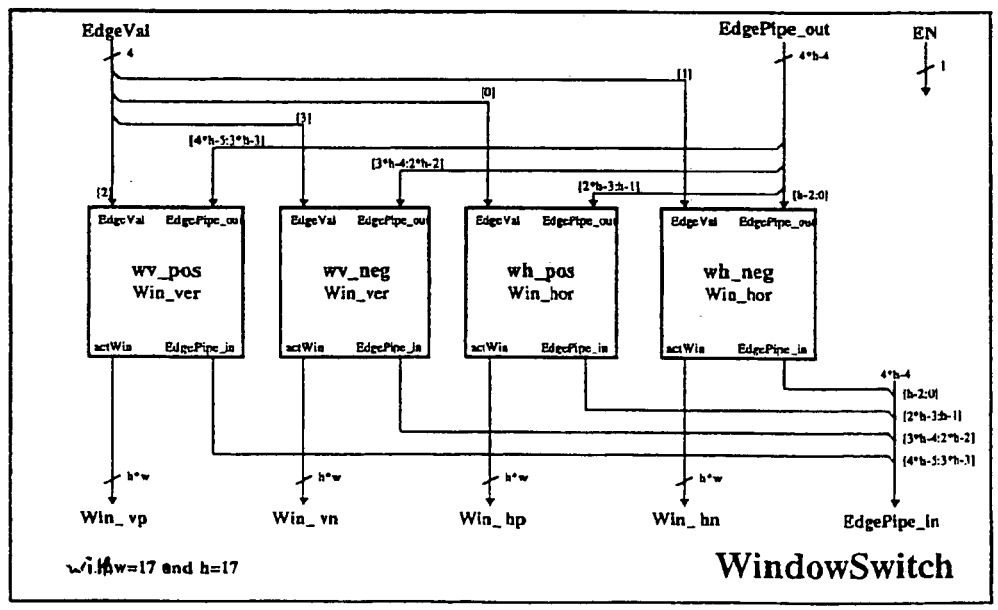

The edge information is produced in the module EdgeValueGenerator( ) (Table 6, FIG. 27) from the newly read-in chromaticity values. The respectively current section from the edge image is held in the module Windowswitch( ) (FIG. 31). The temporarily no longer required items of edge information are put into intermediate storage in the module CenterPipe( ). 4 bits of edge information are held per pixel, whereby with 16 pixels disposed in parallel the result is a bit width of 64 bits. The important thing with that module is that the edge information is stored on-chip for 64 bits are stored in each cycle and also 64 bits are read in again in parallel. An external memory would therefore constantly be occupied in depositing values and fetching them again and could thus not be used for anything else. Storage is in practice also possible as with a maximum display screen width of 2048 pixels 128 kB have to be stored. (At the present time on-chip RAMs of 1 MBit can be achieved without serious problems.) This memory is required in both alternative configurations (triple buffer/display process).

For each individual pixel, it is necessary to trace up to four straight lines in order to determine the four mix factors from the individual directions. Viewed statistically, only one straight line is required in about 61% of cases. The other cases however also occur (two straight lines 27%, three straight lines 8% and even four straight lines 4%). As a new pixel is processed in each cycle, the worst-case scenario of four straight lines must therefore be assumed and parallel processing of all four cases must occur. That is effected in the modules ComputeEdge( ) which as the result respectively supply a mix factor for the corresponding straight line. In that respect the same module can be used for vertical tracing of the straight line as for the horizontal straight line since, as already frequently mentioned, the vertical edge window is previously transformed into a horizontal one (this is done in WindowSwitch( )).

When the line to be traced is considered closely, it can be seen that that straight line which for the current pixel results in the right mix factor is identical to the straight line which in the next pixel results in the left mix factor. On the basis thereof, when dealing with the right straight line, the position in respect of the current pixel is further used for the next pixel so that it is not four but only three straight lines that have to be traced; the hardware expenditure is accordingly reduced. The same optimization effect is not so easily possible for the upper and lower straight line respectively as the same straight line is admittedly traced but the information from that straight line would have to be stored over a line, which would involve an additional amount of memory of 32 kB.

Figure 25:
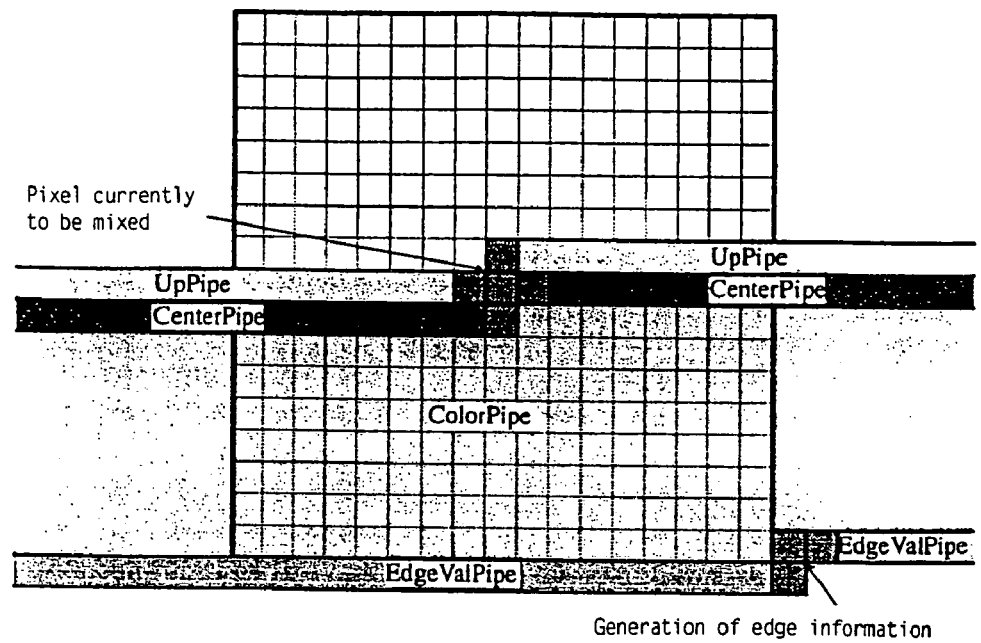

In ColorPipe( ) the chromaticity values are cancelled until they are needed again for mixing of the new colors. In CenterPipe( ) and UpPipe( ) the chromaticity values are each delayed by an additional line. The content of the pipes is represented as in FIG. 25.

Figure 26:
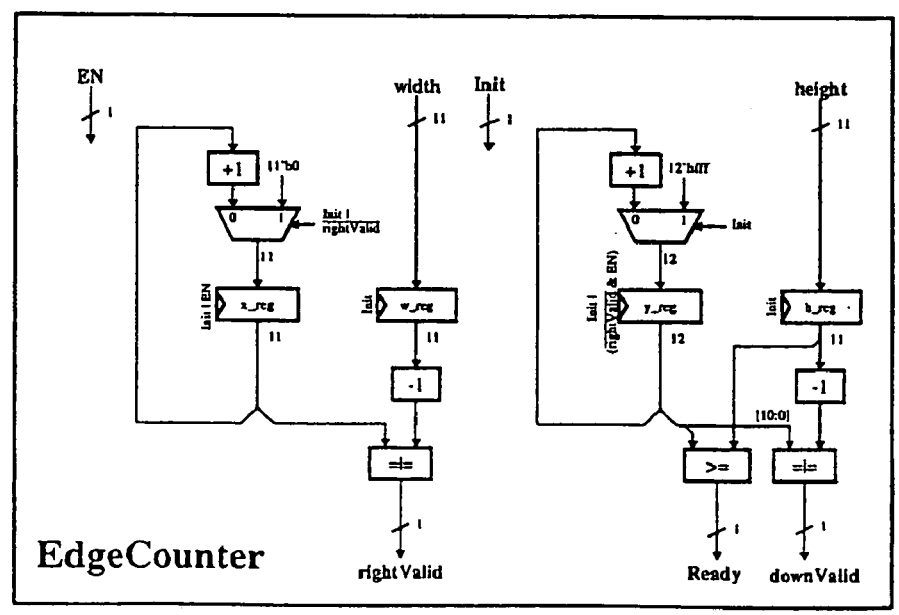

The edgecounter( ) (FIG. 26, Table 5) indicates for which pixel the edge information is precisely generated. Accordingly, in regard to some pixels the adjacent ones are blanked out by way of the two signals rightValid and downValid which are not true neighboring ones in the image, rightValid is respectively taken back at the last pixel of a line as the next pixel already belongs to the next line and therefore has nothing in common with the current pixel. downValid is taken back in the last line as the line therebeneath no longer contains any valid data. Ready specifies when all pixels of the current image have been read in. From that moment in time it is no longer necessary to wait for fresh data so that the Enable-Signal for other modules can be generated from that signal.

In the module EdgeValueGenerator( ) (FIG. 27, Table 6) the edge information for each individual pixel is generated. For that purpose, three chromaticity values are required in each case (bottom of FIG. 24), of which however there were only ever two that were freshly taken over. The central chromaticity value is the right-hand chromaticity value of the previous pixel. It is in the modules EdgeDirUnit( ) that the decision takes place as to whether the current pixel is to be viewed as an edge pixel; the top of the edge is established in the module EdgeDirUnit( ).

Figure 28:
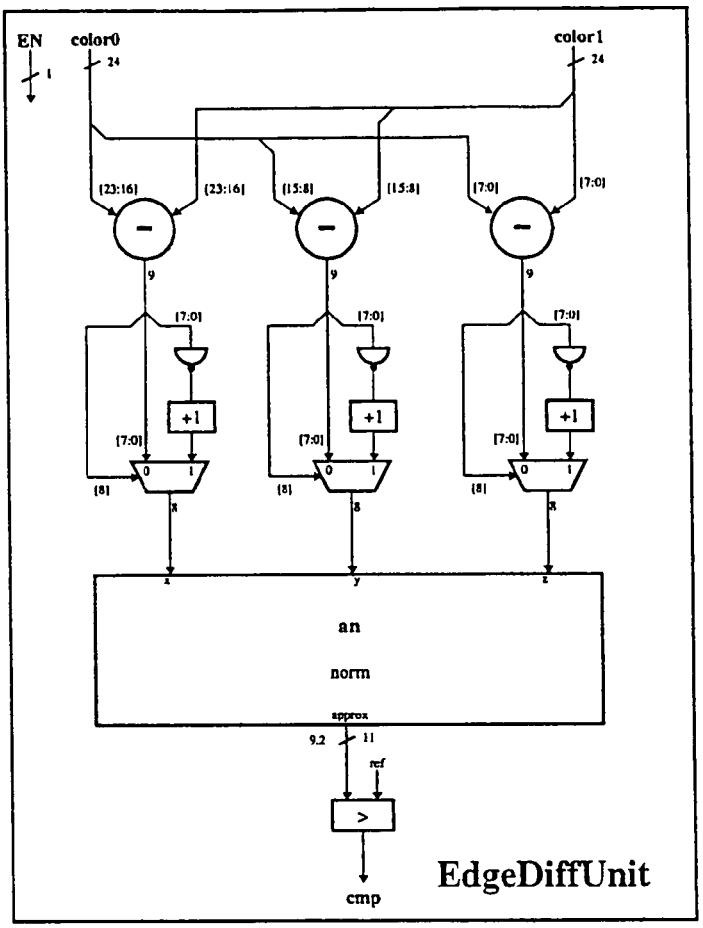

It is in the module EdgeDiffUnit( ) (FIG. 28) that the actual decision takes place as to whether an edge does or does not exist between two pixels. For that purpose the Euclidean distance a of the two colors in the color space has to be determined, to which then threshold value formation is subsequently applied. The threshold value (ref) has been set forth as a parameter so that it can be easily altered. In principle a threshold value of 40.0 is adopted as that value has proved itself in many test images. The value does not need to be established in the definitive hardware implementation, but it can be repeatedly altered if it turns out that different threshold values should be used for different scenes. In general however in the case of unknown scenes operation is implemented with a standard value.

Figure 29:
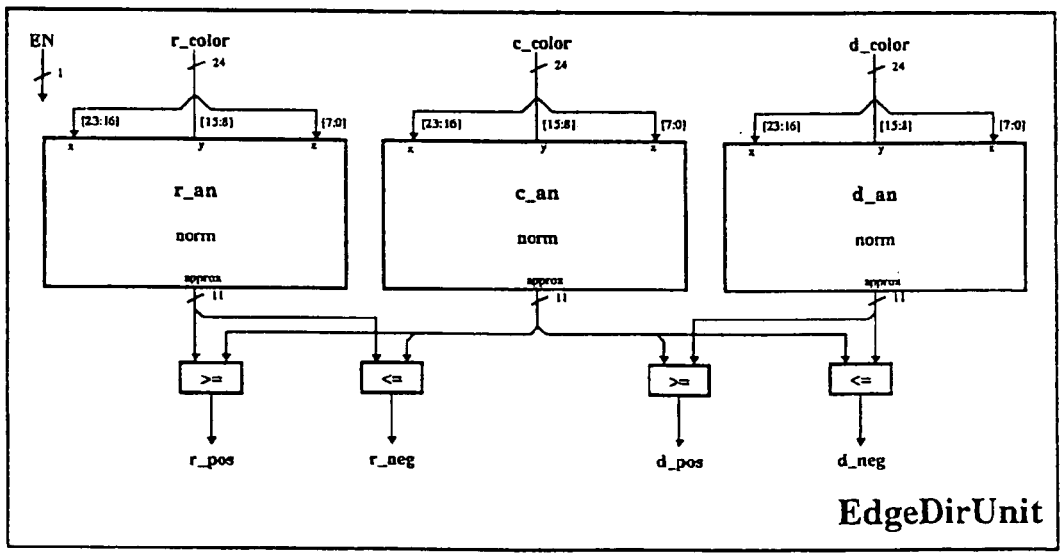
Figure 30:
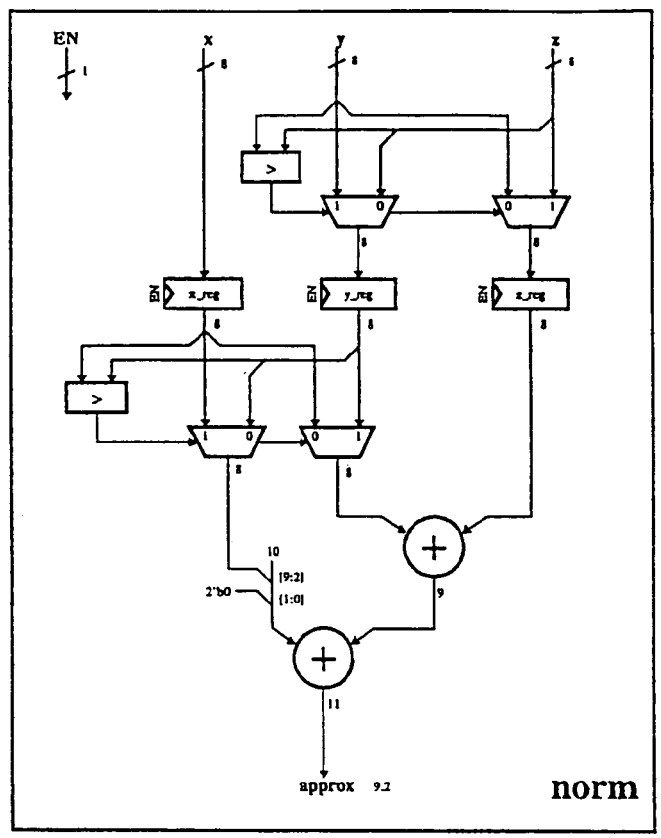

In the module EdgeDirUnit( ) (FIG. 29, Table 8), the step of determining the direction of an edge takes place. For that purpose the distances of the individual colors relative to the coordinate origin in the color space is calculated, and they are then compared together, giving the desired values.

Here the calculation approximates the formula:

$$\alpha = \sqrt{x^2+y^2+z^2}$$

as precise calculation of the root would be much too expensive for this case. As an approximation use is made of the formula:

$$\alpha_{approx} = k + \tfrac{1}{4}*l + \tfrac{1}{4}*m$$

wherein k=max(x,y,z), l=med(x,y,z) and m=min(x,y,z). The maximum error occurs when x=y=z. In that case the precise formula gives $\alpha=\sqrt{3}x$ while the approximation gives $a_{approx}=3/2x$. The maximum error is accordingly $F_{max}=(3/2-\sqrt{3})/3/2 \approx 13.4\%$. By virtue of a different choice of the preliminary factors, $a_{approx}=k+11/32*l+m/4$, it is even possible to minimise the maximum error to 8%. By virtue of the much simpler form of the preliminary factors in the first alternative configuration (no multiplication is necessary, but only a shift operation by two places towards the right), the greater error is tolerated. An error of 13% may sound a great deal; as however the result values are only required for threshold formation, that is acceptable. It is simply a few pixels fewer than an edge that are marked than normal. This however can be made good again by adaptation of the threshold value.

The result of the calculation occurs in the fixed point format (in this case 9.2) with which then further computation is also effected.

The current edge image section is stored in the module WindowSwitch( ) (FIG. 31, Table 10), wherein the bits are already stored in such a way that vertical edges can be traced horizontally. The items of edge information of the right-hand column, which have already been generated, are read out of the memory by way of the input EdgePipe_out; the newly produced edge value is added by way of EdgeVal. In a corresponding fashion output of the edge information required for later lines is implemented by way of EdgePipe_out. The edge values are not stored in pixel-wise manner in the pipe but on the contrary sorted on the basis of the types of the edge values so that the distribution is as shown in FIG. 32.

In order to be able to implement tracing of the steps in the individual windows, the edge information is needed in line-wise manner. As the information however is freshly transferred into the window in column-wise manner, a re-association of the bits must occur in regard to the horizontal window so that they are stored in the correct sequence. This does not have to happen in regard to the vertical window. More specifically, it is there that a transformation from vertical to horizontal takes place. In the final effect, the action of the transformation operation is reversed by the re-association of the bits. In the block circuit diagrams the parameters have not been replaced by specific values so that the pattern of the interlinking of the bits becomes more clearly apparent (w is the width of the edge window, that is to say 17, and h is the height, also 17).

Figure 35:
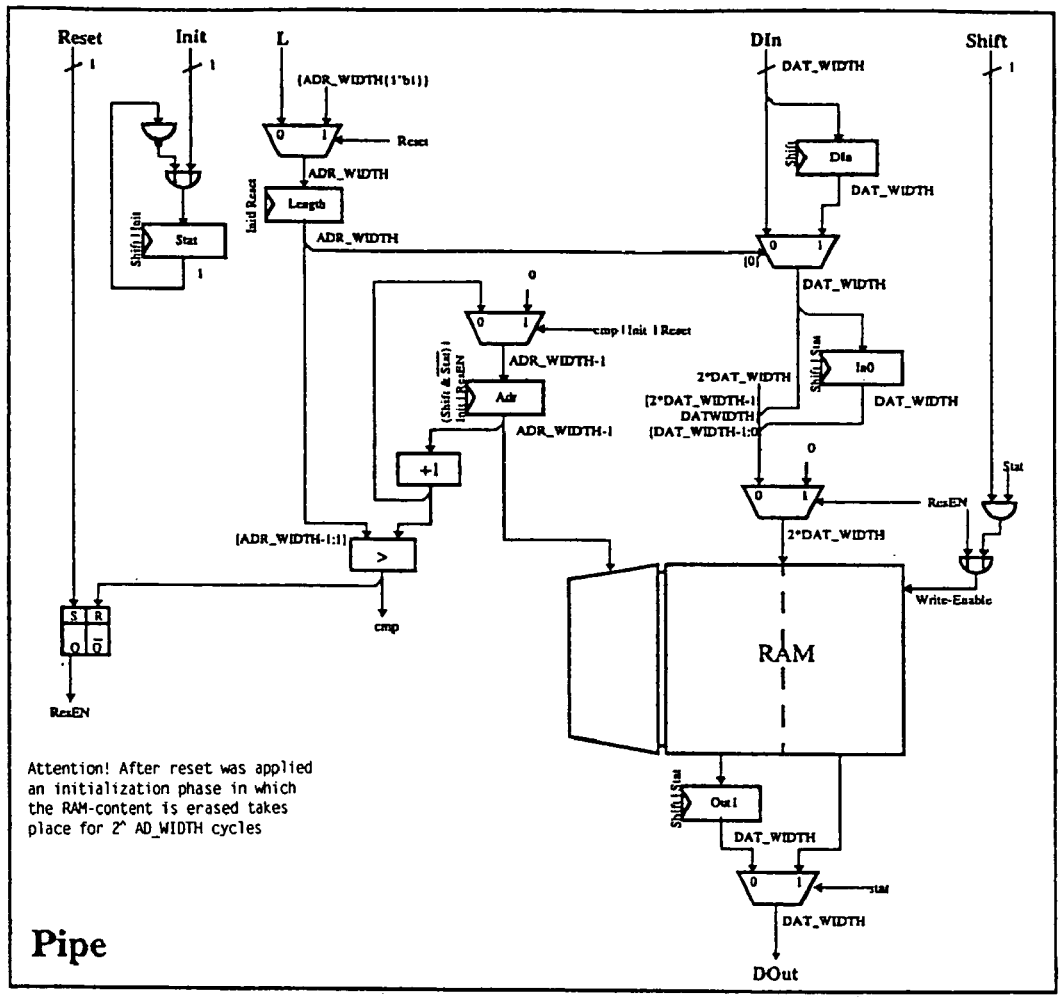
Figure 36:
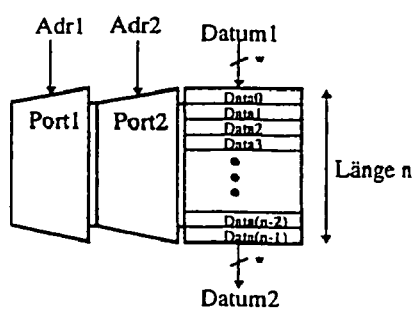
Figure 37:
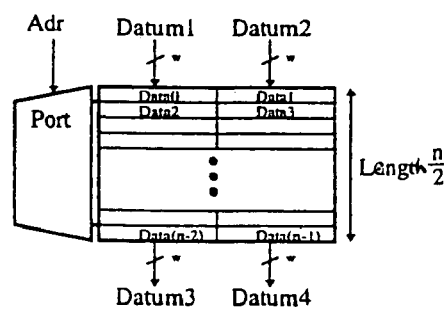

The module pipe( ) (FIG. 35, Table 12) involves a simple delay module which takes over a piece of data and outputs it again after a fixedly predetermined number of cycles. In its basic form the module would be implemented in such a way that as many registers as the length requires are connected in succession. By virtue of the considerable hardware costs (7 gates per stored bit) however that is not meaningful, as in addition the length is also kept variable, and indeed not possible. There is therefore provided an RAM in regard to which the hardware costs are substantially more favorable (a maximum of 1 gate per stored bit). Designing the pipe( ) involved proceeding with particular care so that the hardware costs turn out to be as low as possible as, by virtue of their enormous size, the pipes give rise to the highest costs. In the normal form of a pipe a dualport-RAM is always necessary as in each cycle a value must be written and at the same time a value must be read. By the parallel deposit of two values in the memory it would be possible to save on the second port by a procedure whereby two values are always simultaneously written to an address in one cycle and two values are read out in parallel in the next cycle (FIG. 37).

Consequently the RAM used now involves double the data width, but only half the length. The memory quantity has therefore remained the same but a cost-incurring port has been saved. The registers In0 and Out1 are required for parallelization of two items of data or serialization of the data. The register Stat contains the write/read signal for the RAM. In accordance with the foregoing considerations it would only be possible to allow even lengths for the pipe. Due to the additional register DIn uneven lengths are now also possible, as it provides for the delay by a further cycle if it is connected into the data path. The address counter Adr is incremented after each writing operation. When the length of the pipe is reached, the procedure begins again at the address 0; consequently the RAM is operated as a ring buffer. In order to avoid undefined values in the RAM a reset signal was additionally used, by which an initialization phase which erases the RAM-content is started. For each cycle a new line is always erased; therefore, with a length n of the RAM, n cycles are correspondingly required. During that time the data at the input DIn are ignored.

Figure 38:
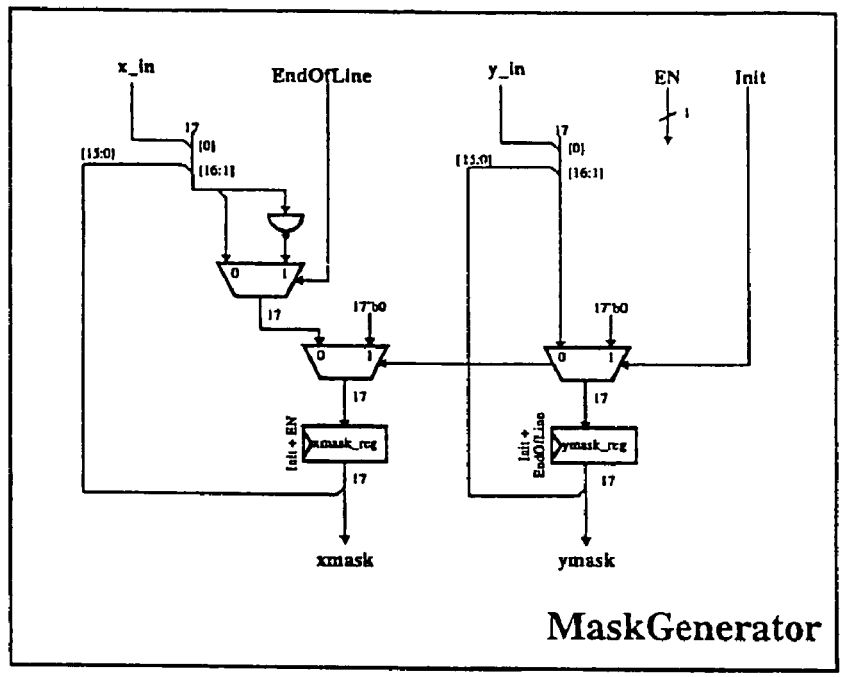

The two masks with which the current edge window is masked in order to consider only relevant pixels from the environment are generated in the module MaskGenerator( ), FIG. 38, Table 13. The necessity for the y-mask is that, when processing the pixels of the first eight lines in the upper region of the window there are still pixels which in fact do not belong to the current image. In order to ensure that under some circumstances straight lines are not traced beyond the image limit, masking of those pixels is effected. A corresponding consideration applies to the lowermost 8 lines of the image, in which there are no legal edge values in the lower lines.

Figure 39:
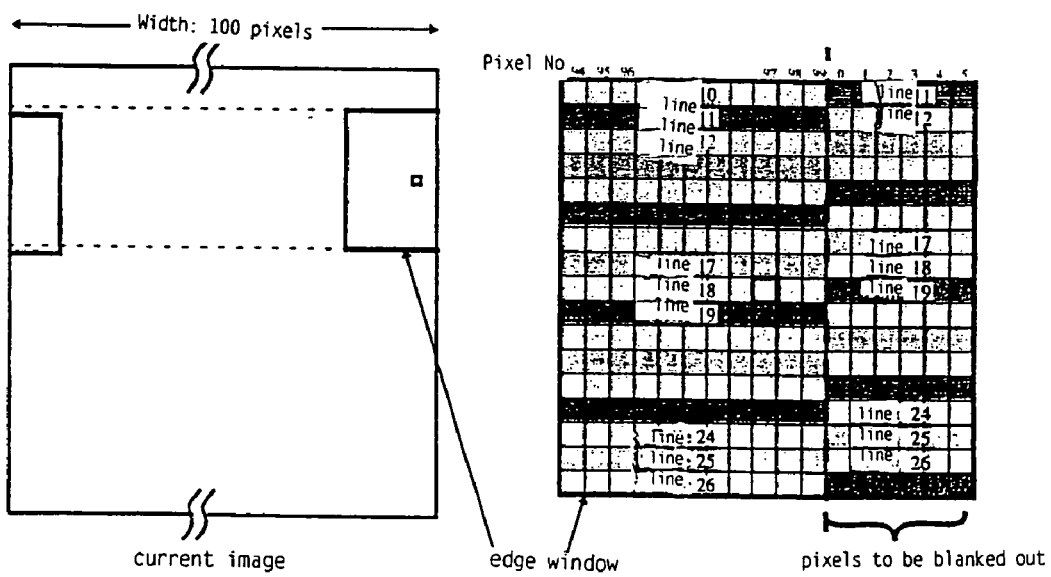

As already mentioned, the edge window is continuously further shifted towards the right by a pixel in the processing operation. When the last pixel of an image line is reached, a jump to the first pixel of the next line occurs. Due to that procedure, at the last eight pixels of a line, at the right-hand edge of the window, there are pixels which actually already belong to the left-hand edge of the image (see FIG. 39). In a corresponding manner, the window at the first eight pixels of a line still contains values which actually belong to the right-hand edge of the image. The x-mask is required in order to blank out the values which are not valid for the respective current window. By virtue of the fact that the non-masked window may contain both pixels from the right and also the left of the image means that no time is lost when switching over into the next line and treatment can take place as in the normal situation.

The x-mask generation operation now takes place in such a way that in each cycle the last mask is shifted by one place towards the left (precisely like the pixels in the edge window). A new value is taken over at the right-hand edge, and that value indicates whether the pixel column still belongs to the same line. If the last pixel of a line has been processed (indicated by the signal EndOfLine) the mask is inverted bit-wise whereby the mask for the first pixel of the new line is automatically produced. In a corresponding fashion, at each new line the y-mask is advanced by one value.

Figure 40:
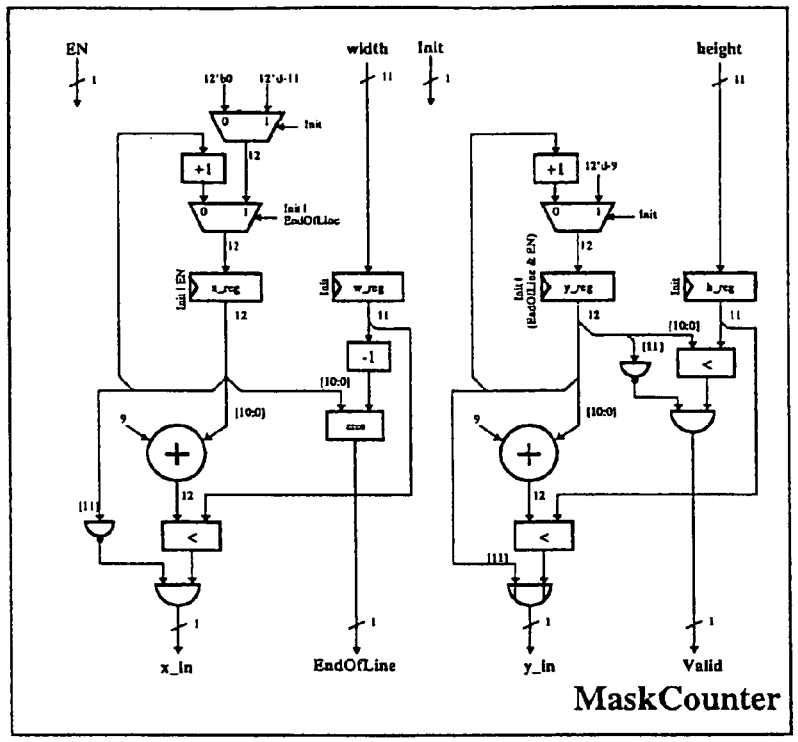

The position of the pixel which is currently to be processed is determined in the module MaskCounter( ) (FIG. 40, Table 14). At the beginning the counters are outside the image (x,y)=(−11, −9), as the edge information for the first lines firstly has to be generated over the first cycles; accordingly the signal outputs a Valid=0 for so long. The variables x_in and y_in determine whether the pixel which is becoming freshly visible in the edge window belongs to the environment of the current pixel. The signal EndOfLine becomes active at the end of a respective line to permit toggling of the x-mask in the module MaskGenerator( ).

Figure 41:
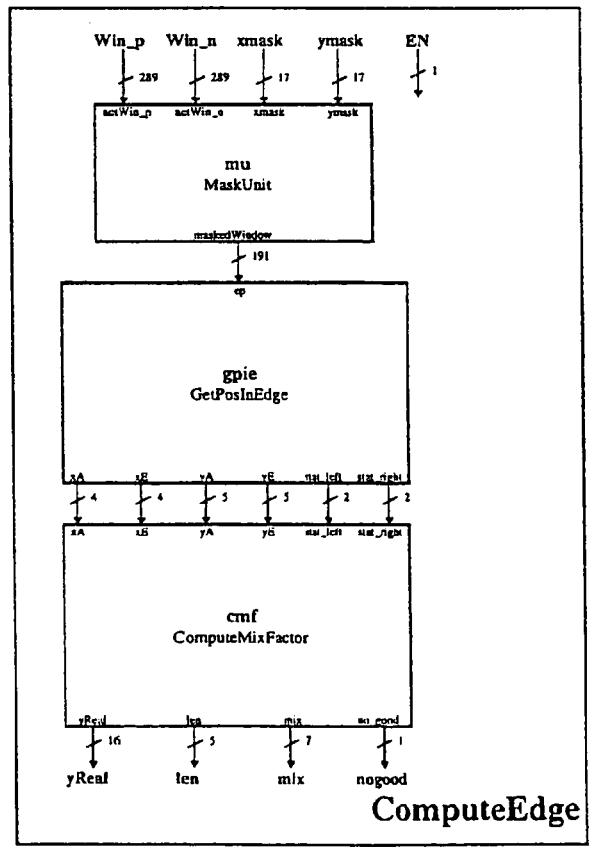
Figure 42:
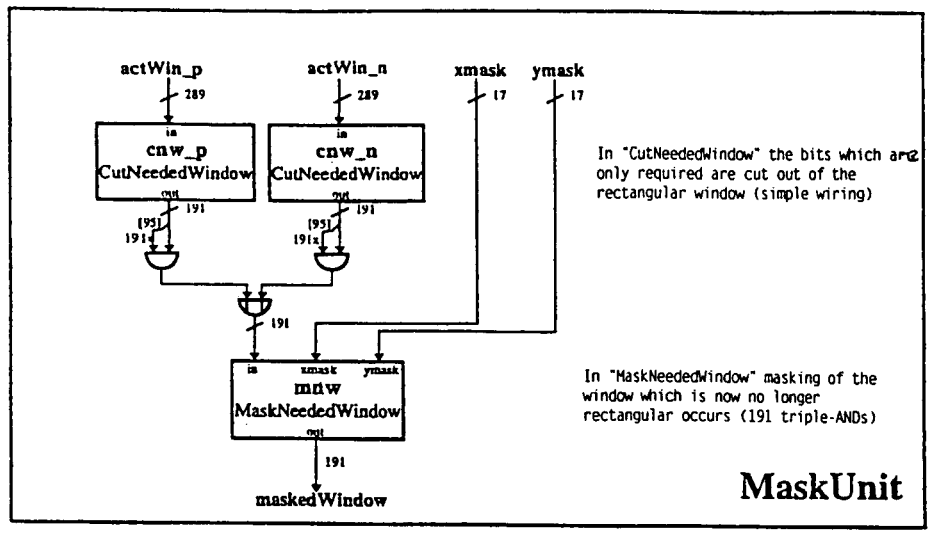

Initially only the valid pixels are masked out of the current edge window by means of the module MaskUnit( ) (FIG. 42, Table 16) and then the actual operation of tracing the straight line is effected in the module GetPosInEdge( ). The mix factor is then determined from the ascertained points in the module ComputeMixfactor( ). The module ComputeEdge( ) (FIG. 41, Table 15) is used both in the recognition of horizontal and also vertical straight lines.

Hitherto two edge windows are available for tracing the straight lines, of which, in the normal case only one is marked in the central pixel as an edge. The edge window which is not required is blanked out by the AND-gating of the entire window with that central pixel. In some cases however it is also possible to retain both windows so that the two windows are OR-linked in pixel-wise manner.

Figure 43:
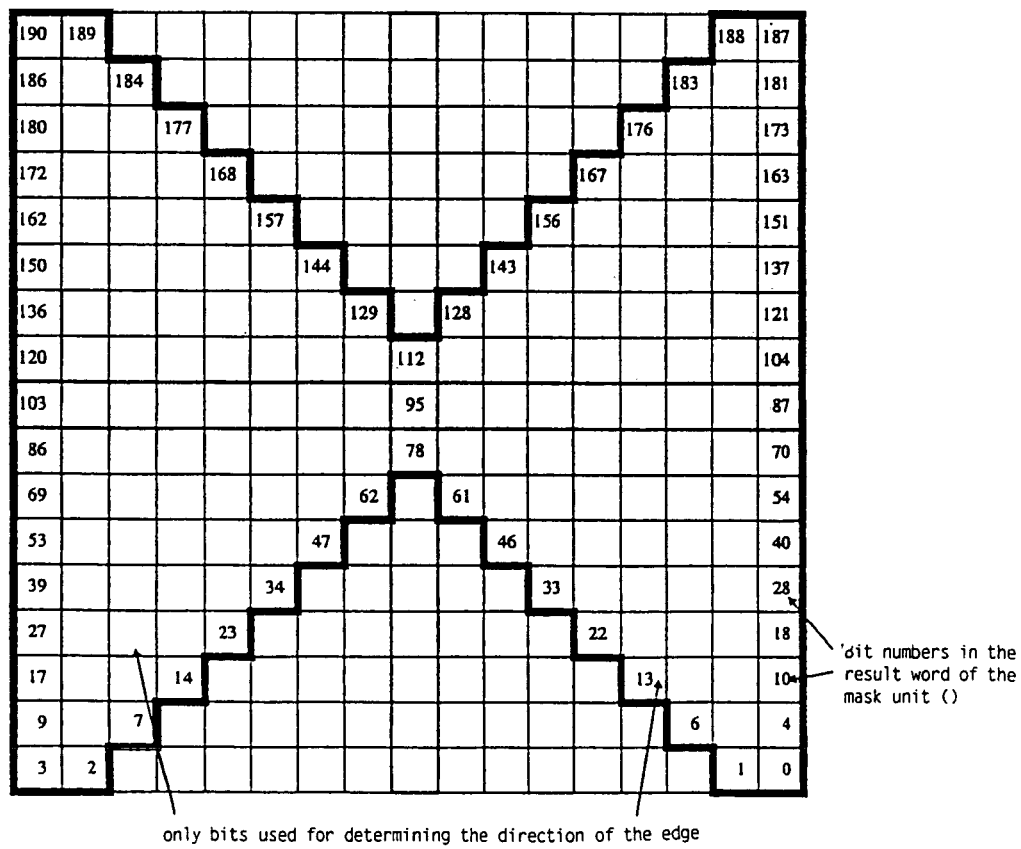

The straight lines are always traced horizontally in the window so that the maximum gradient of a straight line is 45°. By virtue of that fact, out of the original (17*17)=289 pixels of the window, some are guaranteed not to be further required so that they are also not transmitted to the next modules, accordingly only 191 still remain, as shown in FIG. 43.

The sub-module CutNeededWindow( ) thus has no independent functionality. Therein, the correct bits are selected only from the 289 bit wide wire, which corresponds to simple wiring and thus also does not take any time.

The actual operation of masking the window which is now no longer rectangular and in which the pixels which do not belong to the current environment are blanked out is then effected in the MaskNeededWindow( ).

Figure 44:
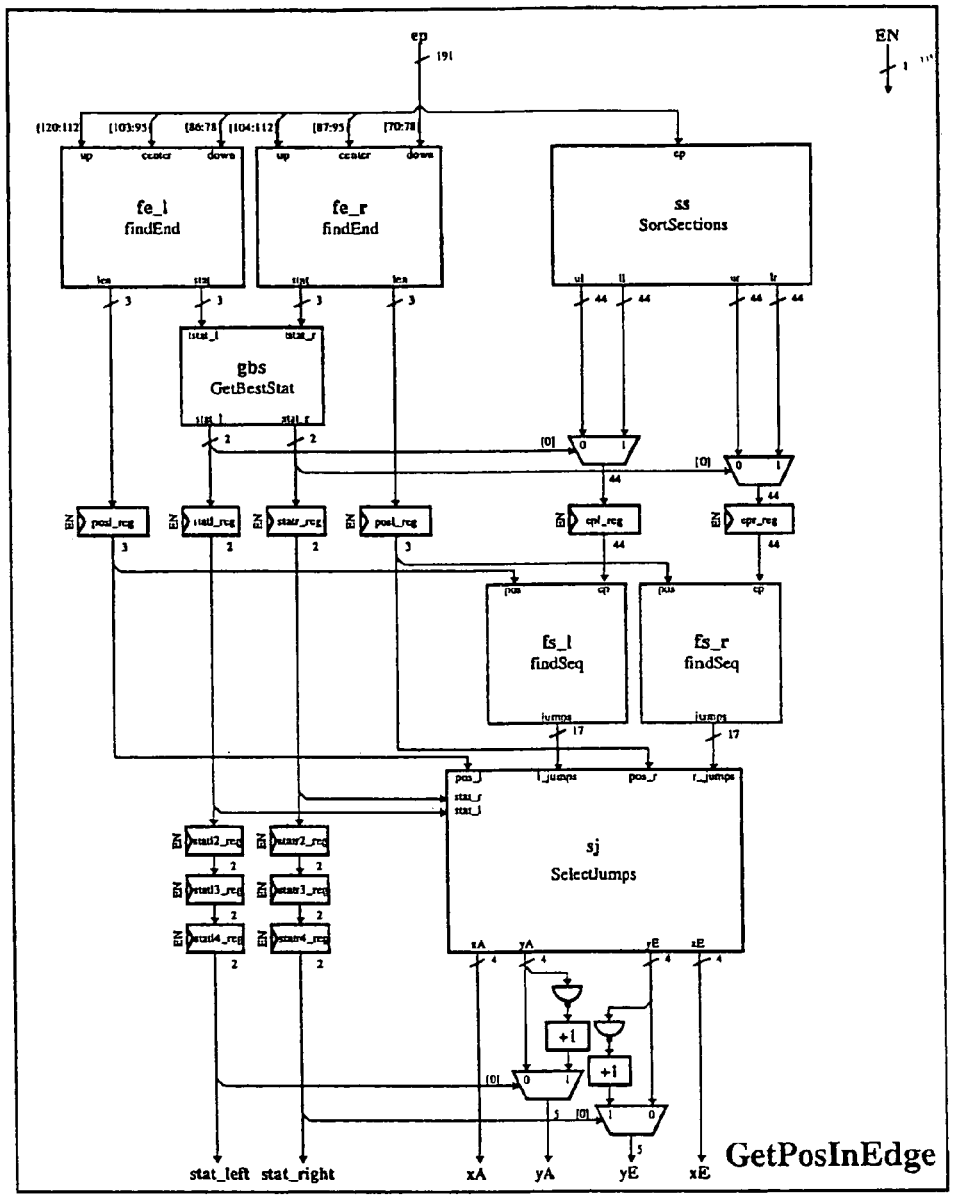
Figure 45:
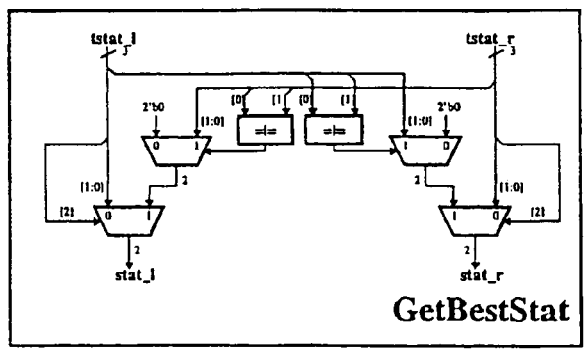
Figure 46:
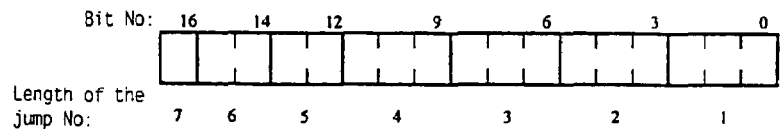
Figure 47:
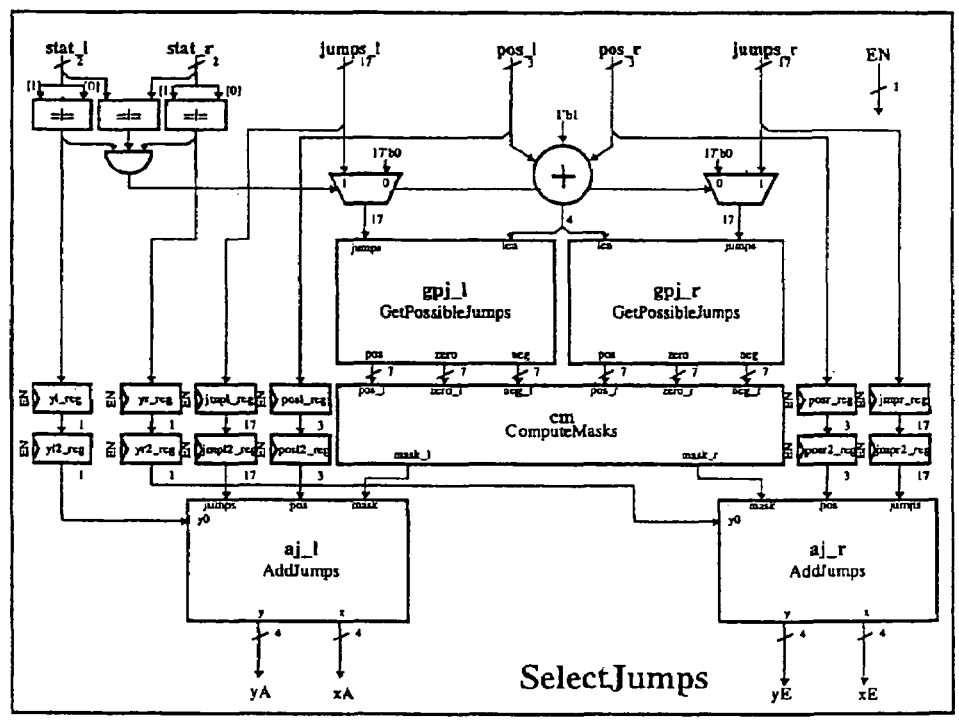

In the module GetPosInEdge( ) (FIG. 44, Table 17), the start and end points of the straight line being traced are extracted from the edge window. In the module FinEnd( ) (Table 18), the central step is traced to its end in both directions. At the ends there are the statuses which specify in which directions further possible steps occur. The best possible statuses are blanked out by GetBestStat( ) (FIG. 45, Table 19). In the module SortSections( ) the edge window is subdivided into four sectors (once again not a right module, but only selection of the bits), whereupon then on the basis of the best possible statuses towards the right and the left a selection is made in respect of the respective sector in which further steps are assumed to occur. In findSeq( ) (Table 22) all possible further steps in the corresponding sector are traced. SelectJumps( ) (Table 23, FIG. 47) serves exclusively to select from all possible steps only the steps by which a straight line can actually be interpolated. The sign of the y-values is then adapted on the basis of the statuses.

The central step is traced as far as its end in the module findEnd( ). In principle that is an iterative process for a comparison is made at each place (starting from the center) to ascertain whether the step is already concluded. If that is the case the status at that place is determined, otherwise the same procedure is effected at the next place. As however this would take an excessively long period of time (discrete structure), this module was modelled as a single case in which the interrogation takes place in parallel relationship. Automatic logic optimization by means of a suitable tool thus reduced the hardware costs and also the processing time.

At the end of a step it can happen that a further step presents itself for tracing, both upwardly and also downwardly. The best option is selected on the basis of the respectively opposite status at the end of the step. If no step presents itself, the corresponding status is corrected to NO.

Further possible steps are ascertained in the module findseq( ) on the basis of the position of the end of the central step. If each step is only one pixel long, that gives a 45° gradient and a maximum of seven further steps can pass completely into the sector. In a corresponding fashion jumps are divided into seven individual regions in which the length of the respective steps are filed.

As the last steps can no longer be so long, their bit width is reduced to two or one bit. (They can no longer be so long because, if something is still to be entered in regard to the fifth step, the previous steps must have possessed at least the length one. Consequently the fifth step can still have at a maximum the length three so that it is still completely in the window and is recognised.)

The procedure in the module findseq( ) can best be iteratively written: if there is no further edge pixel present in a line, the length of the step is entered at the corresponding position in the result and in the line thereabove an attempt is again made to find a further edge pixel. If no further step is contained completely in the window, then the corresponding length is accordingly set to zero.

As this module is again too complex for a discrete structure, recourse was again had to the possibility of modelling by means of a case and minimization was implemented by means of logic optimization.

Figure 48:
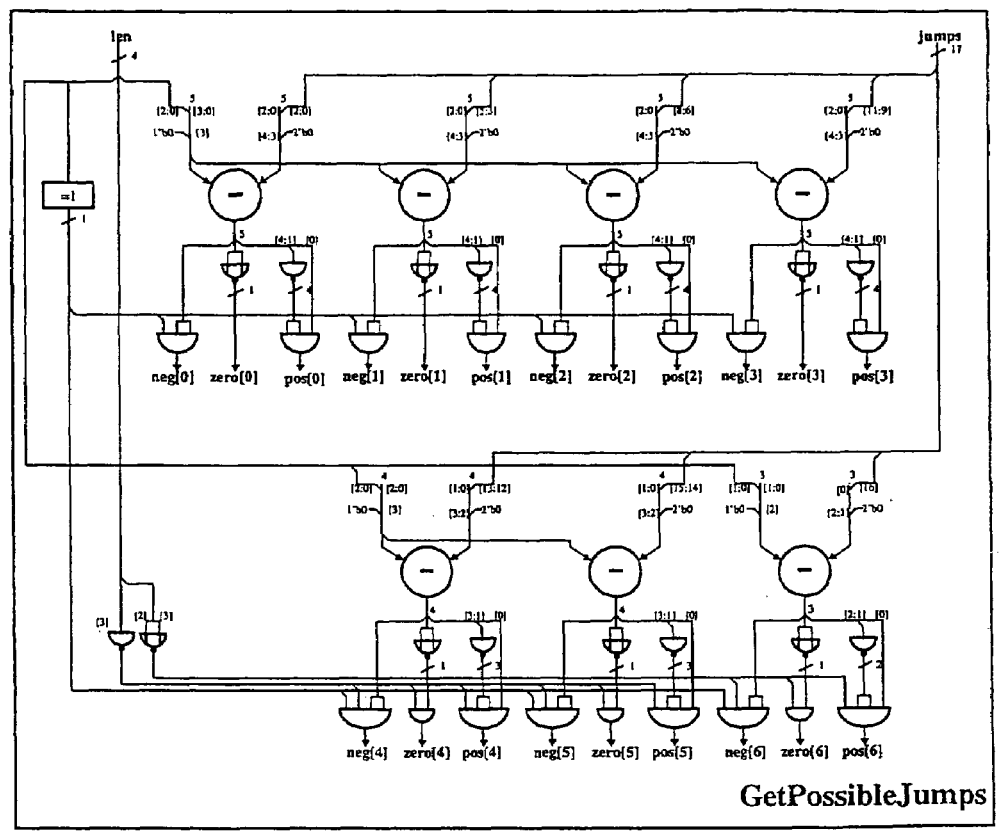
Figure 49:
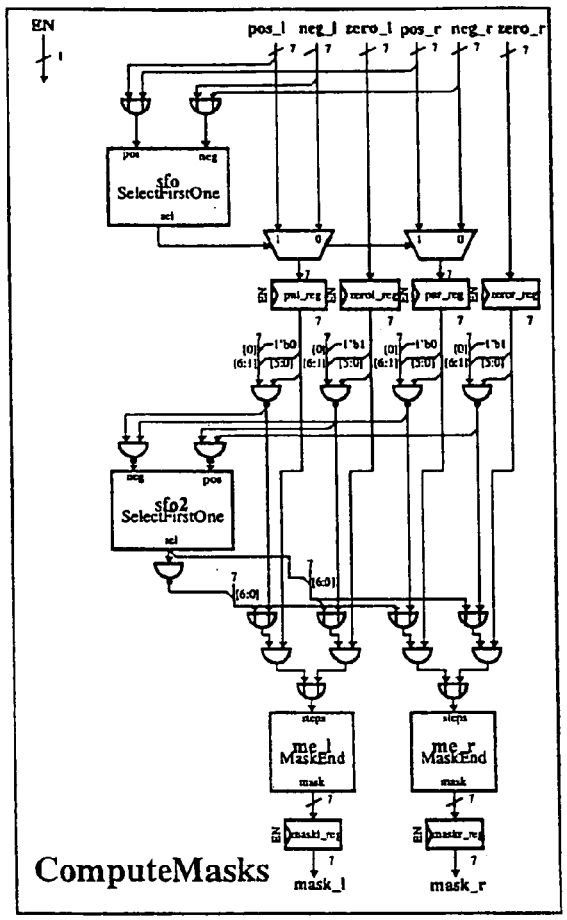
Figure 50:
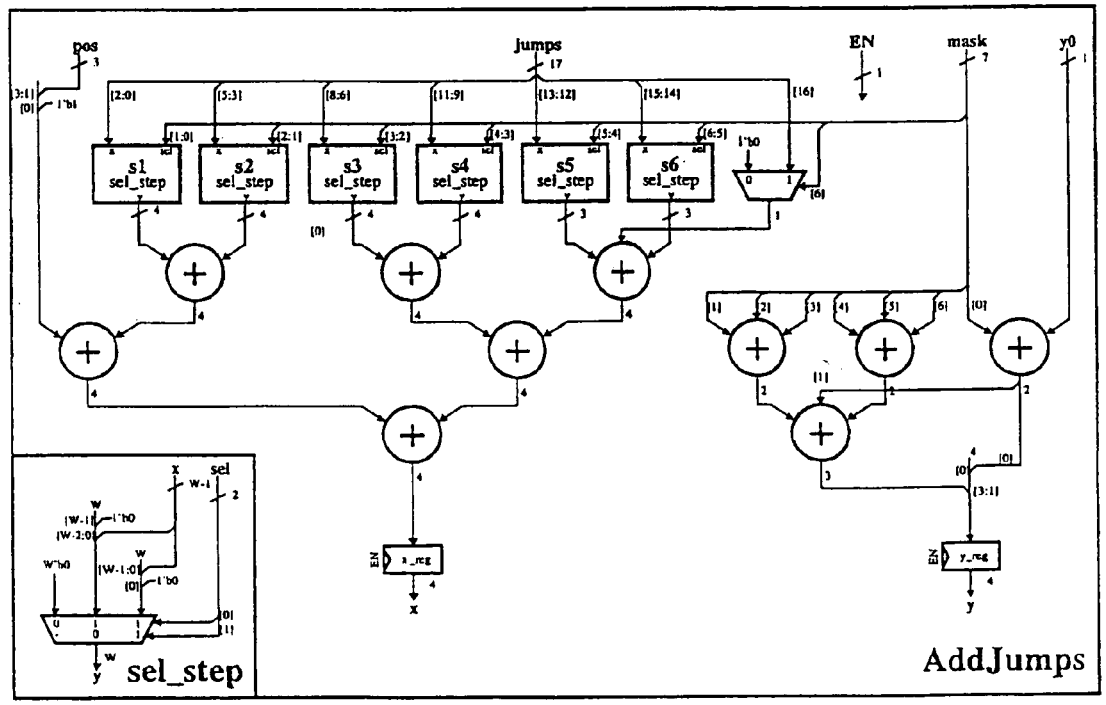

All further steps which fitted into the window were ascertained in finseq( ) (Table 22). Now, the steps which result in a straight line of the greatest possible length through the central pixel are selected by SelectJumps( ). Firstly, for that purpose the length of the central step is needed, on the basis of which in GetPossibleJumps( ) (FIG. 48, Table 24) the steps which are of an excessively great or excessively small length can be blanked out. Then, in ComputeMasks( ) (FIG. 49, Table 25), masks which mask out the jumps that are not possible are then generated. Then, in AddJumps( ) (FIG. 50, Table 26), the individual steps are added together so as to give the start and end points. If the status at an end of the central step was neither UP nor DOWN, then no further step should actually be traced and the Variable Jumps is set to zero.

In the module GetPossibleJumps (FIG. 48) the lengths of the individual steps are compared to that of the central step as only one straight line can occur if all step lengths lie within a tolerance of 1. The comparison operation is effected by way of subtraction and subsequent evaluation of the results.

First of all, with reference to the first SelectFirstOne( ) module, a decision is taken as to whether steps which are shorter by one or longer by one than the central step are allowed. In that respect the decision occurs on the basis of the step which is closest to the central step and which is of a different length. By means of the second SelectFirstOne( ) module, a decision is taken as to which of the two possible step lengths may occur a plurality of times as, in consideration of the rasterization rules, in the case of a normal straight line, only one step length may ever occur a plurality of times in succession. Finally, in the MaskEnd( ) modules, all steps which by virtue of previous masking actions no longer have a link to the central step are also blanked out. The SelectFirstOne( ) module was modelled just like the MaskEnd( ) module once again by means of a case instruction and minimized by synopsis.

If further rasterization rules are to be applied, they have to be converted within that module.

In the AddJumps( ) module (FIG. 50, Table 26), the results of the previous steps are added together so as to give an end point of the straight line. In that respect the mask applies as a bit mask which specifies which of the step lengths are also to be included in jumps. As already described the last step is only taken into consideration in respect of half the length and height involved.

Figure 51:
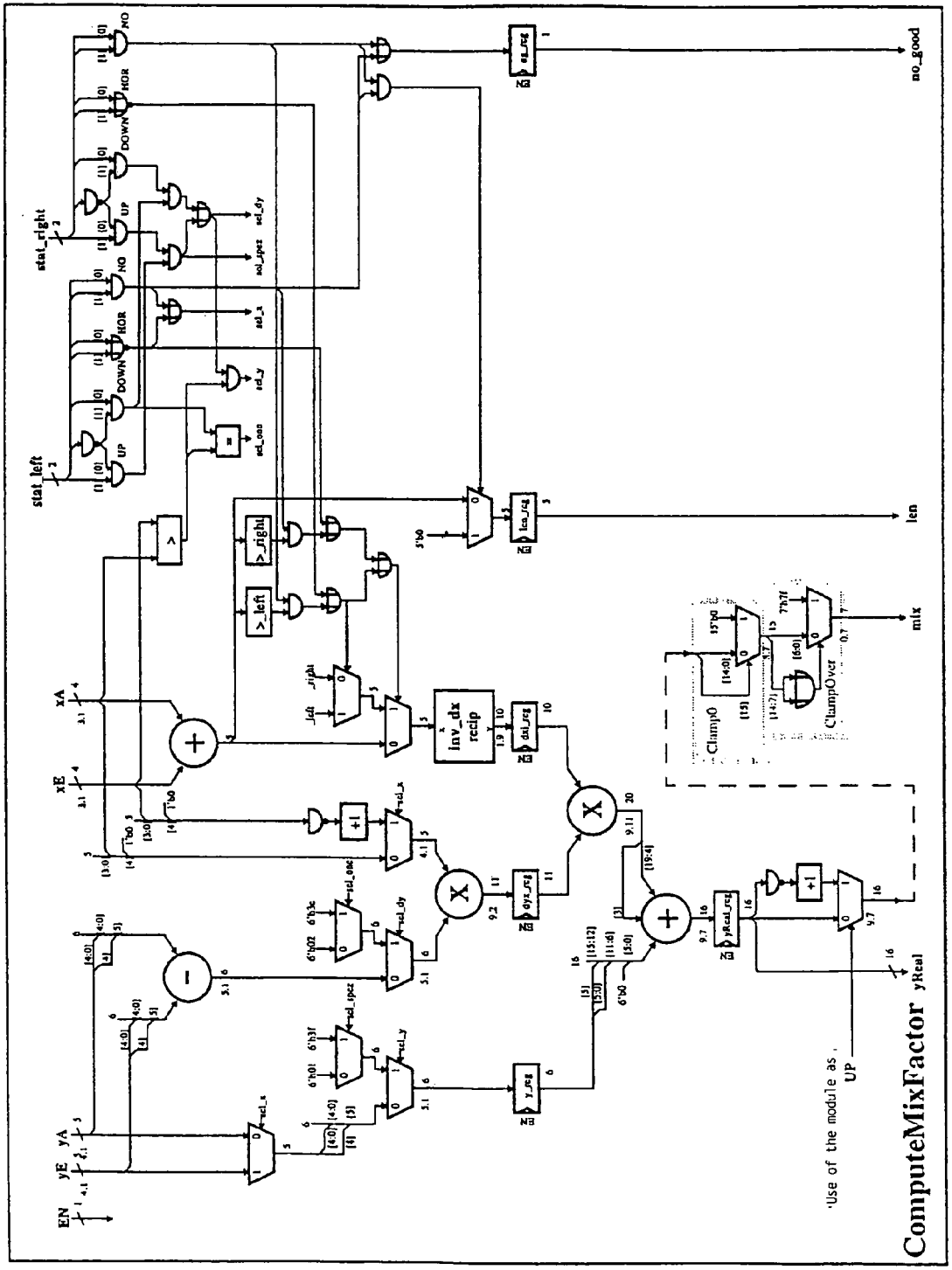

The module ComputeMixFactor( ) (FIG. 51, Table 27) is now to be described. The actual calculation of the mix factor provides for determining a straight line from the start and end points, in which respect it is only the y-value at the place x=0 of that straight line that is of interest. Depending on which pixel is precisely being considered (above or below the color jump), the y-value which is just ascertained yReal is or is not inverted (multiplexer at bottom left) so that the y-value now corresponds 1:1 to the mix factor in the range 0 . . . 1. By virtue of the last two multiplexers, the mix factor is only also trimmed to the range 0 . . . 1 so that there are no overflows. The decision as to whether the pixel above or below the color jump is processed is already established by the use of the module. The third-from-last multiplexer therefore only selects alternative branches which are selected by way of a parameter.

For determining the straight line, the reciprocal of the x-spacing of the two end points is required. The module recip( ) is introduced for that purpose.

A particular aspect is to be noted in regard to that module and the adjoining module MaskMixFactors( ). More specifically the two modules operated in overlapping relationship. While the module ComputeMixFactor( ) is therefore still occupied with calculating the mix factor, the length len and the additional flag no_good have already been transmitted to MaskMixFactors( ), and are being processed there.

The output mix is therefore always delayed by one cycle so that overall it was possible to save on one processing cycle and thus additional registers.

Figure 52:
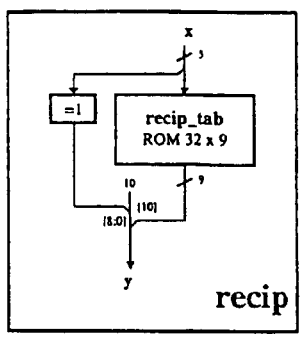

The reciprocal formation operation (Module Recip( ), FIG. 52, Table 28) is reverted in this simple case to a table look-up. In this connection the input value serves as an address for an ROM access in which the reciprocal is supplied as a result. In order to save a bit in regard to the table width, the case x=1 was treated separately as this is the only value in which there can be a digit before the decimal point in the allowed input value range 1.0 . . . 15.0 (4.1 fixed point format of the input). (The value 0.0 would produce an error and the value 0.5 also cannot occur by virtue of the form of the previous calculations).

Figure 53:
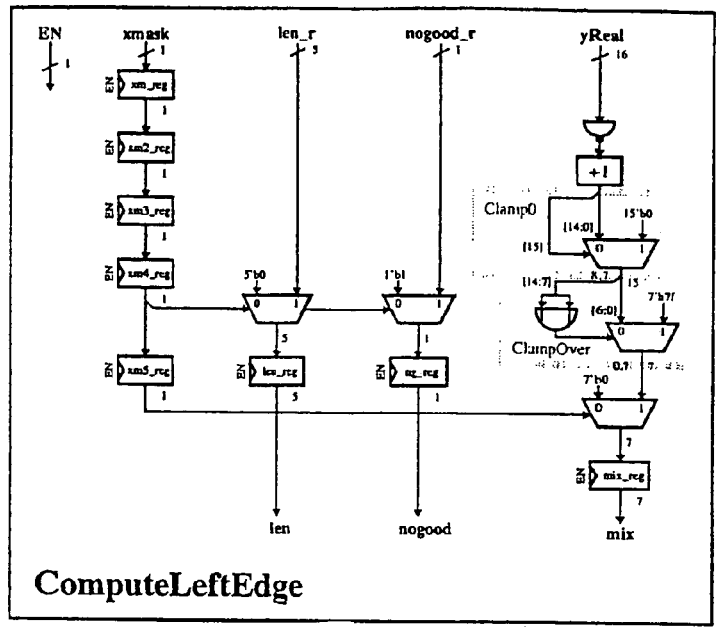

For calculation of the left mixing factor, the traced straight line of the previous pixel, in regard to the right mix factor, is re-used as the two straight lines are completely identical. It is only in the case of the first pixel in a line that this does not apply so that by way of x-mask the corresponding mix factor and also all additional items of information are erased, the module CompuLeftEdge, FIG. 53, Table 29).

Figure 54:
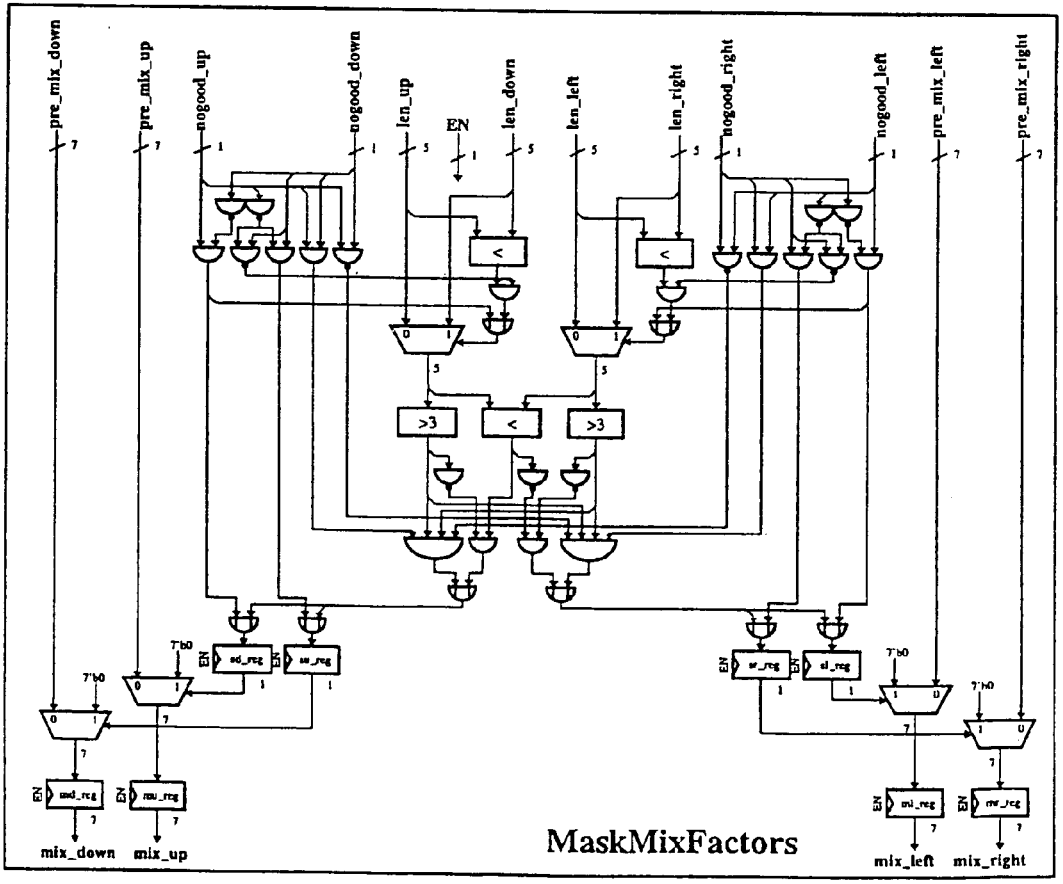
Figure 55:
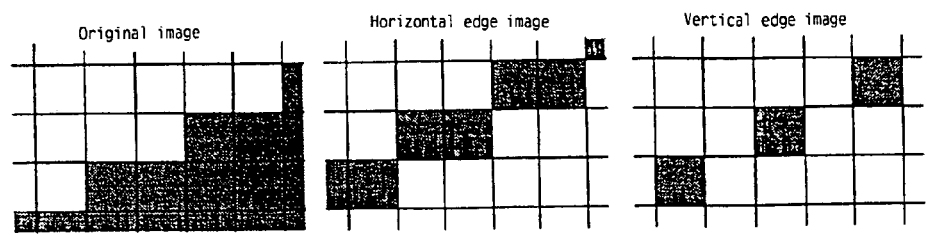

The previously calculated mix factors are only ever determined on the basis of a single straight line. In order to arrive at a more global impression and thus to determine the best possible mix factors for a pixel, all four straight lines are considered in the module MaskMixFactor( ) and, if necessary, some mix factors are also blanked out. The necessity occurs due to noise which results due to the use of the difference operator as an edge recognizing means (every other edge operator would also produce noise in some manner). A horizontally oriented edge between two colors was considered as an example. The usual image of the jumps that are wanted occurs in the horizontal edge image. In the vertical edge image however at each jump there is also marked an edge pixel which does not involve a meaningful significance. As that case is not recognized when tracing a straight line, these cases are blanked out inter alia in the module MaskMixFactors( ) (FIG. 54, Table 30).

Figure 56:
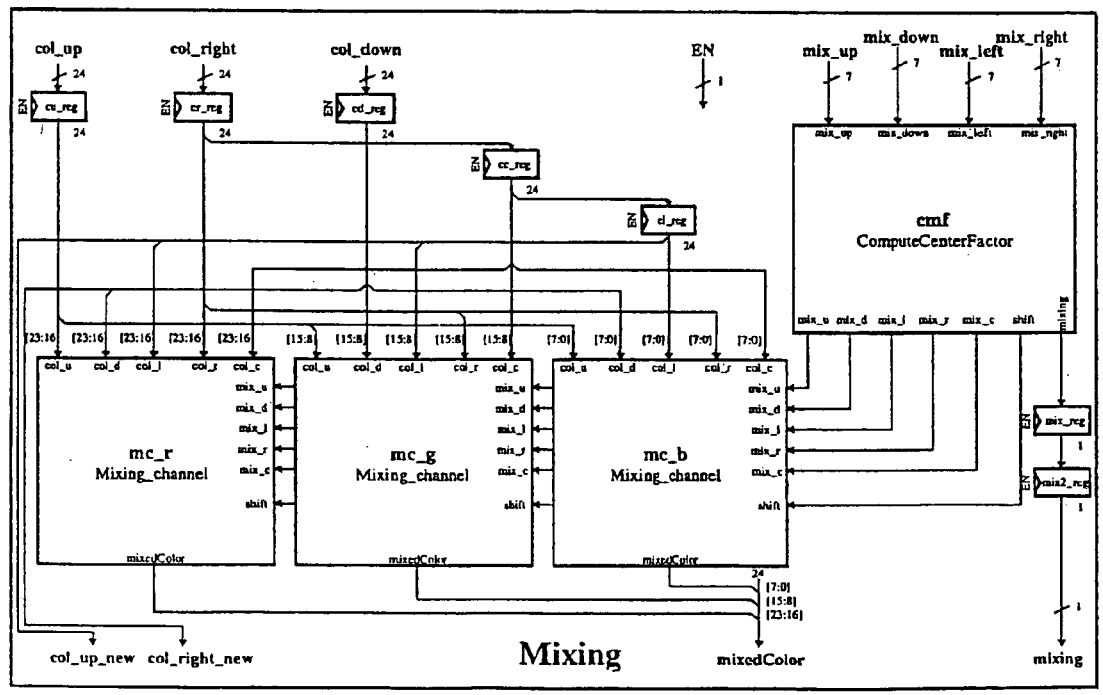

The actual color of the pixel is determined on the basis of its original color and the colors of the four neighboring ones. For that purpose the required colors are loaded, in which case the right color successively functions as the central color of the next pixel and the left color as that of the next-but-one pixel. The mix factor which is still missing, for the central pixel, is determined in ComputeCenterFactor( ), whereupon actual color mix for each color channel then takes place in Mixing_channel( ) of the module Mixing( ) (FIG. 56, Table 31).

Figure 57:
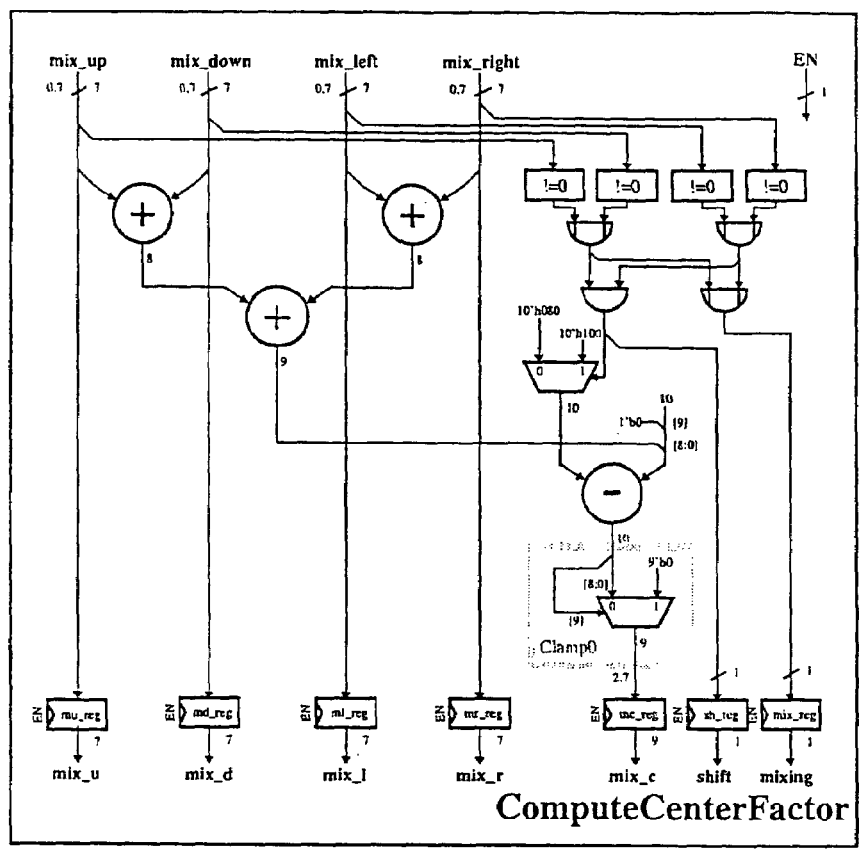

Calculation of the central mix factor in the module ComputeCenterFactor( ), FIG. 57, Table 32, is based on the fact that all mix factors must together give 1.0 as it is only in that way that it is guaranteed that no color overflows and thus color falsification effects are produced. If admixing is effected vertically and horizontally, the factors are standardized to 2.0 in order to find out the maximum possible accuracy. The division by two (shift by one place towards the right corresponds to simple wiring in the hardware) is only implemented at a later time and initiated by way of shift.

Definitive mix of the colors takes place in accordance with the mix formula in the module Mixing_Channel( ) (FIG. 58, Table 33). After the division by two which is necessary under some circumstances, rounding-off occurs, with which the level of accuracy can be still somewhat increased, followed then by intercepting an overflow.

In the display process the image stored in the frame buffer is converted by way of the RAMDAC into analog signals which the monitor requires in order to display the image. As however a finished image is not in the frame buffer at every moment in time because the rasterized pixels are always first progressively stored, the construction of each individual image would also be involved (the frame buffer is erased before each image). In order to avoid that flicker the double buffer procedure is employed. In that case the rasterizer operates on the one frame buffer while the content of the other frame buffer is represented on the monitor. When the next image is rendered in the finished condition, the system is switched over between the two buffers and they interchange their functions. If the display of an image is concluded before the next image has been rendered in the finished condition, then the previous image is displayed once again.

FIG. 59 includes at the left a possible system configuration: the renderer sends the chromaticity values of the rasterized pixels and further items of information (x,y-position, z-value for z-buffering) to both frame buffers of which however only one takes over the values into the memory. The content of the other frame buffer is transferred to the RAMDAC. In order to ensure the highest possible image repetition rate or refresh rate, that is to say in order to avoid image flicker, in most cases it is not only one pixel per cycle that is transmitted to the RAMDAC, but two or even four; thus the cycle rate can be kept low outside the chip and nonetheless a high transmission rate can be achieved. The pixels are then serialized again in the RAMDAC and sent to a monitor at a suitably multiple cycle rate. The idea of incorporating post-anti-aliasing in the display process is based on the point that it is possible simply to replace just the normal RAMDAC by an RAMDAC which has been expanded by the anti-aliasing function (FIG. 60). The renderer and the frame buffer are not affected by that change so that it then becomes possible for anti-aliasing also to be incorporated into the systems which have not in any way been intended for same. This is the particularity of the present method which has not been afforded by the previous anti-aliasing methods.

Figure 61:
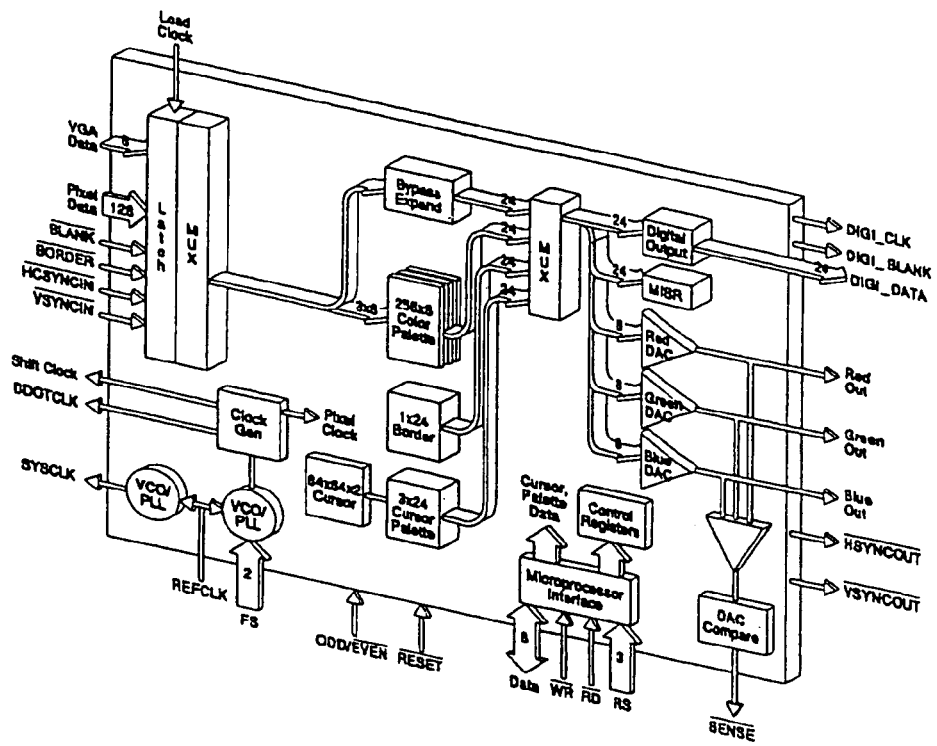

An example of an RAMDAC is to be found in FIG. 61. In this special case, up to four pixels per cycle can be transferred. As however the anti-aliasing method can in its basic variant only ever process one pixel per cycle, it cannot simply be connected upstream of the RAMDAC. Two alternatives are desirable in terms of incorporation:

1. Incorporation upstream of the RAMDAC

In this case four pixels must always be processed simultaneously in each cycle; the overall logic would therefore have to be constructed in quadruplicate parallel relationship. The memory expenditure is unchanged. The edge window is further shifted by four pixels in each cycle, in which case each logic unit always processes one of the for pixels.

2. Incorporation in the RAMDAC after the demultiplexer

After the demultiplexer, there is only one pixel that has to be processed per cycle, as the four pixels which are in parallel relationship are serialized by the latch and the subsequent demultiplexer, but here a higher cycle rate is required. The cycle rate in this region is not constant but depends on the display screen resolution and the desired refresh rate. The design configuration must always depend on the highest cycle rate. With clock cycle rates which are usual nowadays of up to 250 MHz correspondingly more register stages would then have to be installed in the logic block of the anti-aliasing system. At such high rates however it must be checked whether this appears to be a viable proposition at all. One possible form of limitation to lower rates in the anti-aliasing unit is that only images of up to a given resolution are processed. All images at the higher resolution (and thus higher cycle rates) are caused to by-pass the anti-aliasing unit as at such high degrees of resolution the anti-aliasing effects are no longer so striking.

Figure 62:
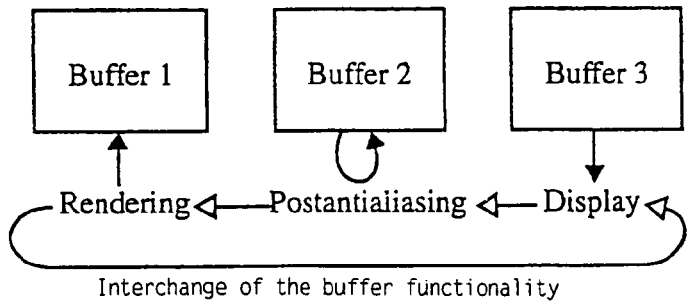
Figure 63:
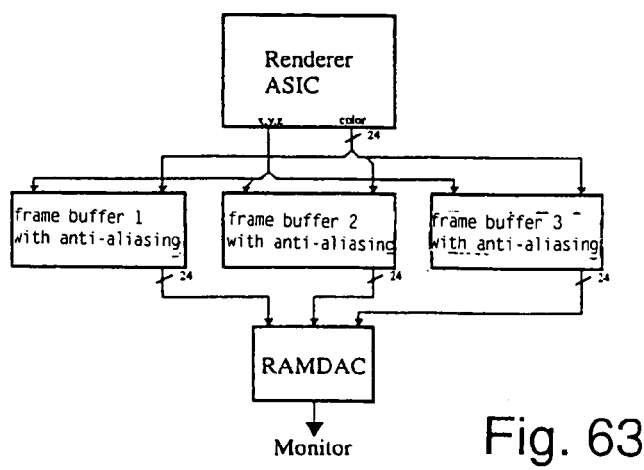

The above-described double buffer method can be expanded to a triple buffer, in which case the content of one frame buffer is displayed on the monitor, the second is processed by means of the post-anti-aliasing procedure and in the third frame buffer the next image is already being produced by the renderer. That procedure is diagrammatically shown in FIG. 62 in the form of a cycle. A triple buffer is shown in FIG. 63 in the form of a block circuit diagram. Three frame buffers are connected in parallel and receive their signals in time-displaced relationship in cyclic interchange and output them in corresponding manner.

The amount of time required for the individual processes varies greatly. If for example the display of an image requires about $\frac{1}{80}$ second, the rendering process generally requires at least $\frac{1}{30}$ second. The time for anti-aliasing of the image will range somewhere between those two extreme values.

The procedure when using a triple buffer will now be described in the following terms:

When the display of an image is concluded, a check is made to ascertain whether the next image has already been anti-aliased. If the image is ready, the previous anti-aliasing buffer takes over the transfer function for the new image to go to the RAMDAC. If the image is not yet ready, the same image is transmitted once again to the RAMDAC. (In the double buffer, each image is displayed approximately between two and four times).

When anti-aliasing of an image is concluded, the procedure waits for finishing of the next image by the renderer. When the next image is available the previous renderer-frame buffer takes over the anti-aliasing function.

If the renderer process is concluded with the generation of a new image, then the procedure is switched over immediately to the original display buffer where the processing of a new image can be begun immediately. The renderer process does not in any way have to wait for the display process as, by virtue of the time relationships already described, the display of the image has been transferred to the anti-aliasing buffer.

Figure 64:
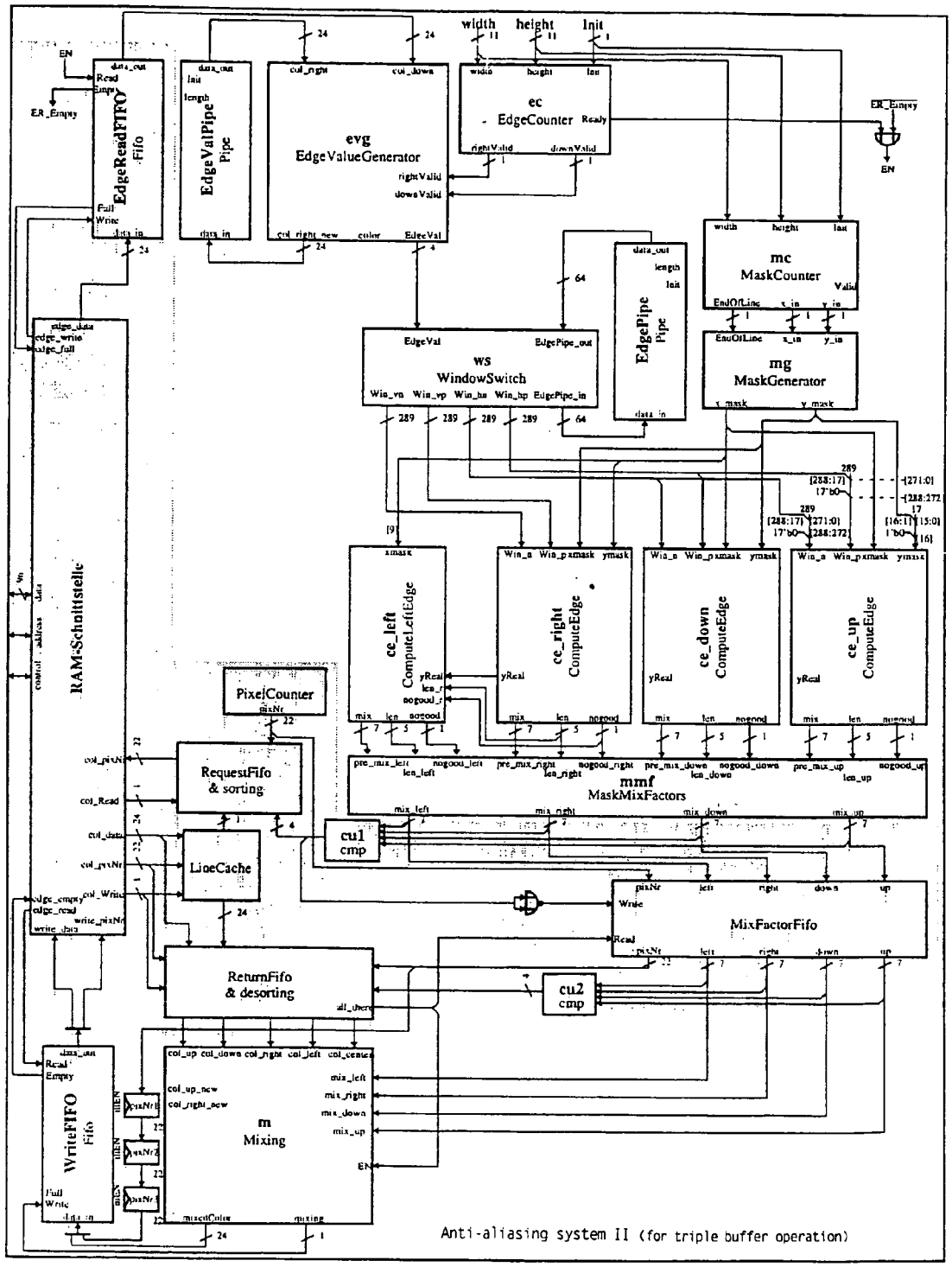

Some modifications to the basic anti-aliasing system have to be made for use in the triple buffer mode of operation, as is illustrated in FIG. 64.

For the triple buffer process there is no need for the chromaticity values to be cancelled after the edge generation step as they can once again be read out of the memory. That option was not available with the display process as each chromaticity value was only transferred once. Accordingly the chromaticity values which come from the EdgeValue-Generator( ) are rejected (as can be seen from the unconnected output) and are fetched again from the memory only when they are required for the operation of mix the colors.

The memory accesses are not duplicated, as would actually be the assumption, for in the second reading-out operation it is not all chromaticity values that have to be read out once again, but only those which are actually needed for the color mix operation. Statistical investigations showed that in the worst-case scenario 20% of the pixels of the image have to be read once again. It will be appreciated that not all pixels also have to be written back into the memory, but only those which have actually experienced a change in color (evidently due to the output signal mix of the module Mixing( )), which occurs in a maximum of 10% of cases. Viewed statistically accordingly 1.3 memory accesses must occur per pixel (100% image read out once, 20% pixels to be mixed read once again, 10% of the pixels written back).

The combinatory logic of the anti-aliasing system in itself made it possible for a further pixel to be produced in each cycle, but this is not absolutely necessary. In order with a display screen resolution of 1280×1024 to achieve the required image generation rate of 25 images per second, 1280×1024×25=32,768 millions of pixels have to be processed per second. With an assumed cycle rate of 66 MHz for the system therefore 2.01 cycles are available for each pixel to be processed. With higher levels of resolution that value can become even lower but then the renderer will not be able to guarantee an image generation rate of 25 images per second. With memories which are usual nowadays, it cannot be assumed that item of data can be transmitted in each cycle as refresh times must be observed for maintaining the memory contents in the case of dynamic RAMs and row change times. The effective transmission rate is heavily dependent on the access sequence to the memory so that in general it is not possible to specify a concrete transmission rate.

The memory interface however is generally so dimensioned that it is not just one pixel per cycle that is transmitted from the memory, but a plurality in parallel relationship at the same time. Thus up to 4 pixels can be transmitted in parallel.

Figure 65:
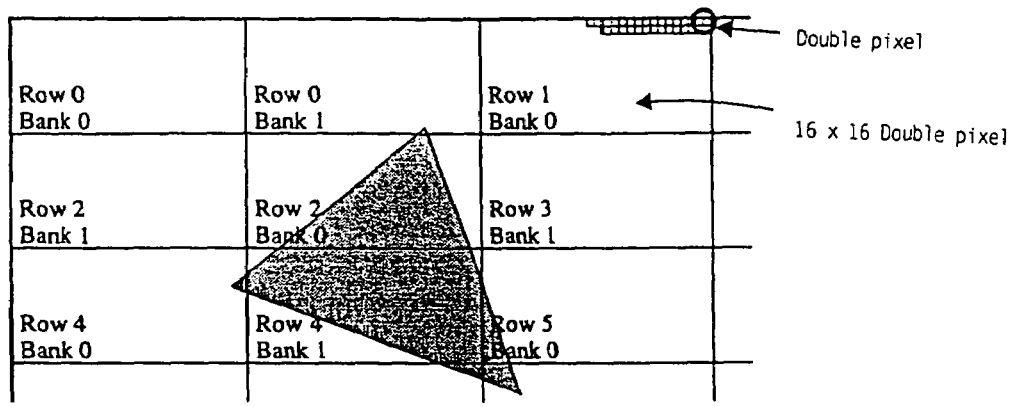

The essential prerequisite for ensuring such transmission rates is efficient memory imaging so that it is possible to access the next pixels required as quickly as possible. As an example in this respect mention may be made of the memory organisation in the frame buffer of a known system (GMD VISA). The SDRAM-memory used (1 M×32-organisation) is physically divided into two banks which are made up of rows (2048) which in turn are subdivided into columns (256/a respective pixel is filed in a column). Within a row it is possible to access any column address in a cycle, whereas switching over of the individual rows requires 7 cycles. Memory imaging was therefore so designed that the number of row changes is minimized both in the rendering process and also in the reading-out operation for the display process. In order to save on a further address bus, 2 adjacent pixels are always simultaneously fetched from the memory, with an address, as 2 memory chips are available. The rows were now so subdivided that a region of 32×16 double pixels finds space therein, and thus each double pixel can be read out in a cycle, within that region (FIG. 65).

The memory imaging used also fits in very well with the method used here. When reading out the pixels for edge generation, the complete image is read out linearly in line-wise manner, in other words, it is possible in 32 cycles to read 64 pixels out of the memory before there has to be a row change which requires 7 cycles. For that process accordingly there is a transmission rate of 64 pixels in 39 cycles=1.64 pixels/cycle. That however is not the only process which takes place on the memory. Concurrently therewith the 20% of pixels which has already been addressed is fetched for mix and 10% of the pixels are written back again. By suitably buffering out the requirements it is possible to use the row change to switch over between the individual processes.

Figure 66:
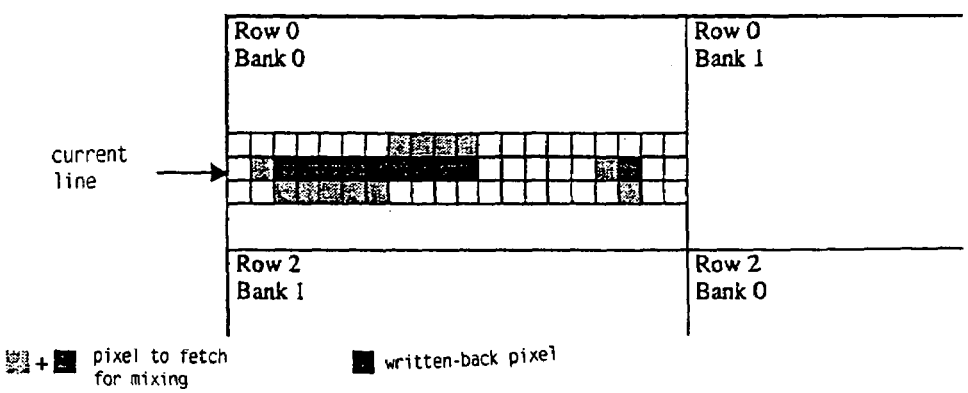

For the second read-out process and the writing process, the requirements should be collected until all enquiries concerning a row can be processed at once so that once again as few row changes as possible have to be effected even in regard to these procedures which are no longer linear, as is shown in FIG. 66.

The procedure in the module RAM-interface( ) for the pixels which are currently to be fetched from the memory is as follows:

Linear reading out of the memory of the pixels which are required for edge generation, and write them into the EdgeReadFIFO( ) until arriving at the end of a row. A counter is internally used for that purpose, the counter noting up to which pixel reading has been effected.

At the end of a row, a check is made to ascertain what the status of the other two processes respectively looks like. If all enquiries concerning a row have been received in one of the two FIFOs (RequestFIFO( ) and WriteFIFO( )) then they are transmitted in succession to the memory. If that is not the case, the EdgeReadFIFO( ) is further filled.

The EdgeReadFIFO( ) is therefore so dimensioned that as far as possible it never becomes empty so that operation can always be further implemented.

The mix factors coming from MaskMixFactor( ) are checked by means of the module cmp( ) to ascertain which of the mix factors is not equal to zero. If this should not be the case in any, then the current pixel does not have to be mixed and the mix factors are rejected. If however at least one of the factors is not equal to zero, then they are stored together with the current pixel number in the module MixFactorFIFO( ) in order then to use them later (as soon as the chromaticity values have been fetched from the memory) for the actual mix operation. On the basis of the mix factors, the necessary color demands are then put into intermediate storage in the RequestFIFO( ). In the case of adjacent pixels, under some circumstances the same chromaticity values are required so that these doubled requirements are sorted out. As soon as all enquiries concerning a row have been received, they can be transmitted to the RAM-interface( ) which then thereupon returns the color information to the ReturnFIFO( ). Then, in the ReturnFIFO( ), on the basis of the mix factors at the output of the MixFactorFIFO( ), the required items of color information are parallelized and as soon as all required colors are present, the module Mixing( ) is set in operation by means of the signal all_there in order to carry out the actual mix operation. The results of the color mix operation are then put into intermediate storage in the WriteFIFO( ) until they can finally be written into the memory again. The image is altered in a single buffer so that under some circumstances data which have already been altered were written back into the memory although the original data are still required for mix of the next line, and accordingly it is additionally still necessary to install a local memory in which the old data are still available. Accordingly all chromaticity values which have already been used once are stored in the LineCache( ) as only those data which have already been read once can be altered in the memory. By means of the LineCache( ), all requirements which are already present are sorted out in the RequestFIFO( ) and the corresponding data are then transmitted to the ReturnFIFO( ).

The invention is not limited in terms of its implementation to the preferred embodiments set forth hereinbefore by way of example. On the contrary, a number of alternative configurations is possible, which make use of the solution put forward even in regard to configurations of fundamentally different nature.

What is claimed is:

1. A method of eliminating unwanted steps at edges in image representations in the line raster, the image representations comprising pixels generated by rasterization of an original unrastered image, in particular in on-line operation, characterized by the steps:

a) application of an edge operator to a rastered image portion for coarsely ascertaining at least one rastered edge configuration in the rastered image portion, b) determining the position of at least a first pixel from the amount of those pixels which form the rastered edge configuration or adjoin said rastered edge configuration, c) approximation of a straight line for ascertaining a probable configuration of the unrastered image edge in the proximity of the first pixel, d) ascertaining a criterion from the approximation straight line and the position of the first pixel for mixing a color X to the color C in the first pixel considered, and e) mixing the ascertained color X to the color C in the first pixel considered.

2. A method as set forth in claim 1 characterized in that the criterion of method step d), in dependence on the position of the pixel being considered relative to the approximation straight line, establishes which color x is mixed to the color C of the pixel being considered.

3. A method as set forth in claim 2 characterized in that the criterion in accordance with method step d), in dependence on the position of the pixel being considered relative to the approximation straight line, establishes that the color of at least one adjacent pixel is mixed in weighted mode to the color of the pixel being considered.

4. A method as set forth in claim 1 characterized in that in the case of a pixel being considered which is not intersected by the approximation straight line, the color remains unchanged.

5. A method as set forth in claim 1 characterized in that in the case of a pixel being considered which is intersected by the approximation straight line the resultant color R is determined in accordance with the following criterion:

the approximation straight line divides the pixel being considered into two surface portions F1, F2, wherein F1±F2= 1, with 1 being the total area of the pixel, wherein F1 is that surface portion in which the pixel center point lies:

mixed to color C of the pixel being considered is the color X of that adjacent pixel which adjoins the longest edge, formed by the raster, of the surface portion F2.

6. A method as set forth in claim 5 characterized in that the resultant color R arises out of the original color C of the pixel being considered and the mixed color X of an adjacent pixel in accordance with the following equation:

$$R = F1 \times C + F2 \times X$$

7. A method as set forth in claim 5 characterized in that the surface portions F1, F2 are approximated by a suitable approximation process.

8. A method as set forth in claim 1 characterized in that said method steps are applied to an image portion treated by means of rendering and/or a shading process.

9. A method as set forth in claim 8 characterized in that the shading/rendering is triangle- or scanline-based, or that it involves Gouraud or Phong shading.

10. A method as set forth in one of the preceding claims characterized in that the above-specified method steps a) through e) are carried out individually or in groups in time-displaced relationship.

11. A method as set forth in claim 10 characterized in that the time displacement is at least one image line.

12. A method as set forth claim 1 characterized in that the processing is effected in time-displaced relationship in a frame buffer without further intermediate storage.

13. A method of eliminating unwanted steps at edges in image representations in the line raster, the image representations comprising pixels generated by rasterization of an original unrastered image, in particular in on-line operation, characterized by the steps;

a) application of an edge operator to an image portion for coarsely ascertaining at least one rastered edge configuration, b) determining the position of at least a first pixel from the amount of those pixels which form the rastered edge configuration or adjoin said rastered edge configuration, c) approximation of a straight line for ascertaining a probable configuration of the unrastered image edge in the proximity of the first pixel, d) ascertaining a criterion from the approximation straight line and the position of the first pixel for mixing a color X to the color C in the first pixel considered, and e) mixing the ascertained color X to the color C in the first pixel considered, wherein the approximation straight line passes over a plurality of steps of the rastered edge configuration and that the approximation straight line ends when the criteria 1) there can occur a maximum of two different step lengths, the step lengths of which may also differ by a maximum of 1, 2) only one of the two step lengths may occur a plurality of times in succession, 3) the sequential arrangement of the numbers of the steps which are of the same length gives a number sequence in which there is alternately always a one and then any number (>0). The ones (only those at each second position) are deleted from that sequence. In the sequence obtained only two different numbers which differ by one may again occur, 4) in the sequence obtained in 3, only one of the two possible numbers may occur a plurality of times in succession, 5) by repeatedly applying rules 3, and 4, to the number sequence, it is possible to obtain an ever more global view onto the edge, are checked in rising succession and at least one criterion is not fulfilled.

14. A method of eliminating unwanted steps at edges in image representations in the line raster, the image representations comprising pixels generated by rasterization of an original unrastered image, in particular in on-line operation, characterized by the steps;

a) application of an edge operator to an image portion for coarsely ascertaining at least one rastered edge configuration, b) determining the position of at least a first pixel from the amount of those pixels which form the rastered edge configuration or adjoin said rastered edge configuration, c) approximation of a straight line for ascertaining a probable configuration of the unrastered image edge in the proximity of the first pixel, d) ascertaining a criterion from the approximation straight line and the position of the first pixel for mixing a color X to the color C in the first pixel considered, and e) mixing the ascertained color X to the color C in the first pixel considered, wherein the approximation straight line passes over a plurality of steps of the rastered edge configuration and that the approximation straight line ends when one of the criteria
1) there can occur a maximum of two different step lengths, the step lengths of which may also differ by a maximum of 1,
2) only one of the two step lengths may occur a plurality of times in succession,
3) the sequential arrangement of the numbers of the steps which are of the same length gives a number sequence in which there is alternately always a one and then any n umber (>0). The ones (only those at each second position) are deleted from that sequence. In the sequence obtained only two different numbers which differ by one may again occur,
4) in the sequence obtained in 3, only one of the two possible numbers may occur a plurality of times in succession, or one of the criteria 1), 2), 3) or one of the criteria 1), 2) is not fulfilled.

15. A method of eliminating unwanted steps at edges in image representations in the line raster, the image representations comprising pixels generated by rasterization of an original unrastered image, in particular in on-line operation, characterized by the steps:

a) application of an edge operator to an image portion for coarsely ascertaining at least one rastered edge configuration,
b) determining the position of at least a first pixel from the amount of those pixels which form the rastered edge configuration or adjoin said rastered edge configuration,
c) approximation of a straight line for ascertaining a probable configuration of the unrastered image edge in the proximity of the first pixel,
d) ascertaining a criterion from the approximation straight line and the position of the first pixel for mixing a color X to the color C in the first pixel considered,
e) mixing the ascertained color X to the color C in the first pixel considered, and
f) providing a triple buffer, wherein the three resulting buffers share in cyclic interchange in parallel relationship the method steps of rendering post-anti-aliasing and image reproduction.

* * * * *